United States Patent
Oba

(10) Patent No.: US 12,351,215 B2
(45) Date of Patent: Jul. 8, 2025

(54) INFORMATION PROCESSING DEVICE, MOBILE DEVICE, INFORMATION PROCESSING SYSTEM, AND METHOD

(71) Applicant: SONY SEMICONDUCTOR SOLUTIONS CORPORATION, Kanagawa (JP)

(72) Inventor: Eiji Oba, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 156 days.

(21) Appl. No.: 17/639,362

(22) PCT Filed: Aug. 6, 2020

(86) PCT No.: PCT/JP2020/030194
§ 371 (c)(1),
(2) Date: Mar. 1, 2022

(87) PCT Pub. No.: WO2021/049219
PCT Pub. Date: Mar. 18, 2021

(65) Prior Publication Data
US 2022/0289250 A1    Sep. 15, 2022

(30) Foreign Application Priority Data

Sep. 9, 2019   (JP) ................. 2019-163687

(51) Int. Cl.
*B60W 60/00* (2020.01)
*G06F 21/62* (2013.01)
(Continued)

(52) U.S. Cl.
CPC ..... *B60W 60/0059* (2020.02); *G06F 21/6245* (2013.01); *G06V 20/597* (2022.01);
(Continued)

(58) Field of Classification Search
CPC ....... B60W 60/0059; B60W 2540/229; B60W 2556/00; G06F 21/6245; G06V 20/597;
(Continued)

(56) References Cited

U.S. PATENT DOCUMENTS

2009/0079555 A1* 3/2009 Aguirre De Carcer ..................
G07C 5/008
701/2
2011/0043341 A1   2/2011 Kumagami
(Continued)

FOREIGN PATENT DOCUMENTS

CN    102148888 A    8/2011
CN    107810506 A    3/2018
(Continued)

OTHER PUBLICATIONS

International Search Report and Written Opinion of PCT Application No. PCT/JP2020/030194, issued on Nov. 10, 2020, 08 pages of ISRWO.

*Primary Examiner* — Khoi H Tran
*Assistant Examiner* — Nhi Q Bui
(74) *Attorney, Agent, or Firm* — CHIP LAW GROUP

(57) ABSTRACT

Individually-identifiable data included in observation information of a driver or the like of a vehicle or data for which recording processing is not permitted in a personal information protection regulation is abstracted or encrypted and recorded. A driver information acquisition unit that acquires the observation information of the driver of the vehicle and a data processing unit that inputs the observation information and executes data processing are included. The data processing unit divides the observation information into conversion unnecessary data and conversion necessary data, executes abstraction processing or encryption processing for the conversion necessary data, and stores conversion data such as abstraction data or encryption data in a storage unit.

(Continued)

The data processing unit executes the abstraction processing or the encryption processing for the individually-identifiable data included in the observation information or the data for which recording processing is not permitted in the personal information protection regulation as the conversion necessary data.

20 Claims, 31 Drawing Sheets

(51) Int. Cl.
  *G06V 20/59* (2022.01)
  *G08G 1/16* (2006.01)
(52) U.S. Cl.
  CPC .......... *G08G 1/16* (2013.01); *B60W 2540/229* (2020.02); *B60W 2556/00* (2020.02)
(58) Field of Classification Search
  CPC ...... G06G 1/16; G06G 1/0112; G06G 1/0129; G06G 1/017; G06G 1/096775; H04L 9/088; H04L 2209/42; H04L 2209/84; H04L 63/0421; H04W 12/02
  See application file for complete search history.

(56) References Cited

U.S. PATENT DOCUMENTS

| | | | | |
|---|---|---|---|---|
| 2016/0378114 | A1* | 12/2016 | Laur | G05D 1/0061 |
| | | | | 701/23 |
| 2017/0220816 | A1* | 8/2017 | Matusek | H04N 21/4318 |
| 2017/0315551 | A1* | 11/2017 | Mimura | B60W 30/143 |
| 2018/0068192 | A1 | 3/2018 | Miller et al. | |
| 2019/0129417 | A1* | 5/2019 | Noto | B60W 60/0053 |
| 2019/0155279 | A1* | 5/2019 | Tayama | B60W 30/00 |
| 2021/0370879 | A1* | 12/2021 | Julian | G06V 40/166 |

FOREIGN PATENT DOCUMENTS

| | | |
|---|---|---|
| CN | 107848538 A | 3/2018 |
| CN | 109712430 A | 5/2019 |
| JP | 2008-009761 A | 1/2008 |
| JP | 2013-206031 A | 10/2013 |
| JP | 2018-513804 A | 5/2018 |
| JP | 2018-124825 A | 8/2018 |
| JP | 2019079203 A | 5/2019 |
| KR | 10-2017-0136576 A | 12/2017 |
| WO | 2016/164820 A1 | 10/2016 |
| WO | WO-2018039646 A1 | 3/2018 |
| WO | 2019/097944 A1 | 5/2019 |
| WO | 2019/151266 A1 | 8/2019 |

\* cited by examiner

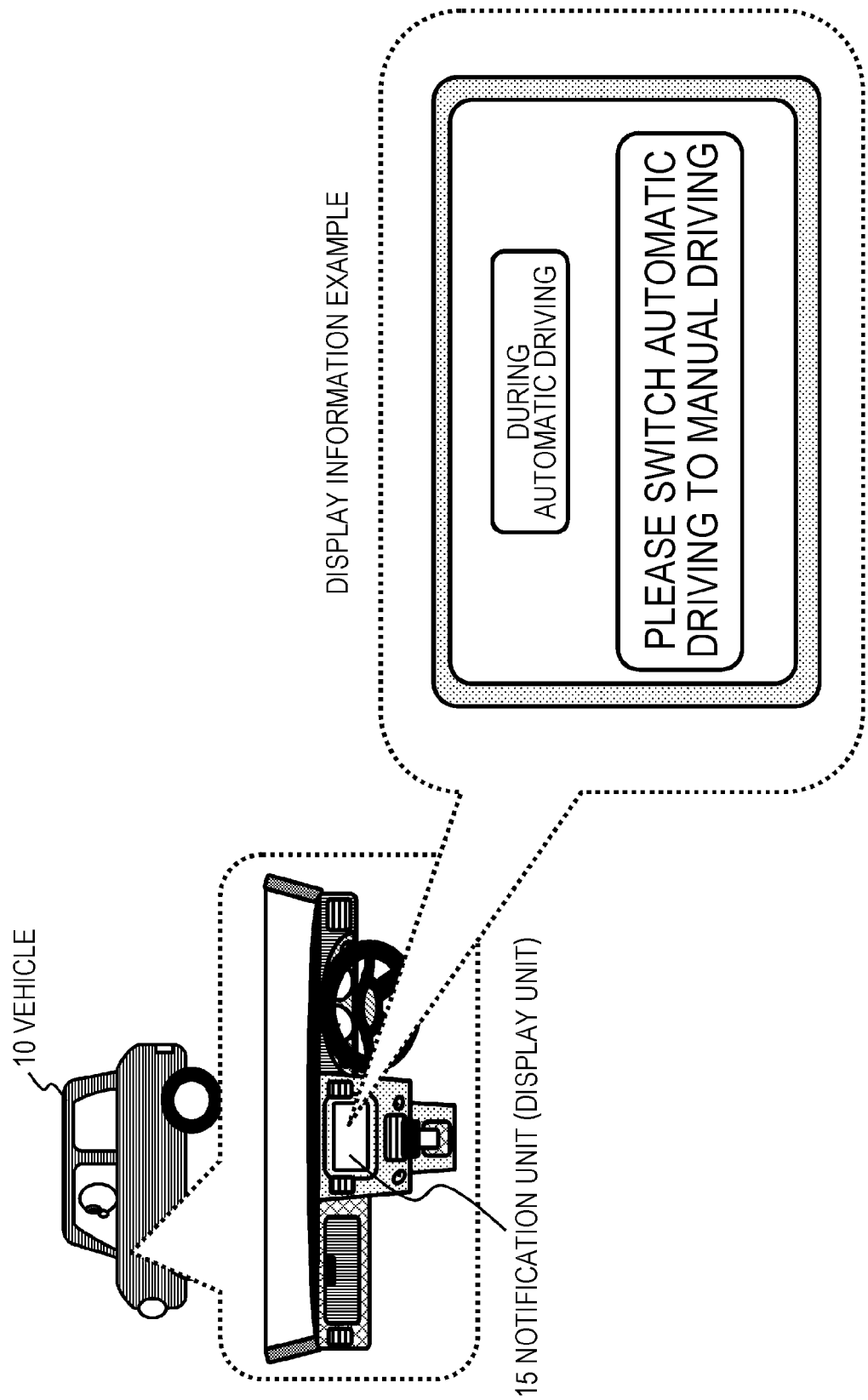

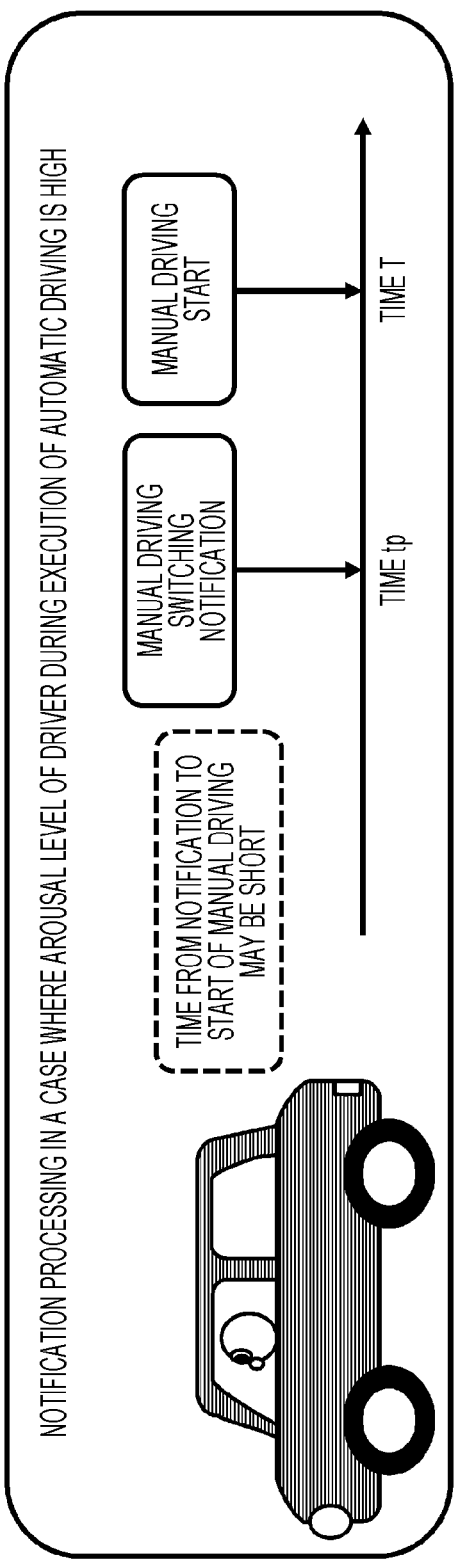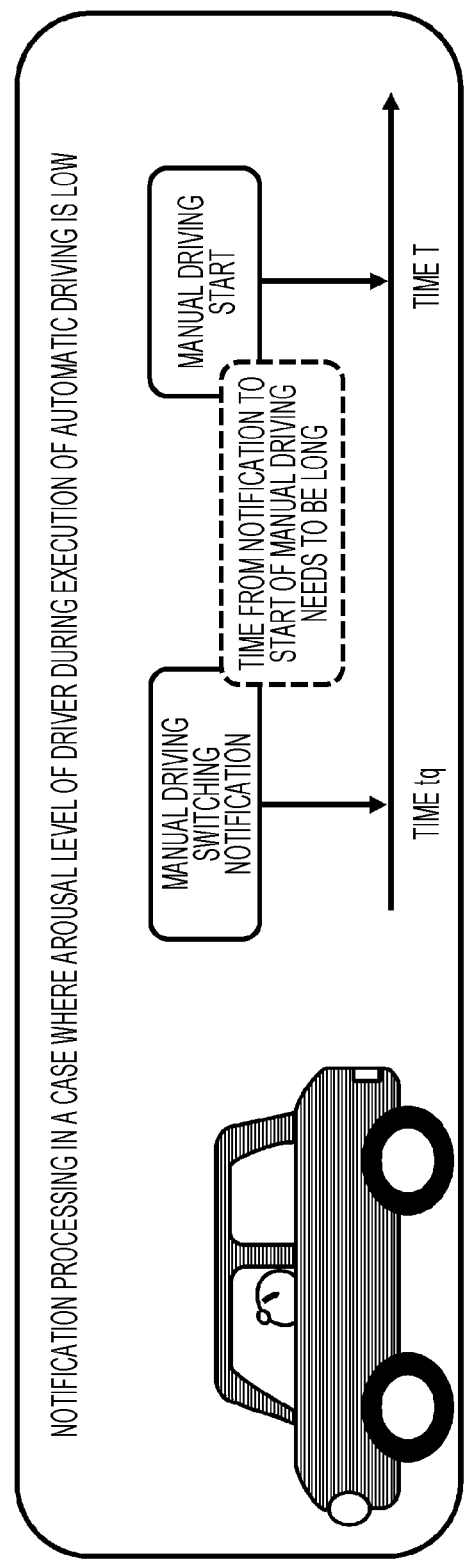
FIG. 5A
FIG. 5B

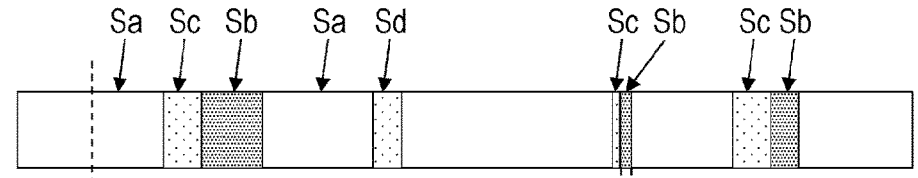
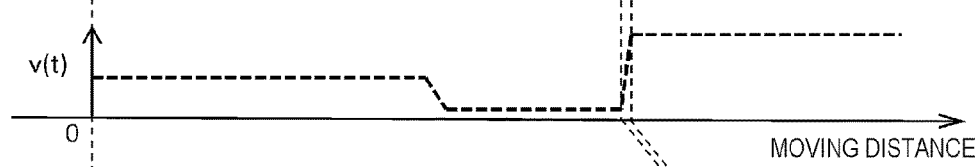
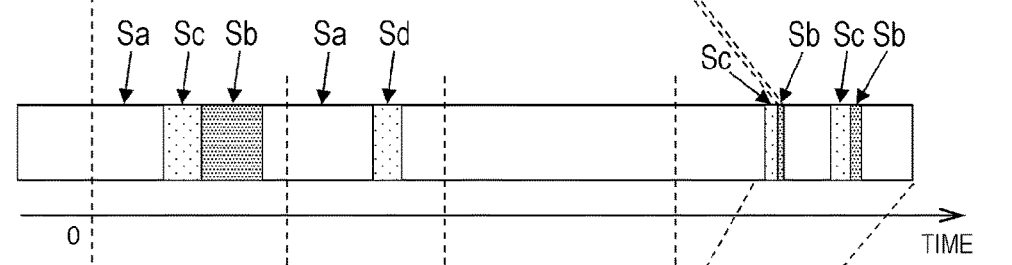
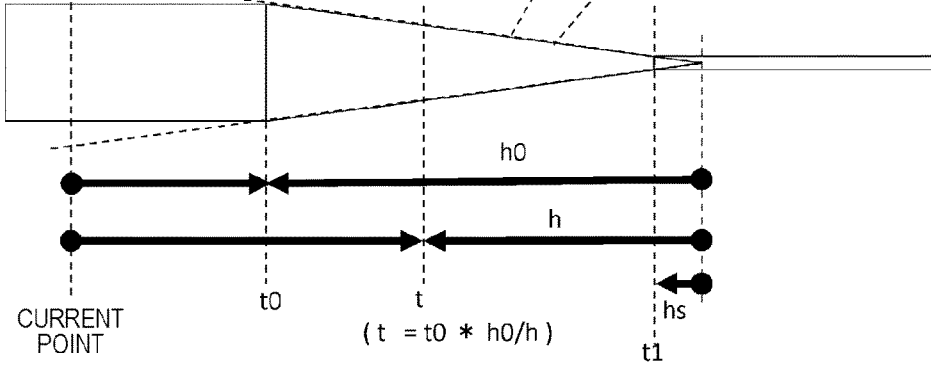
FIG. 10A
FIG. 10B
FIG. 10C
FIG. 10D

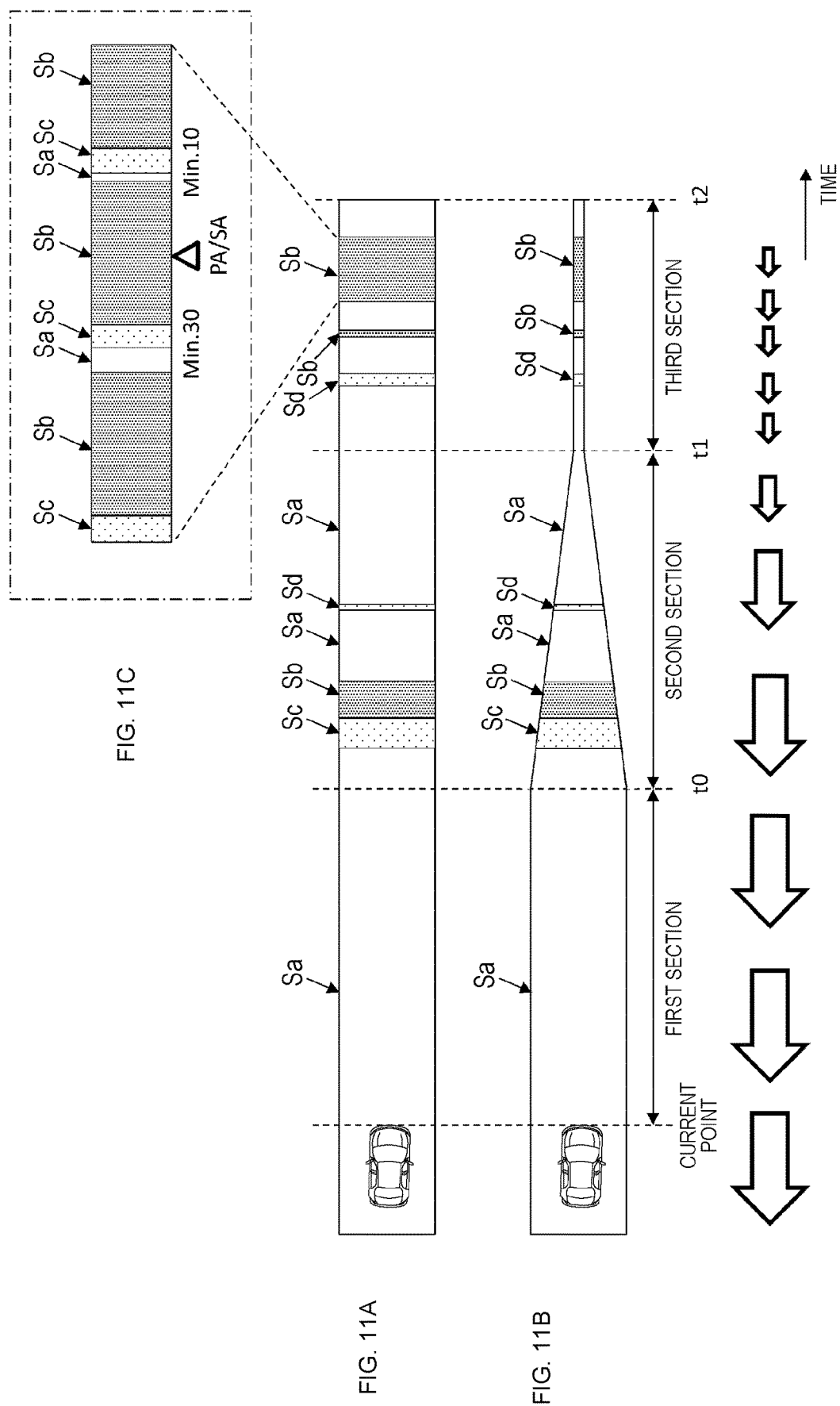

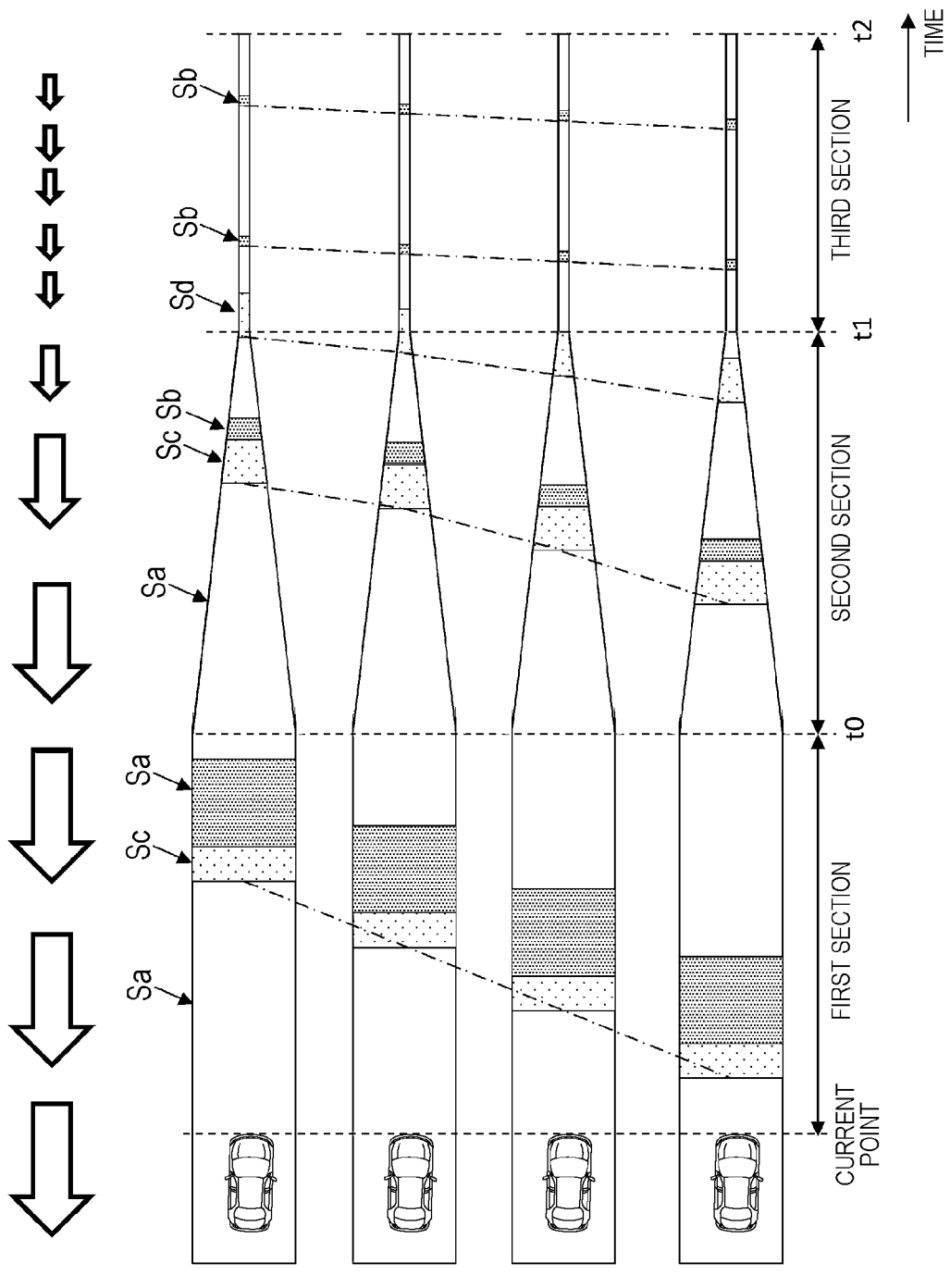

FIG. 14

| (1) INFORMATION ACQUISITION UNIT | (2) TYPE OF ACQUIRED INFORMATION | (3) SPECIFIC EXAMPLE OF ACQUIRED INFORMATION |
|---|---|---|
| (A) DRIVER INFORMATION ACQUISITION UNIT | (A1) BEHAVIOR INFORMATION OF DRIVER | READING, SLEEPING, TERMINAL OPERATION, LEAVING SEAT, SORTING, ARRANGING SLIP, AND THE LIKE |
| | (A2) POSTURE AND OPERATION INFORMATION OF DRIVER | INCLUDING SMOOTHNESS INFORMATION OF POSTURE TRANSITION SUCH AS ORIENTATION OF BODY, SEAT ROTATION, TRANSITION OF FOOT TO STEERING PEDAL, BODY MOVEMENT |
| | (A3) FACE AND HEAD INFORMATION OF DRIVER | FACE AND HEAD ORIENTATION, POSTURE, MOVEMENT INFORMATION, AND THE LIKE |
| | (A4) BIOMETRIC INFORMATION OF DRIVER | HEART RATE, PULSE RATE, BLOOD FLOW, RESPIRATION, ELECTROENCEPHALOGRAM, SWEATING STATE, EYE MOVEMENT, EYEBALL BEHAVIOR, GAZE, BLINKING, SACCADE, MICROSACCADE, FIXATION, DRIFT, STARE, IRIS PUPIL REACTION, AND THE LIKE |
| (B) ENVIRONMENT INFORMATION ACQUISITION UNIT | (B1) VEHICLE INFORMATION | TRAVEL CONTROL DATA OF USER'S OWN VEHICLE, OPERATION UNIT (ACCELERATOR, BRAKE, AND THE LIKE) OPERATION INFORMATION (INCLUDING ACQUIRED INFORMATION OF Event Data Recorder (EDR), DRIVER RECORDER, AND THE LIKE) |
| | (B2) OUTSIDE-VEHICLE OBSERVATION INFORMATION | IMAGE INFORMATION, DISTANCE INFORMATION, OBJECT IDENTIFICATION INFORMATION, AND THE LIKE OF SURROUNDING ENVIRONMENT OF TRAVELING ROUTE |

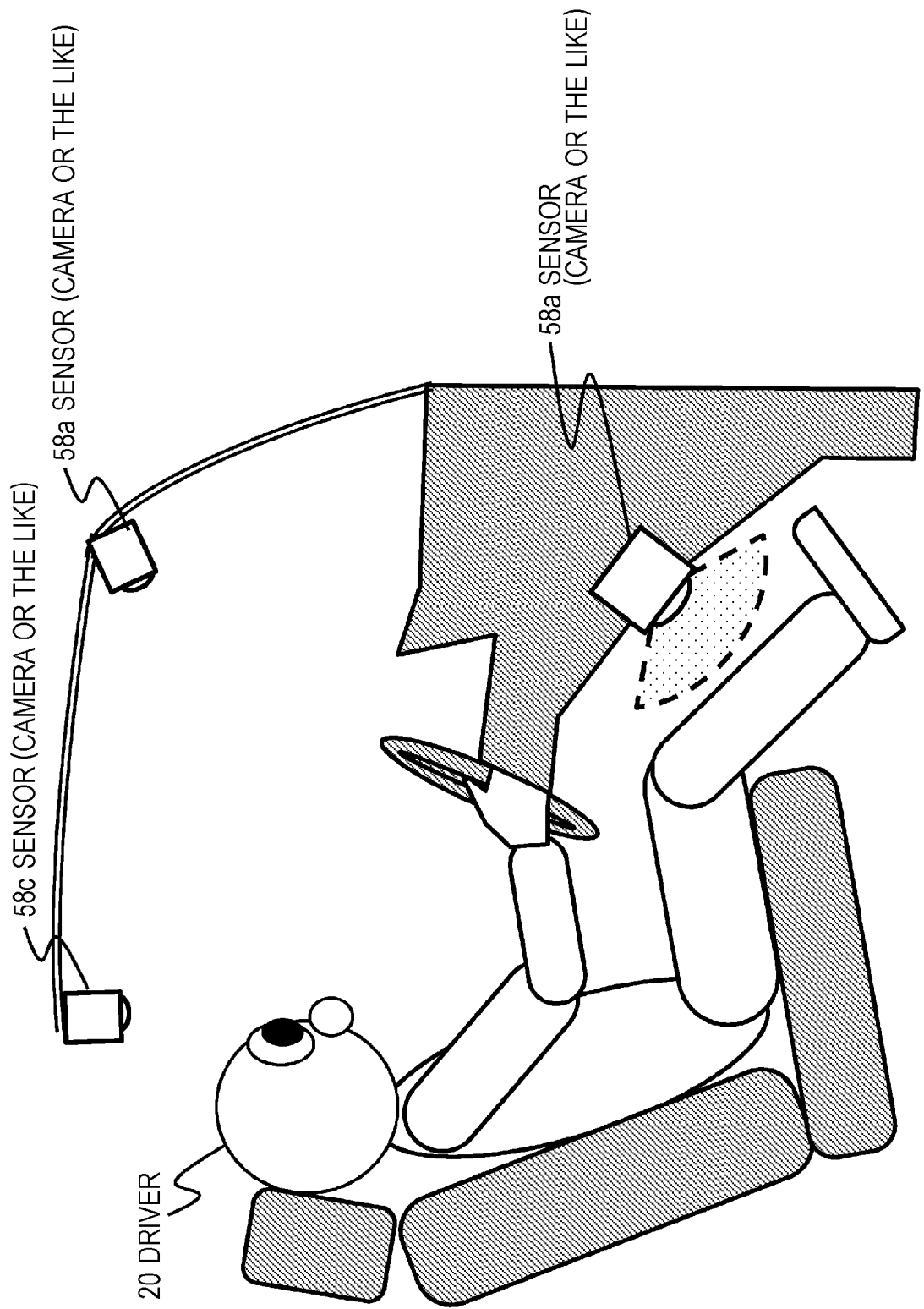

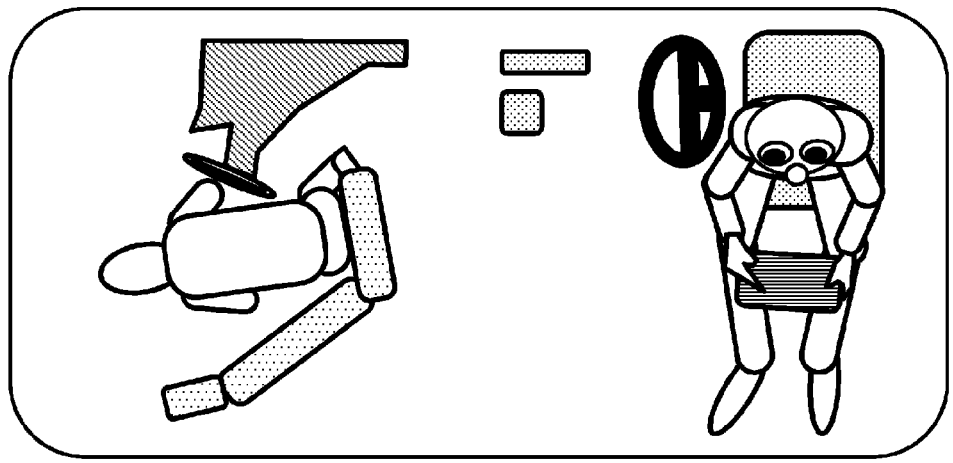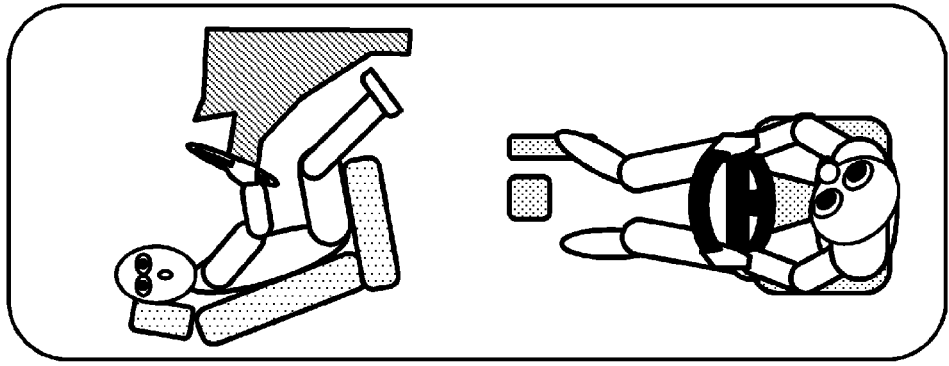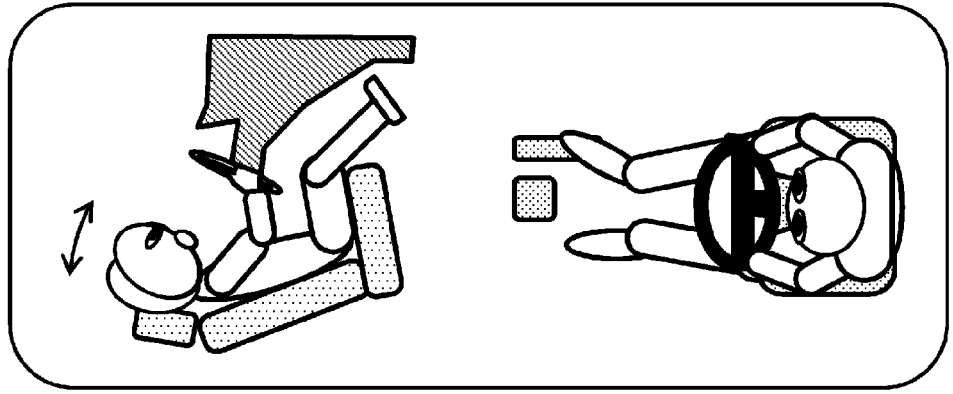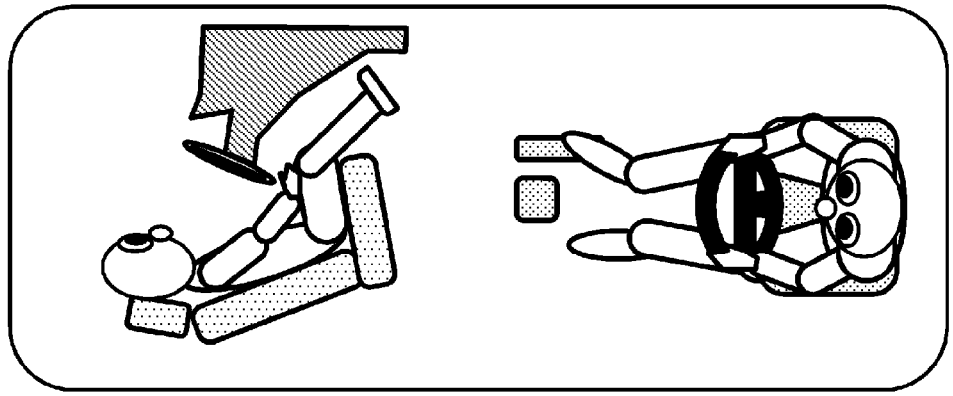

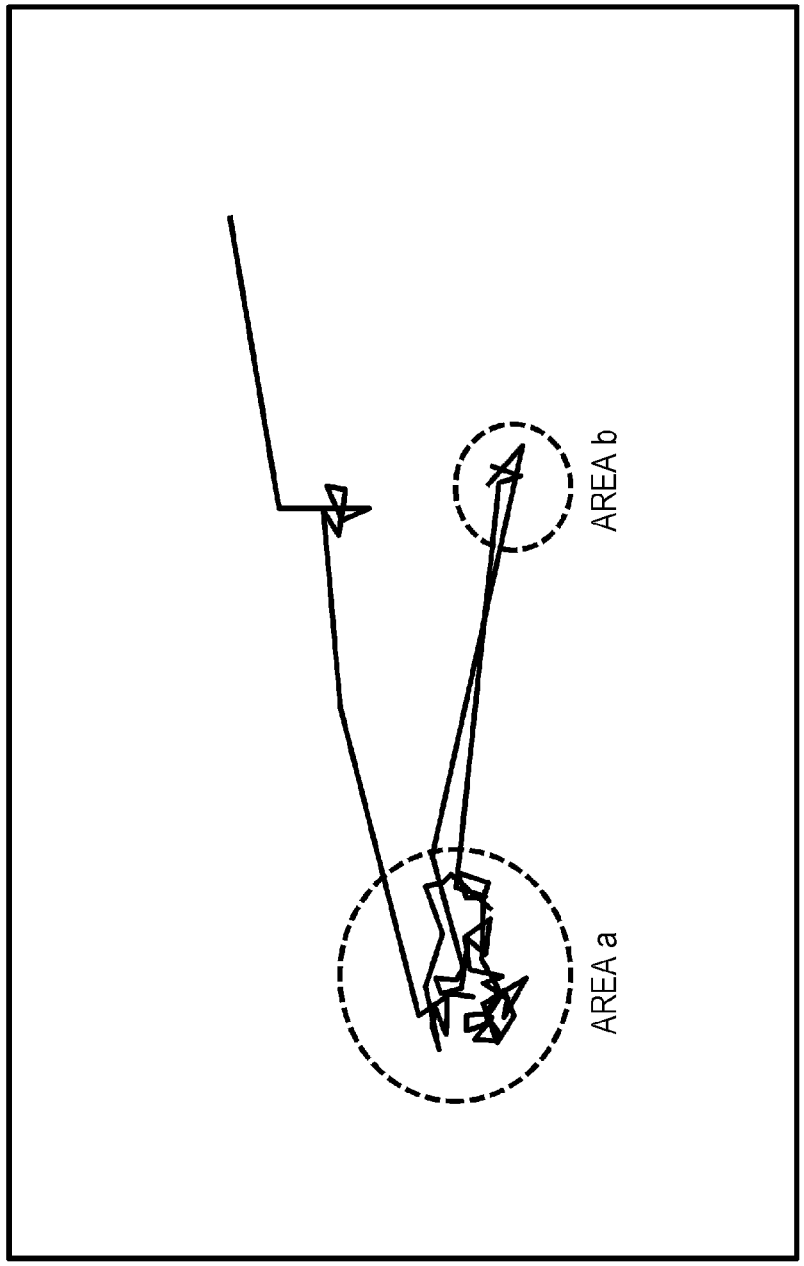

EYE ABSTRACTION DATA EXAMPLE

FACE ABSTRACTION DATA EXAMPLE

BODY ABSTRACTION DATA EXAMPLE

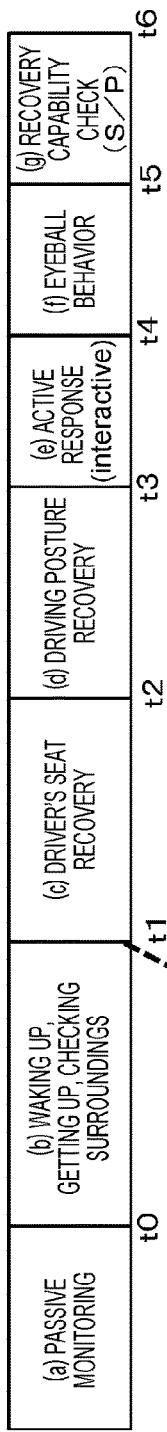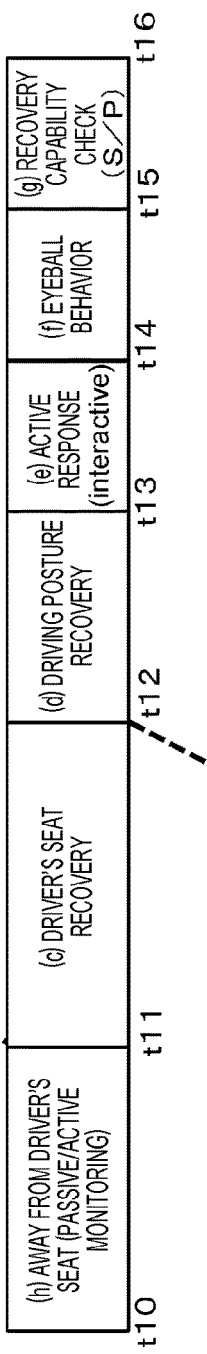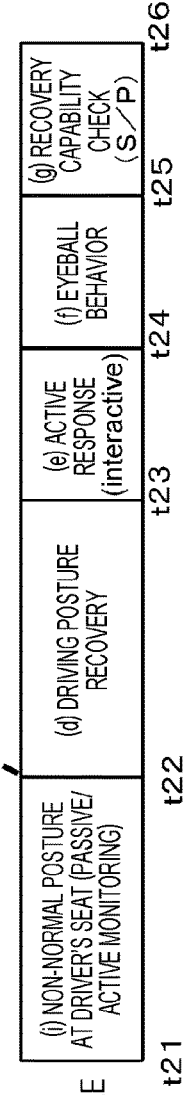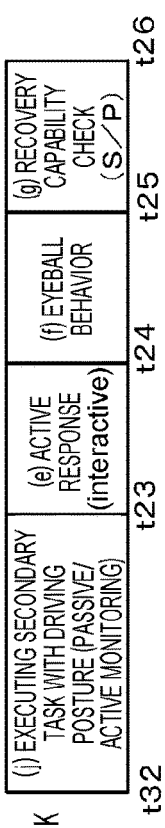

FIG. 26

| (1) PARAMETER (DRIVER INFORMATION) TYPE | (2) SPECIFIC EXAMPLE OF PARAMETER (DRIVER INFORMATION) CONFIGURATION DATA | (3) RECORDING PERMISSIBILITY ACCORDING TO PERSONAL INFORMATION PROTECTION REGULATION (GDPR) | (4) USE EXAMPLE OF PARAMETER (DRIVER INFORMATION) |
|---|---|---|---|
| 0TH-ORDER PARAMETER | FACE AND IRIS DATA | RECORDING IS NOT PERMITTED | CAN BE USED FOR INDIVIDUAL AUTHENTICATION AND THE LIKE |
| FIRST-ORDER PARAMETER | EYEBALL BEHAVIOR ANALYSIS DATA (SACCADE, MICROSACCADE, DRIFT, FIXATION, ANGLE OF CONGESTION, ...) | RECORDING IS PERMITTED | CAN BE USED FOR AROUSAL LEVEL EVALUATION BASED ON BRAIN ACTIVITY AND INTERNAL AROUSAL ANALYSIS |
| SECOND-ORDER PARAMETER | PERCENTAGE OF EYE CLOSURE EVALUATION VALUE (PERCLOS), FACE ORIENTATION, LINE-OF-SIGHT STABILITY EVALUATION VALUE (COORDINATE, INDEXING DATA) | RECORDING OF DATA INCLUDING FACE IMAGE AND EYE IMAGE IS NOT PERMITTED | CAN BE USED FOR EVALUATION FOR FATIGUE, DROWSINESS, SLEEPINESS SIGN, REDUCED CONSCIOUSNESS, LINE-OF-SIGHT STABILITY, AND STEERING AND PEDAL STEERING STABILITY |
| THIRD-ORDER PARAMETER | POSITION, SITTING POSTURE, AND LIMB JOINT POSTURE MOVEMENT DATA BY LIMB JOINT POSTURE MOVEMENT DATA ToF SENSORS AND THE LIKE | RECORDING OF DATA INCLUDING FACE, BODY, AND EYE IMAGES IS NOT PERMITTED | CAN BE USED FOR EVALUATION OF RECOVERY ACTION TO MANUAL DRIVING |
| FOURTH-ORDER PARAMETER | ELECTROENCEPHALOGRAM (EEG), PULSE WAVE, AND RESPIRATION DATA | RECORDING OF INDIVIDUALLY-IDENTIFIABLE DATA IS NOT PERMITTED | CAN BE USED FOR AROUSAL LEVEL EVALUATION |
| FIFTH-ORDER PARAMETER | RESPONSE CHARACTERISTIC DATA FOR SYSTEM NOTIFICATION, WARNING, INFORMATION UPDATE, AND THE LIKE | RECORDING IS PERMITTED | CAN BE USED FOR AROUSAL LEVEL EVALUATION |
| SIXTH-ORDER PARAMETER | HANDOVER FROM AUTOMATIC DRIVING TO MANUAL DRIVING, AND RECOVERY QUALITY DATA AFTER HANDOVER COMPLETION (RECOVERY DELAY TIME AND DRIVING OPERATION QUALITY DATA AFTER RECOVERY) | RECORDING IS PERMITTED | CAN BE USED FOR EVALUATION OF MANUAL DRIVING RECOVERY QUALITY OF DRIVER |

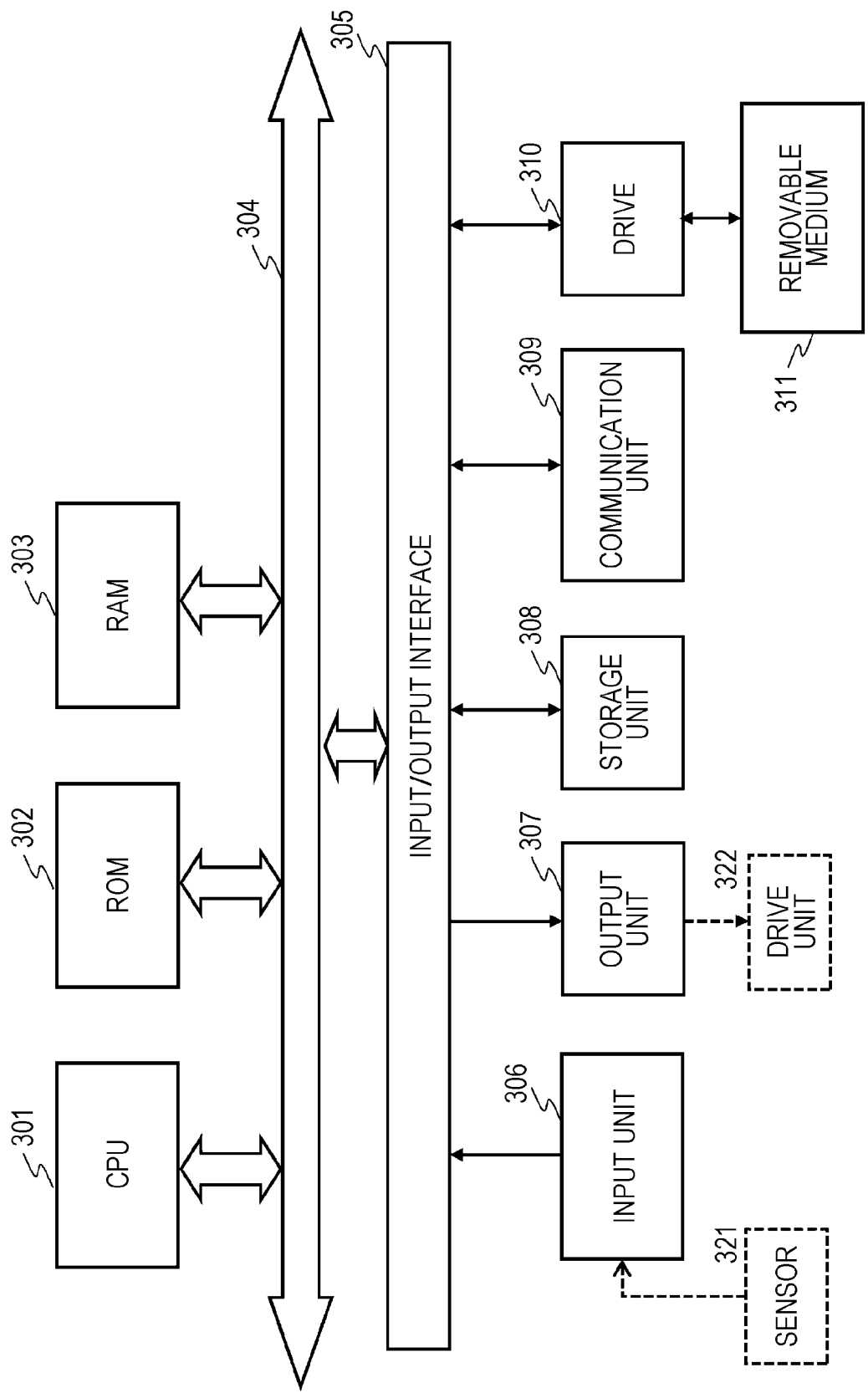

INFORMATION PROCESSING DEVICE, MOBILE DEVICE, INFORMATION PROCESSING SYSTEM, AND METHOD

CROSS REFERENCE TO RELATED APPLICATIONS

This application is a U.S. National Phase of International Patent Application No. PCT/JP2020/030194 filed on Aug. 6, 2020, which claims priority benefit of Japanese Patent Application No. JP 2019-163687 filed in the Japan Patent Office on Sep. 9, 2019. Each of the above-referenced applications is hereby incorporated herein by reference in its entirety.

TECHNICAL FIELD

The present disclosure relates to an information processing device, a mobile device, an information processing system, a method, and a program. More specifically, the present disclosure relates to an information processing device, a mobile device, an information processing system, a method, and a program that execute processing of acquiring and recording observation information of a driver or the like of a vehicle (automobile).

BACKGROUND ART

Recently, technological development related to automatic driving has been actively carried out. The automatic driving technologies enable automatic traveling on roads using various sensors such as cameras and position detection means provided in a vehicle (automobile), and rapid spread of the technologies is expected in the future.

However, at present, automatic driving is in a development stage, and it is considered that it takes time to enable 100% automatic driving, and it is predicted that the vehicle travels appropriately switching automatic driving and manual driving by a driver for a while.

For example, on a straight road with a sufficient road width such as an expressway, the vehicle travels in an automatic driving mode. However, in a case where the vehicle leaves the expressway and stops at a desired position in a parking lot, or in a mountain road with a narrow road width, it is predicted that mode switching is required to switch the mode to a manual driving mode and the vehicle travels by the driver's operation.

While the vehicle is executing the automatic driving, the driver does not need to direct the line-of-sight forward in a vehicle traveling direction, and can freely take action such as dozing, watching television, reading a book, or sitting backward and talking with a person in a back seat, for example.

In the vehicle that travels switching the automatic driving and the manual driving, in a case where necessity to switch the automatic driving mode to the manual driving mode occurs, it is necessary to cause the driver to start the manual driving.

However, for example, when the driver falls asleep during the execution of the automatic driving, an arousal level of the driver decreases. That is, a consciousness level is lowered. If the mode is switched to the manual driving mode in a state where the arousal level is lowered, normal manual driving cannot be performed, and an accident may occur in the worst case.

To secure the safety of driving, it is necessary to cause the driver to start the manual driving in a state where the driver's arousal level is high, that is, in a state where the driver is clearly conscious.

For this purpose, even during the execution of the automatic driving, it is necessary to execute observation (monitoring) of the driver and acquire data for determining an arousal state of the driver.

Note that, as a conventional technique that discloses a driver monitoring configuration, there is, for example, Patent Document 1 (Japanese Patent Application Laid-Open No. 2013-206031). Patent Document 1 discloses a configuration in which a driver is captured by a camera mounted on a vehicle, and a behavior of the driver is evaluated on the basis of the captured image.

Meanwhile, in recent years, regulations for handling of personal information have been established in countries, and there is a tendency that severe restrictions are imposed on processing for disclosing personal information and processing for recording personal information. For example, regulations for handling of personal information have been established in the countries of the world, such as the Personal Information Protection Act in Japan, and the European Union (hereinafter referred to as EU) general data protection regulation (hereinafter referred to as GDPR or general data protection regulation) in the countries of the EU.

Some of these personal information protection regulations include a regulation that does not permit an image captured by a camera attached to a vehicle to be directly recorded in a storage means or a server. For example, the GDPR, which is a protection regulation of the EU, does not allow such image recording.

However, there are many opinions that a driver image and an externally captured image captured by a camera are effective evidence of identification of an accident cause and accident liability and traffic violation in a case where a traffic accident occurs, and image recording is necessary.

CITATION LIST

Patent Document

Patent Document 1: Japanese Patent Application Laid-Open No. 2013-206031
Patent Document 2: International Publication WO2019/097944

SUMMARY OF THE INVENTION

Problems to be Solved by the Invention

The present disclosure has been made in view of the above-described problems, for example, and an object thereof is to provide an information processing device, a mobile device, an information processing system, a method, and a program capable of acquiring and recording observation information inside and outside a vehicle such as a driver while maintaining confidentiality of personal information.

Note that, in the present description, an embodiment mainly according to the EU's personal information protection regulation will be described, but recording permission information and non-permission information defined by the personal information protection regulations are different depending on countries and regions. Furthermore, the personal information protection regulations themselves are expected to change with the times.

The observation information to be abstracted or encrypted described in the present description is not limited to the example according to the EU's regulation described in the following embodiment and can be determined according to regulations that are actually effective in a country or region to which the processing of the present disclosure is applied.

Solutions to Problems

The first aspect of the present disclosure resides in
an information processing device including:
a driver information acquisition unit configured to acquire observation information of a driver of a vehicle; and
a data processing unit configured to input the observation information and execute data processing, in which
the data processing unit
divides the observation information into conversion unnecessary data and conversion necessary data, and
executes data conversion processing of at least one of abstraction processing or encryption processing for the conversion necessary data, and stores conversion data of at least one of generated abstraction data or generated encryption data in a storage unit.

Moreover, the second aspect of the present disclosure resides in
a mobile device capable of switching automatic driving and manual driving, the mobile device including:
a driver information acquisition unit configured to acquire observation information of a driver of a vehicle; and
a data processing unit configured to input the observation information and execute data processing, in which
the data processing unit
divides the observation information into conversion unnecessary data and conversion necessary data,
executes data conversion processing of at least one of abstraction processing or encryption processing for the conversion necessary data, and stores conversion data of at least one of generated abstraction data or generated encryption data in a storage unit, and
calculates a driver evaluation value that is an index value indicating whether or not the driver is in a state of being able to start the manual driving on the basis of the observation information, and stores the calculated driver evaluation value in the storage unit as the conversion unnecessary data.

Moreover, the third aspect of the present disclosure resides in
an information processing system including: a vehicle; and an information terminal, in which
the vehicle
acquires observation information of a driver of a vehicle,
divides the acquired observation information into conversion unnecessary data and conversion necessary data, and
executes data conversion processing of at least one of abstraction processing or encryption processing for the conversion necessary data and executes processing of storing conversion data of at least one of generated abstraction data and generated encryption data in a storage unit in association with identification information of the driver, and
the information terminal
acquires the abstraction data from the storage unit and displays the abstraction data on a display unit of the information terminal, and
identifies the driver on the basis of the identification information of the driver associated with the displayed abstraction data.

Moreover, the fourth aspect of the present disclosure resides in
an information processing method executed in an information processing device, the information processing method including:
by a driver information acquisition unit, acquiring observation information of a driver of a vehicle; and
by a data processing unit,
dividing the observation information into conversion unnecessary data and conversion necessary data; and
executing data conversion processing of at least one of abstraction processing or encryption processing for the conversion necessary data, and storing conversion data of at least one of generated abstraction data or generated encryption data in a storage unit.

Moreover, the fifth aspect of the present disclosure resides in
an information processing method executed in an information processing system including a vehicle and an information terminal, the information processing method including:
by the vehicle,
acquiring observation information of a driver of a vehicle;
dividing the acquired observation information into conversion unnecessary data and conversion necessary data; and
executing data conversion processing of at least one of abstraction processing or encryption processing for the conversion necessary data and executing processing of storing conversion data of at least one of generated abstraction data and generated encryption data in a storage unit in association with identification information of the driver; and
by the information terminal,
acquiring the abstraction data from the storage unit and displaying the abstraction data on a display unit of the information terminal; and
identifying the driver on the basis of the identification information of the driver associated with the displayed abstraction data.

Moreover, the sixth aspect of the present disclosure resides in
a program for causing information processing to be executed in an information processing device, the program for causing:
a driver information acquisition unit to acquire observation information of a driver of a vehicle; and
a data processing unit
to divide the observation information into conversion unnecessary data and conversion necessary data; and
to execute data conversion processing of at least one of abstraction processing or encryption processing for the conversion necessary data, and to execute processing of storing conversion data of at least one of generated abstraction data or generated encryption data in a storage unit.

Note that the program according to the present disclosure is, for example, a program that can be provided by a storage medium or a communication medium provided in a computer readable format to an information processing device or a computer system that can execute various program codes. By providing such a program in the computer readable format, processing according to the program is implemented on the information processing device or the computer system.

Still other objects, features, and advantages of the present disclosure will become clear from more detailed description based on embodiments and attached drawings of the present disclosure to be described below. Note that a system in the present description is a logical aggregate configuration of a plurality of devices, and is not limited to devices having respective configurations within the same housing.

According to a configuration of an embodiment of the present disclosure, individually-identifiable data included in observation information of a driver or the like of a vehicle or data for which recording processing is not permitted in a personal information protection regulation is abstracted or encrypted and recorded.

Specifically, for example, a driver information acquisition unit that acquires the observation information of the driver of the vehicle and a data processing unit that inputs the observation information and executes data processing are included. The data processing unit divides the observation information into conversion unnecessary data and conversion necessary data, executes abstraction processing or encryption processing for the conversion necessary data, and stores conversion data such as generated abstraction data or generated encryption data in a storage unit. The data processing unit extracts the individually-identifiable data included in the observation information or the data for which recording processing is not permitted in the personal information protection regulation as the conversion necessary data, and executes the abstraction processing or the encryption processing.

With this configuration, it becomes possible to record data effective for clarifying responsibility for accidents and violations without violating the personal information protection regulation.

Note that the effects described in the present description are merely examples and are not limited, and additional effects may be exhibited.

BRIEF DESCRIPTION OF DRAWINGS

FIG. 4 is a diagram for describing an example of data displayed on a display unit of the mobile device of the present disclosure.

FIGS. 5A and 5B are diagrams illustrating processing executed by the mobile device of the present disclosure.

FIGS. 10A, 10B, 10C, and 10D are diagrams for describing information processing for displaying a traveling section in a traveling route.

FIGS. 11A, 11B, and 11C are diagrams illustrating an example of traveling section display to be finally displayed.

FIGS. 12A, 12B, 12C, and 12D are diagrams illustrating an example (example of scrolling) of a change in traveling section display with the passage of time.

FIG. 14 is a diagram for describing an example of information acquired by the driver information acquisition unit and the environment information acquisition unit.

FIG. 15 is a diagram for describing a setting example of sensors such as cameras for acquiring driver information.

FIGS. 17A, 17B, 17C, and 17D are diagrams for describing examples of driver's posture information that can be analyzed on the basis of data acquired from the driver information acquisition unit.

FIG. 18 is a diagram illustrating an example of eyeball activation data that can be analyzed on the basis of data acquired from the driver information acquisition unit.

FIGS. 25A, 25B, 25C, and 25D are diagrams for describing examples of transition of a state change and transition timing according to different initial states of the driver.

FIG. 26 is a diagram for describing information acquired by the driver information acquisition unit in a vehicle that transitions from the automatic driving to the manual driving, a use example thereof, and the like.

FIG. 31 is a diagram for describing a hardware configuration example of an information processing device, a server, and an information terminal.

MODE FOR CARRYING OUT THE INVENTION

Figure 1:
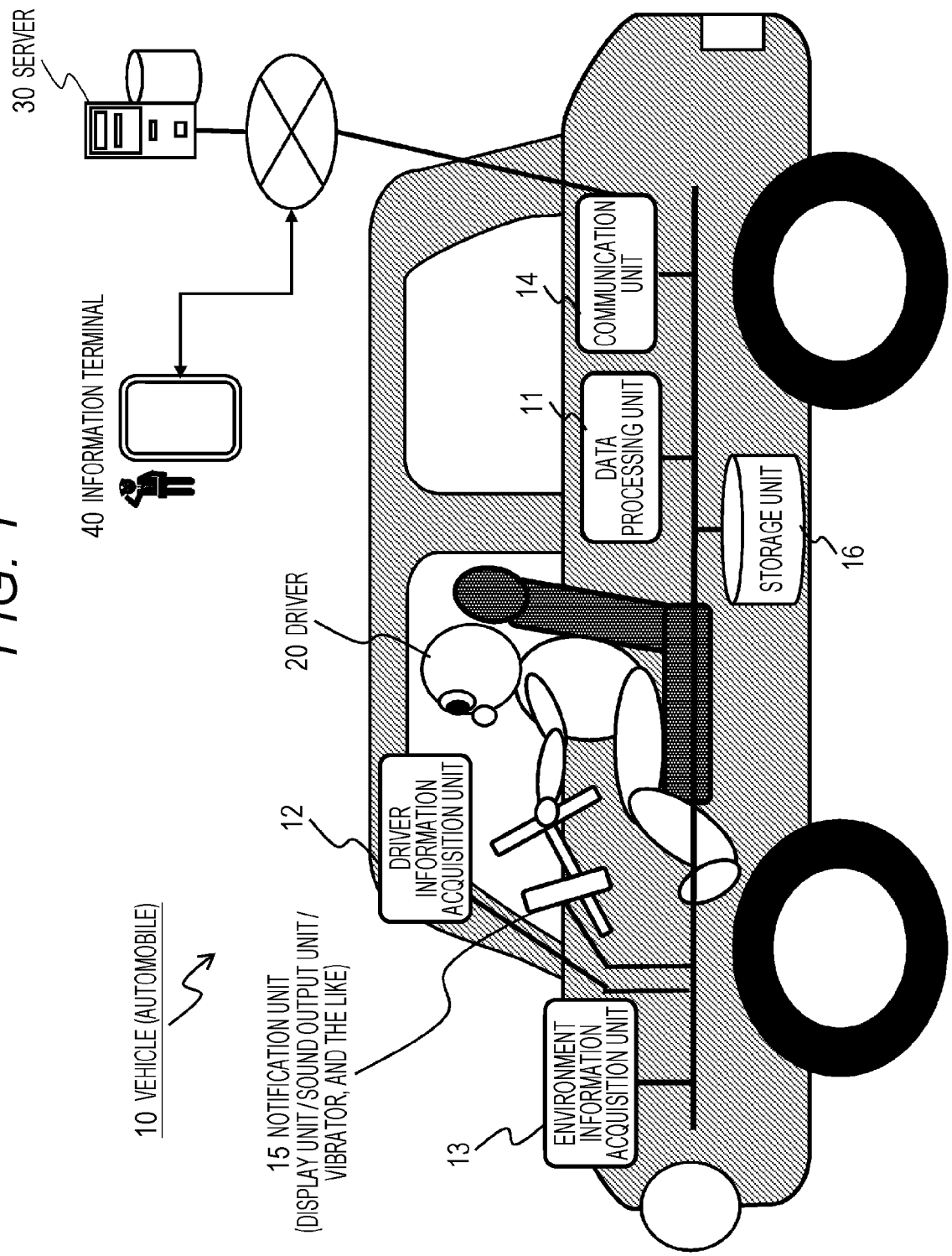
FIG. 1 is a diagram for describing a configuration example of a mobile device of the present disclosure.

Hereinafter, an information processing device, a mobile device, an information processing system, a method, and a program of the present disclosure will be described in detail with reference to the drawings. Note that the description will be given according to the following items.

1. Outline of Configurations and Processing of Mobile Device and Information Processing Device of Present Disclosure
2. Mode Switching Sequence from Automatic Driving Mode to Manual Driving Mode
3. Operation Sequence Example of Automatic Driving
4. Specific Example of Traveling Section Display Data
5. Details of Observation Processing (Monitoring Processing) for Driver or the like and Recording Processing for Acquired Information
6. Configuration and Processing of Information Terminal Owned by Traffic Crackdown Officer of Police or the like
7. Configuration for Calculating and Using Driver Evaluation Value for Determining Whether or Not Switching from Automatic Driving to Manual Driving is Possible Using Observation Information
8. Configuration Example of Mobile Device (Vehicle)
9. Configuration Example of Information Processing Device
10. Conclusion of Configurations of Present Disclosure

[1. Outline of Configurations and Processing of Mobile Device and Information Processing Device of Present Disclosure]

First, an outline of configurations and processing of a mobile device and an information processing device of the present disclosure will be described with reference to FIG. 1 and the subsequent drawings.

The mobile device and the information processing device of the present disclosure are devices capable of collecting observation information of a driver of a vehicle (automobile) and of inside and outside of the vehicle and recording the collected observation information in a storage unit while maintaining confidentiality of personal information.

Note that the mobile device of the present disclosure may be any vehicle (automobile) such as an automatically driven vehicle, a manually driven vehicle, or a vehicle capable of traveling by switching automatic driving and manual driving.

Note that, in the following description, an example of using a vehicle capable of traveling by switching automatic driving and manual driving will be described as a representative example of the mobile device of the present disclosure.

In such an automobile, in a case where necessity to switch an automatic driving mode to a manual driving mode occurs, it is necessary to cause a driver to start the manual driving.

During the execution of the automatic driving, the driver does not need to be engaged in driving, and can perform various works (tasks) other than driving. Note that, hereinafter, a task (work) other than driving performed by the driver is referred to as a secondary task.

There are various secondary tasks that the driver can perform during the automatic driving. For example, there are a case where the driver is gazing at the front of the vehicle while the driver is merely releasing a steering wheel, similarly to the case of driving, a case where the driver is reading a book, and a case where the driver is dozing.

An arousal level (consciousness level) of the driver varies depending on the difference in these types of processing.

For example, dozing reduces the driver's arousal level. That is, the consciousness level is lowered. In such a state where the arousal level is lowered, normal manual driving cannot be performed, and if the mode is suddenly switched to the manual driving mode in the state, an accident may occur in the worst case.

To secure the safety of driving, it is necessary to cause the driver to start the manual driving in a state where the driver's arousal level is high, that is, in a state where the driver is clearly conscious.

For this purpose, even during the execution of the automatic driving, it is necessary to execute observation (monitoring) of the driver and acquire data capable of determining an arousal state of the driver.

Furthermore, regardless of whether the vehicle is an automatically driven vehicle or a manually driven vehicle, the observation information of the driver is important information for clarifying where responsibility lies for an accident and the presence or absence of violation.

Note that, for example, data recording requirements for analysis of accidents and the like involving automatic driving are being developed in the data storage system for automated driving (DSSAD) in the world forum for harmonization of vehicle regulations working party by the United Nations that are related to vehicle authentication of automobiles.

However, as described above, for example, when a driver is captured by a camera mounted on a vehicle and the captured image is stored in a storage means as it is, personal information may be leaked to a third party. For example, the general data protection regulation (GDPR) of the EU prohibits the storage means from storing the captured image of the driver or the like as it is.

If the driver's image cannot be recorded at all, it is difficult to obtain physical evidence that clarifies the driver's accident liability at the time of accident or the like.

The mobile device and the information processing device of the present disclosure to be described below are devices capable of collecting observation information of the driver and of inside and outside of the vehicle while maintaining confidentiality of personal information.

Configurations and processing of the mobile device and an information processing device mountable to the mobile device of the present disclosure will be described with reference to FIG. 1 and the subsequent drawings.

FIG. 1 is a diagram illustrating a configuration example of an automobile 10 that is an example of the mobile device of the present disclosure.

An information processing device of the present disclosure is mounted to the vehicle (automobile) 10 illustrated in FIG. 1.

The vehicle 10 illustrated in FIG. 1 is an automobile capable of driving in two driving modes of the manual driving mode and the automatic driving mode.

In the manual driving mode, traveling based on an operation of a driver 20, that is, an operation of a steering wheel (steering), an operation of an accelerator, a brake, or the like is performed.

Meanwhile, in the automatic driving mode, the operation by the driver 20 is unnecessary, and driving based on sensor information of a position sensor and other ambient information detection sensors is performed.

The position sensor is, for example, a GPS receiver or the like, and the ambient information detection sensor is, for example, a camera, a stereo camera, a ToF sensor, an ultrasonic sensor, a radar, a light detection and ranging or a laser imaging detection and ranging (LiDAR), a sonar, or the like.

Note that FIG. 1 is a diagram for describing an outline of the present disclosure and schematically illustrates main configuration elements. Detailed configurations will be described below.

As illustrated in FIG. 1, the vehicle 10 includes a data processing unit 11, a driver information acquisition unit 12, an environment information acquisition unit 13, a communication unit 14, a notification unit 15, and a storage unit 16.

The driver information acquisition unit 12 acquires, for example, information for determining the arousal level of the driver, state information of the driver, and the like.

The driver information acquisition unit 12 includes various sensors for detecting information inside the vehicle. Specifically, for example, the driver information acquisition unit 12 includes an imaging device that images a driver, a biosensor that detects biometric information of the driver, a microphone that collects sound in the interior of the vehicle, and the like. The biosensor is provided on, for example, a seating surface, a steering wheel, or the like, and detects a seating state of an occupant sitting on a seat or biometric information of the driver holding the steering wheel.

As a vital signal, diversified observable data is available such as heart rate, pulse rate, blood flow, respiration, mind-body correlation, visual stimulation, EEG, sweating state, head posture behavior, eye, gaze, blink, saccade, microsaccade, fixation, drift, stare, percentage of eye closure evaluation value (PERCLOS), and iris pupil reaction.

Note that saccade and microsaccade are eyeball action information. The eyeball behavior includes a behavior based on a reflective behavior that cancels rotational movement or the like associated with movement by the semicircular canals, and a saccade action that moves the central field of view at a high speed with respect to risk information of a moving body captured in the peripheral field of view.

Moreover, since determination based on memory is performed in the process of perceiving, recognizing, and determining a target captured almost in the central field of view, behavior such as fixation, and microsaccade, tremor, and drift in the vicinity of the fixation progresses. If other attention attraction events are equal to or less than a certain level, the driver directs his/her line-of-sight to the target while perceiving, recognizing, and determining the target captured in the central field of view.

In particular, since the latter recognition and determination behavior are greatly related to understanding in the brain, it is possible to estimate the arousal state on the basis of an observation result. Factor by which the saccade action for moving the line-of-sight to a new target is performed is another risk factor for entering the peripheral field of view, a stimulus associated with sound such as a siren, an impact, or a stimulus associated with memory, and there are various expression factors. As a result, detection of the eyeball behavior, an occurrence frequency, and a duration of the eyeball behavior have a large individual difference even if there is a tendency such as a situation, driving experience, and a degree of fatigue. Meanwhile, regarding recovery quality of the arousal level of the driver, the arousal level of the driver can be evaluated with reference to stabilization behavior under steady arousal.

Figure 2:
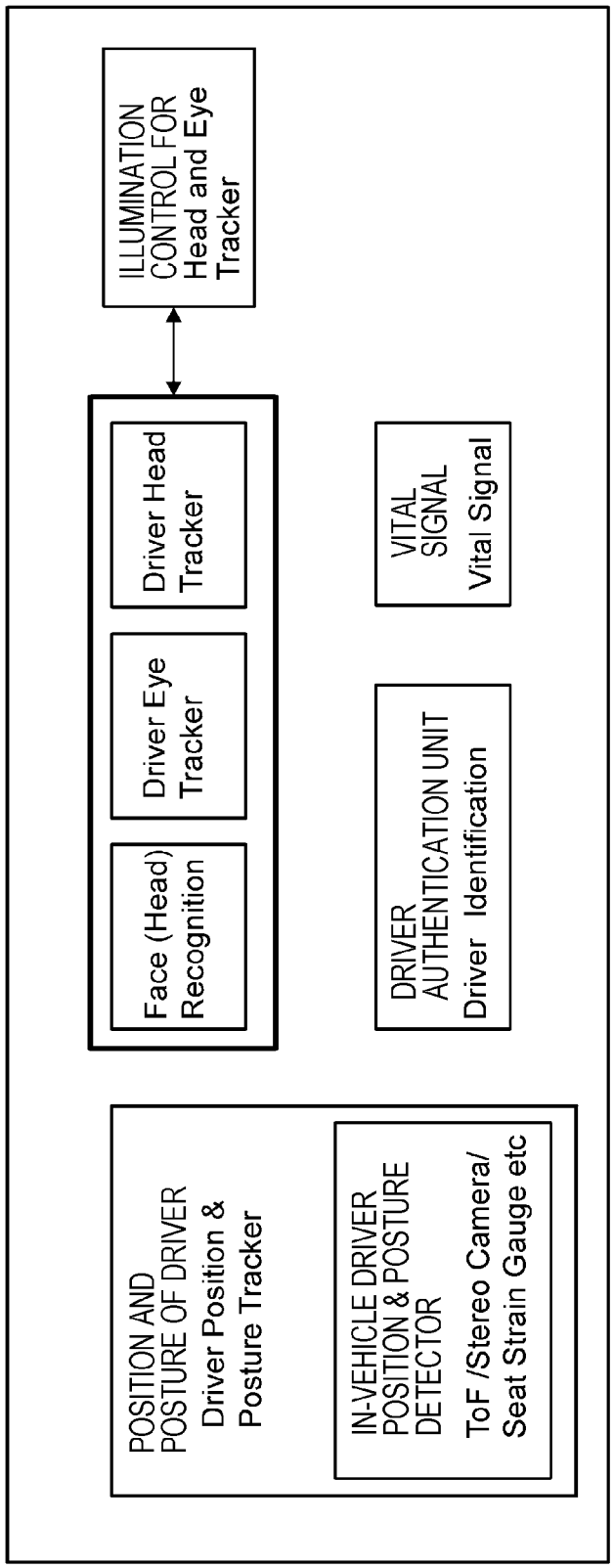
FIG. 2 is a diagram for describing a configuration example of a driver information acquisition unit of the mobile device of the present disclosure.

FIG. 2 illustrates an example of various sensors for obtaining information of the driver inside the vehicle included in the driver information acquisition unit 12. For example, the driver information acquisition unit 12 includes a camera, a stereo camera, a ToF sensor, a seat strain gauge, and the like as detectors for detecting the position and posture of the driver. Furthermore, the driver information acquisition unit 12 includes a face recognition device (face (head) recognition), a driver eye tracker, a driver head tracker, and the like, as detectors for obtaining activity observable information of the driver.

Furthermore, the driver information acquisition unit 12 includes a vital signal detector as a detector for obtaining activity observable information of the driver. Furthermore, the driver information acquisition unit 12 includes a driver authentication (driver identification) unit. Note that, as an authentication method, biometric authentication using a face, a fingerprint, an iris of a pupil, a voiceprint, or the like can be considered in addition to knowledge authentication using a password, a personal identification number, or the like.

The environment information acquisition unit 13 acquires a user's own car state and travel environment information of the vehicle 10: For example, image information of the front, rear, right, and left of the automobile, position information by GPS, surrounding obstacle information from the light detection and ranging or the laser imaging detection and ranging (LiDAR), the sonar, or the like, and the like.

The environment information acquisition unit 13 includes various sensors for detecting the state of the user's own car and the like. Specifically, for example, the environment information acquisition unit 13 includes a gyro sensor, an acceleration sensor, an inertial measurement device (IMU), sensors for detecting an operation amount of an accelerator pedal, an operation amount of a brake pedal, a steering angle of a steering wheel, an engine speed, a motor speed, a rotation speed of wheels, or the like, and the like.

Furthermore, for example, the environment information acquisition unit 13 includes various sensors for detecting information outside the user's own car. Specifically, for example, the environment information acquisition unit 13 includes imaging devices such as a time of flight (ToF) camera, a stereo camera, a monocular camera, an infrared camera, and other cameras. Furthermore, for example, the environment information acquisition unit 13 includes an environment sensor for detecting a weather, a meteorological phenomenon, or the like, and an ambient information detection sensor for detecting an object around the user's own car. The environment sensor includes, for example, a raindrop sensor, a fog sensor, a sunshine sensor, a snow sensor, and the like. The ambient information detection sensor includes, for example, an ultrasonic sensor, a radar, a light detection and ranging or laser imaging detection and ranging (LiDAR) device, a sonar, or the like.

Figure 3:
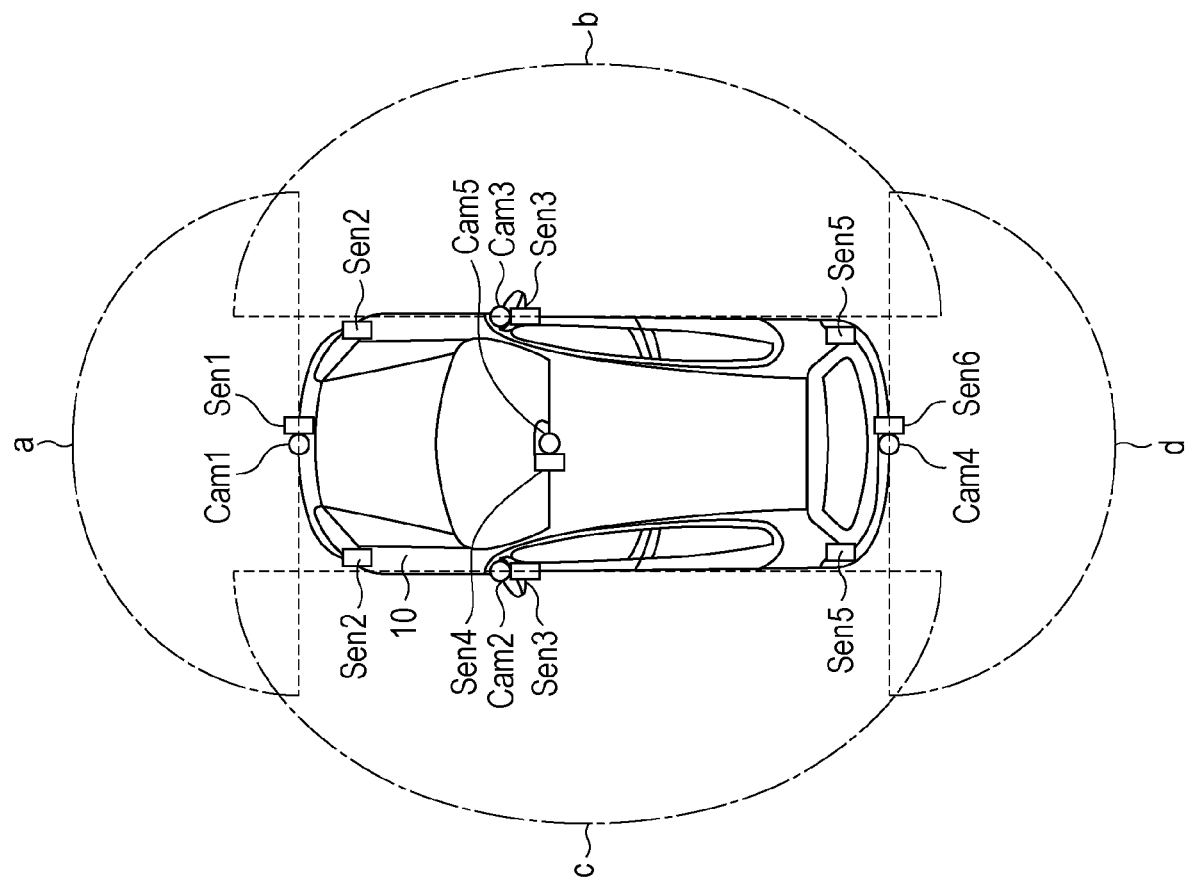
FIG. 3 is a diagram for describing a sensor configuration example of an environment information acquisition unit of the mobile device of the present disclosure.

For example, FIG. 3 illustrates an installation example of the various sensors for detecting external information of the user's own car. Cam1, Cam2, Cam3, Cam4, and Cam5 are imaging devices (cameras). The camera is provided at at least one position of a front nose, side mirrors, a rear bumper, a back door, or an upper portion of a windshield in the interior of the vehicle 10, for example.

The imaging device Cam1 provided at the front nose and the imaging device Cam5 provided at an upper portion of the windshield in the interior of the vehicle mainly acquire front images of the vehicle 10. The imaging devices Cam2 and Cam3 provided at the side mirrors mainly acquire side images of the vehicle 10. The imaging device Cam4 provided at the rear bumper or the back door mainly acquires a rear image of the vehicle 10. The imaging device Cam5 provided at the upper portion of the windshield in the interior of the vehicle is mainly used for detecting a preceding vehicle, a pedestrian, an obstacle, a traffic signal, a traffic sign, a lane, or the like. Furthermore, in the future automatic driving, the imaging devices may be used in an extended manner up to pedestrians crossing a road beyond the right or left-turn road in a wider range or an object range near a crossing road when the vehicle turns right or left.

Note that FIG. 3 illustrates an example of capture ranges of the imaging devices Cam1, Cam2, Cam3, and Cam4. An imaging range a indicates an imaging range of the imaging device Cam1 provided at the front nose, imaging ranges b and c respectively indicate imaging ranges of the imaging devices Cam2 and Cam3 provided at the side mirrors, and an imaging range d indicates an imaging range of the imaging device Cam4 provided at the rear bumper or the back door. For example, a bird's-eye view image of the vehicle 10 as viewed from above, and an all-round stereoscopic display image surrounding a vehicle periphery with a curved plane, and the like can be obtained by superimposing image data imaged in the imaging devices Cam1, Cam2, Cam3, and Cam4.

Sen1, Sen2, Sen3, Sen4, Sen5, and Sen6 illustrated in the drawing are sensors. For example, the sensors are ultrasonic sensors, radars, or the like.

These sensors are provided at the front, rear, side, corner, and upper portion of the windshield in the interior of the vehicle 10. Sensors Sen1, Sen4, and Sen6 provided at the front nose, the rear bumper, the back door, and the upper portion of the windshield in the interior of the vehicle 10 may be a LiDAR, for example. These sensors Sen1 to Sen6 are mainly used for detecting a preceding vehicle, a pedestrian, an obstacle, and the like. Results of the detections may be further applied to improvement of stereoscopic object display of the bird's-eye view display and the all-round stereoscopic display of the captured image by the camera.

The data processing unit 11 performs automatic driving control processing. Moreover, driver information acquired by the driver information acquisition unit 12 and environment information such as vehicle information and external information acquired by the environment information acquisition unit 13 are input, and abstraction processing, encryption processing, recording processing, analysis processing, and the like for the acquired information are executed.

Details of these pieces of processing will be described below.

The data processing unit 11 further calculates safety index values indicating the state of the driver in the vehicle, for example, whether or not the driver in the automatic driving vehicle is in a safe manual driving executable state, and moreover, whether or not the driver in the manual driving is executing safe driving, for example.

Moreover, for example, in a case where necessity of switching from the automatic driving mode to the manual driving mode arises, the data processing unit 11 executes processing of issuing notification for switching to the manual driving mode via the notification unit 15.

This notification processing timing is optimum timing calculated by analyzing the information input from the driver information acquisition unit 12 and the environment information acquisition unit 13, for example.

That is, it is the timing when the driver 20 can start safe manual driving.

Specifically, in a case where the arousal level of the driver is high, the notification is issued immediately before the manual driving start time, for example, five seconds before. In a case where the arousal level of the driver is low, the notification is issued twenty seconds before the manual driving start time with a margin, for example.

Calculation of the appropriate notification time is executed by the data processing unit 11 of the vehicle 10 or a server 30 illustrated in FIG. 1. Specifically, for example, an optimum notification time is calculated on the basis of learning data generated in advance.

The notification unit 15 includes a display unit that displays the notification, a sound output unit, or a vibrator of a steering wheel or a seat. An example of warning display displayed on the display unit constituting the notification unit 15 is illustrated in FIG. 4.

As illustrated in FIG. 4, the display unit 30 displays the following items.

Driving mode information="In automatic driving"

Warning display="Please switch driving to manual driving"

"In automatic driving" is displayed at the time of executing the automatic driving mode, and "In manual driving" is displayed at the time of executing the manual driving mode, in a display area of the driving mode information.

The display area of the warning display information is a display area where the following item is displayed while the automatic driving is executed in the automatic driving mode.

"Please switch driving to manual driving"

Note that, although this example explicitly states the description, the present invention is not limited to such text display, and for example, display using symbols such as a pictogram may be performed.

The storage unit 16 records the driver information acquired by the driver information acquisition unit 12 and the environment information such as the vehicle information and the external information acquired by the environment information acquisition unit 13.

Note that the data processing unit 11 performs the abstraction processing and the encryption processing for the acquired information for part of individually-identifiable information, for example, a face image or the biometric information, and then stores the information in the storage unit 16.

A key, a password, or the like applied to the encryption processing is, for example, data known only by the driver 20.

The encryption data stored in the storage unit 16 can be decrypted using the key, the password, or the like known only by the driver 20.

Note that the driver information acquired by the driver information acquisition unit 12 and the environment information such as the vehicle information and the external information acquired by the environment information acquisition unit 13, which are stored in the storage unit 16, may be transmitted to the server 30 via the communication unit 30 and stored in the storage unit in the server 30.

The information stored in the storage unit 16 or the server 30 is used for, for example, analysis processing of an accident cause in the event of an accident, evaluation processing of the driver, and the like.

As illustrated in FIG. 1, the vehicle 10 has a configuration capable of communicating with the server 30 and an external information terminal 40 via the communication unit 14.

The server 30 executes processing of providing road information to the vehicle 10, processing of storing the acquired information of the driver information acquisition unit 12 and the environment information acquisition unit 13 of the vehicle 10, and the like. These pieces of processing will be described in detail below.

The information terminal 40 is, for example, a terminal owned by an officer who cracks down traffic violation, such as a police officer, and is a terminal capable of acquiring and displaying the acquired information of the driver information acquisition unit 12 and the environment information acquisition unit 13 stored in the server 30 or the storage unit 16 in the vehicle 10. This specific processing will also be described below.

FIGS. 5A and 5B are diagrams illustrating specific examples of processing executed by the mobile device and the information processing device of the present disclosure.

FIGS. 5A and 5B are diagrams illustrating setting examples of appropriate timing of notification for requesting switching to the manual driving while the automatic driving is being executed in the automatic driving mode, and illustrates the following two notification processing examples.

FIG. 5A Notification processing in a case where the driver's arousal level during the automatic driving is high FIG. 5B Notification processing in a case where the driver's arousal level during the automatic driving is low The example FIG. 5A is an example in which the driver is looking at the road in front while executing the automatic driving. In this case, the driver's arousal level is high, that is, the user can start the manual driving at any time.

In such a case, even if the notification for switching to the manual driving is issued at timing immediately before the time when the manual driving is required, the driver can start safe manual driving soon.

The example FIG. 5B is an example in which the driver's arousal level is extremely low in a case where the driver is dozing while executing the automatic driving.

In such a case, if the notification for switching to the manual driving is issued at timing immediately before the time when the manual driving is required, the driver starts the manual driving in the state where consciousness is unclear, and there is a high possibility of causing an accident. Therefore, in a case where the arousal level is low, as described above, it is necessary to issue the notification of the switching to the manual driving at an earlier stage.

Figure 6A:
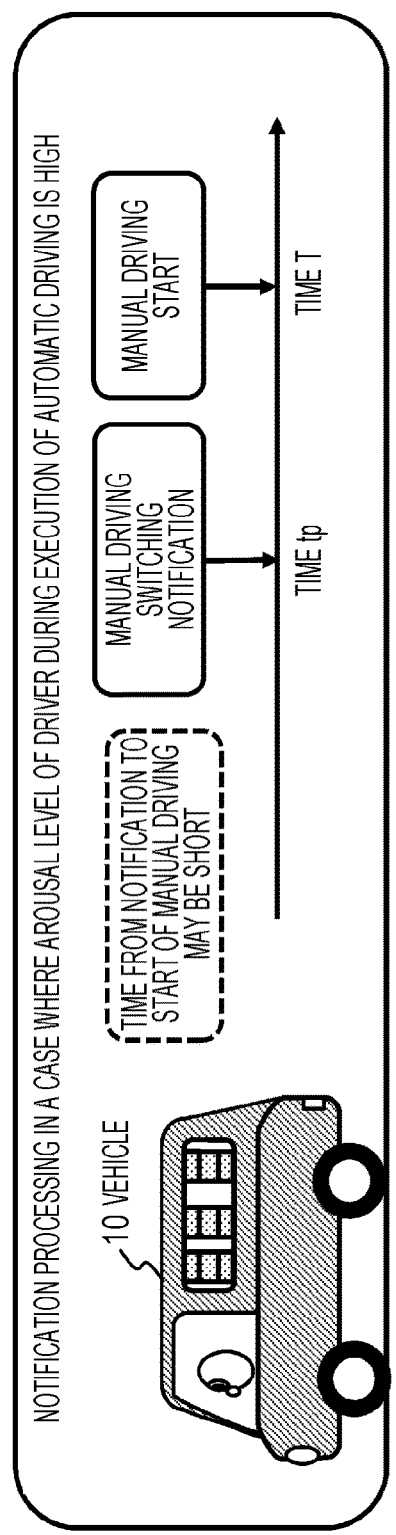
FIGS. 6A, 6B, and 6C are diagrams illustrating processing executed by the mobile device of the present disclosure.
Figure 6B:
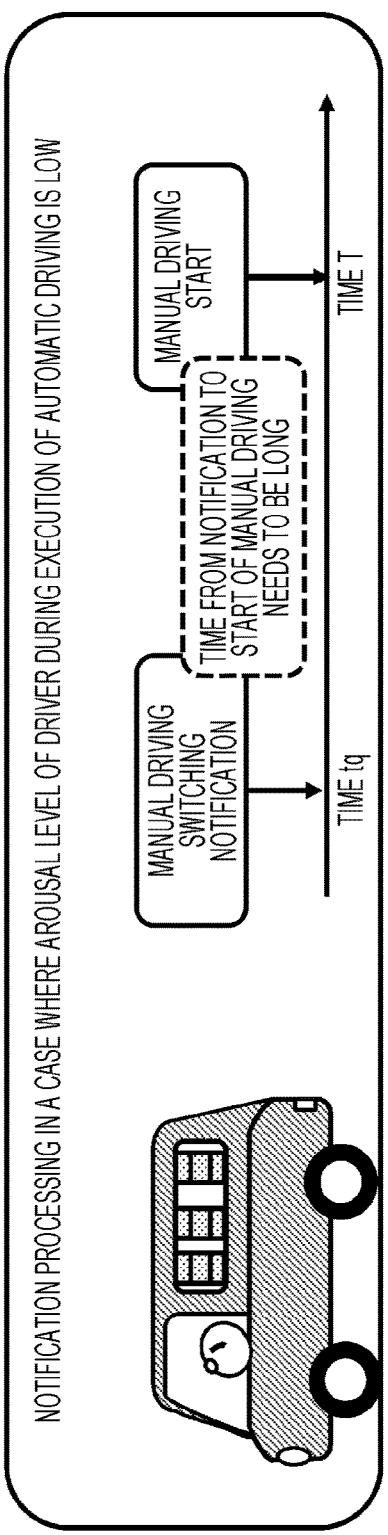
Figure 6C:
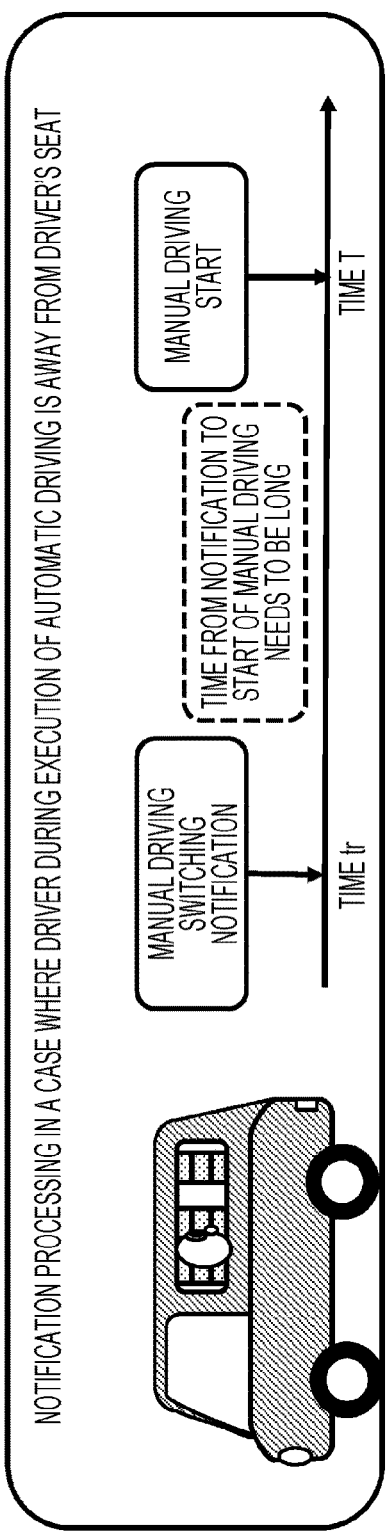

Moreover, for example, in a vehicle such as a home delivery vehicle having a luggage room and in which the driver can move to the luggage room and perform work during execution of the automatic driving, the notification timing for making the switching request to the manual driving is favorably set to be different depending on the following three types of cases as illustrated in FIGS. 6A, 6B, and 6C, for example.

FIG. 6A Notification processing in a case where the driver's arousal level during the automatic driving is high FIG. 6B Notification processing in a case where the driver's arousal level during the automatic driving is low FIG. 6C Notification processing in a case where the driver who is executing the automatic driving is away from the driver's seat The example FIG. 6A is an example in which the driver is looking at the road in front while executing the automatic driving. In this case, the driver's arousal level is high, that is, the user can start the manual driving at any time.

In such a case, even if the notification for switching to the manual driving is issued at timing immediately before the time when the manual driving is required, the driver can start safe manual driving soon.

The example FIG. 6B is an example in which the driver is dozing while executing the automatic driving, and in this case, the driver's arousal level is extremely low.

In such a case, if the notification for switching to the manual driving is issued at timing immediately before the time when the manual driving is required, the driver starts the manual driving in the state where consciousness is unclear, and there is a high possibility of causing an accident. Therefore, in a case where the arousal level is low, as described above, it is necessary to issue the notification of the switching to the manual driving at an earlier stage.

The example in FIG. 6C is an example in which the driver is away from the driver's seat and working during the automatic driving. In such a case, it takes time for the driver to return to the driver's seat.

In such a case, if notification for switching to the manual driving is issued at timing immediately before the time when the manual driving is required, there is a possibility that the vehicle approaches the manual driving section before the driver returns the driver's seat. Therefore, in a case where the driver is away from the driver's seat as described above, it is necessary to issue the notification of the switching to the manual driving at an earlier stage.

Note that, for easy understanding, the notification timing for switching to the manual driving has been described using an abstract expression such as "early" or "immediately before", but actually, the system (data processing unit) of the vehicle 10 learns behavior characteristics of the driver and the like in a patterned manner and calculates the optimum notification timing. For example, the system (data processing unit 11) estimates a driver arousal state based on an observation state of the driver, and calculates the notification time having a high probability of handover normal completion, using relationship data between distribution of time required to recover to driving generated in advance and a recovery success rate in the current traveling path.

Then, the notification is made at a point based on calculation and backward from arrival of a target handover point. Specifically, for example, the method described in Patent Document 2 (International Publication WO2019/097944), which is a prior patent application of the present applicant, that is, a method of learning recovery time distribution of a driver, estimating time required for recovery of the driver from a learning result, and calculating notification timing can be used. The following description will be given on the assumption that the vehicle-side system estimates the timing to recover for the driver, notifies the driver at the timing estimated by the system, and the driver recognizes and responds to the notification.

[2. Mode Switching Sequence from Automatic Driving Mode to Manual Driving Mode]

Next, a handover sequence from the automatic driving mode to the manual driving mode will be described.

Figure 7:
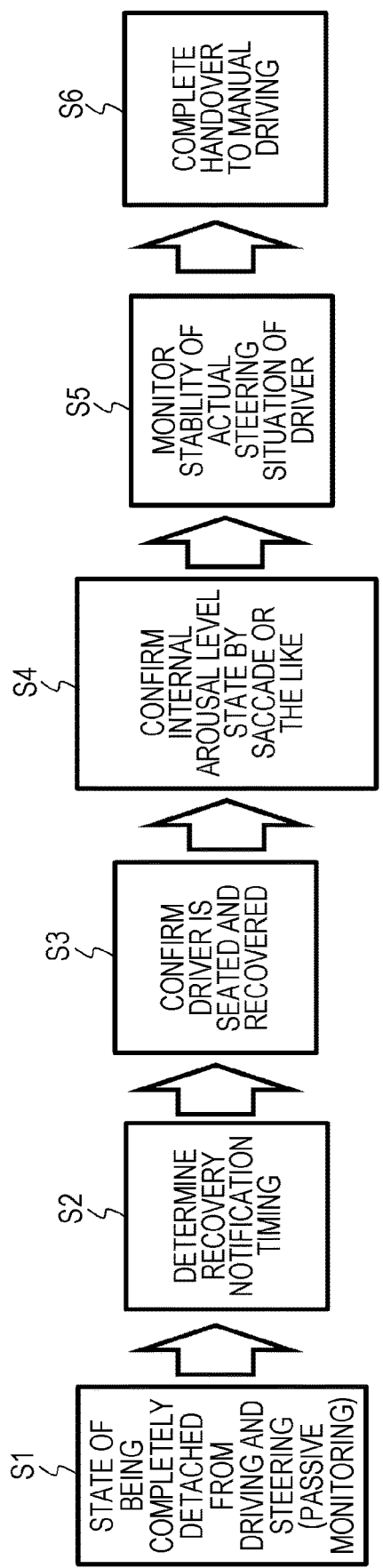
FIG. 7 is a diagram illustrating an example of a mode switching sequence from an automatic driving mode to a manual driving mode executed by the mobile device of the present disclosure.

FIG. 7 schematically illustrates an example of a mode switching sequence from the automatic driving mode to the manual driving mode executed in the data processing unit 11.

In step S1, the driver is in a state of being completely detached from the driving and steering. In this state, the data processing unit 11 executes monitoring processing (passive monitoring) based on information input from the driver information acquisition unit 12 and the environment information acquisition unit 13.

For example, the driver can execute a secondary task such as taking a nap, watching a video, concentrating on a game, and working with a visual tool such as a tablet or a smartphone. The work using the visual tool such as a tablet or a smart phone may be performed, for example, in a state where the driver's seat is displaced or in a seat different from the driver's seat.

Depending on the state of the driver, it is assumed that the time until the driver recovers to the manual driving greatly varies depending on the work content at that time when the vehicle approaches a section where the vehicle is required to recover to the manual driving on a route.

Step S2 is the timing of the manual driving recovery request notification described above with reference to FIG. 4. The data processing unit 11 analyzes the information input from the driver information acquisition unit 12 and the environment information acquisition unit 13 to calculate the optimum notification timing. Various aspects of notification processing to the driver are possible. For example, notification of the driving recovery is issued using dynamic haptics such as vibration or in a visual or auditory manner.

For example, the data processing unit 11 grasps the timing to issue the notification from monitoring information of a driver's steady state, and issues the notification at appropriate timing. That is, the system passively and constantly monitors the driver's secondary task execution state during a former passive monitoring period and can calculate optimum timing of the notification. It is desirable to continuously and constantly perform the passive monitoring in the period of step S1 and to calculate the recovery timing and issue the recovery notification according to recovery characteristics unique to the driver.

That is, it is desirable to learn the optimum recovery timing according to the recovery action pattern of the driver, the vehicle characteristics, and the like, and to present, to the driver, the statistically obtained optimum timing, which is required for the driver to normally recover from the automatic driving to the manual driving at a predetermined rate or higher. In this case, in a case where the driver does not responded to the notification for a certain period of time, a warning by sounding an alarm or the like is given.

In step S3, whether or not the driver has been seated and recovered is confirmed. In step S4, an internal arousal level state of the driver is confirmed by analyzing a face or an eyeball behavior such as saccade. In step S5, stability of an actual steering situation of the driver is monitored. Then, in step S6, the handover from the automatic driving to the manual driving is completed.

[3. Operation Sequence Example of Automatic Driving]

Next, an example of an operation sequence of the automatic driving will be described with reference to the flowchart illustrated in FIG. 8.

Figure 8:
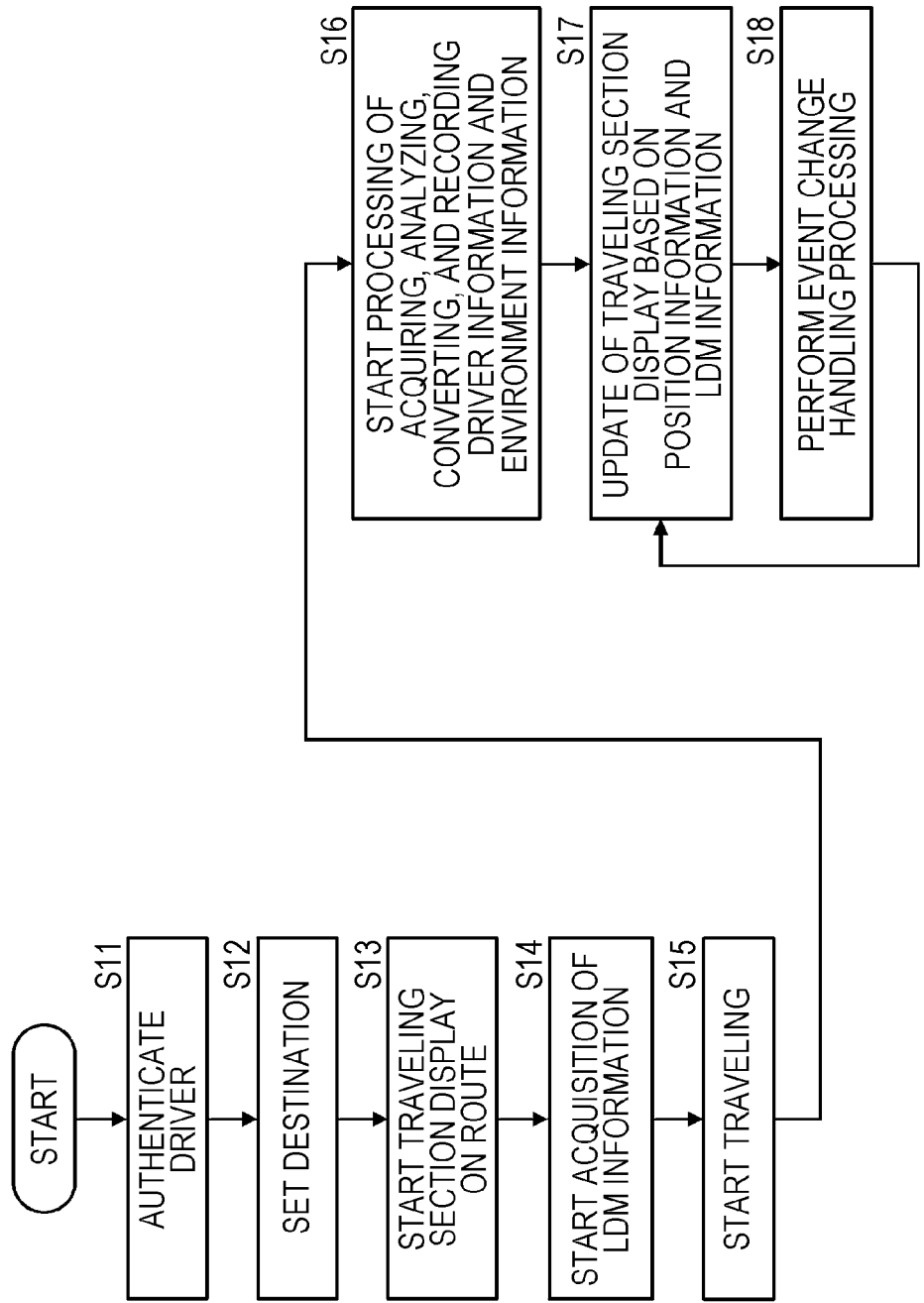
FIG. 8 is a diagram illustrating a flowchart for describing an example of an operation sequence of automatic driving.

The flowchart illustrated in FIG. 8 is a flowchart for describing an operation sequence of the automatic driving executed by the data processing unit 11 of the information processing device mounted on the vehicle 10.

First, in step S11, driver authentication is performed. This driver authentication is performed using knowledge authentication using a password, a PIN, or the like, biometric authentication using the face, a fingerprint, an iris of a pupil, a voiceprint, or the like, or the knowledge authentication and the biometric authentication together. By performing the driver authentication in this way, information for determining the notification timing can be accumulated in association with each driver even in a case where a plurality of drivers drives the same vehicle.

Next, in step S12, a destination is set by the driver's operation to the input unit. For example, the driver's input operation is performed on the basis of display on an instrument panel.

Note that the present embodiment has been described assuming the case where the driver gets in the vehicle and sets the itinerary. However, the driver may remotely make a reservation in advance using a smartphone before getting in the vehicle or using a personal computer before leaving home, for example. Moreover, the system of the vehicle may perform preplanning along a schedule assumed by the driver according to a schedule table, update and acquire the LDM information of the road environment, that is, the so-called local dynamic map (LDM) in which road traveling map information of the vehicle is updated with high density and on a constant basis, and display an advice of actual traveling at the time of or before getting in the vehicle, like a concierge, for example.

The local dynamic map (LDM) information is provided from the server 30, for example, and is sequentially updated according to the road situation.

Next, in step S13, display of a traveling section display on a traveling route is started.

Traveling section display data is display data including section information such as an automatically drivable section and a manual driving section (driver intervention required section) of a road planned to travel.

The driver can know that the manual driving section is approaching by viewing the traveling section display data.

This traveling section is displayed on the instrument panel and is also displayed with a work window on a tablet or the like on which the driver performs a secondary task, for example. As a result, the driver working on the work window can easily recognize a driver intervention required section and an automatically drivable section on the traveling route on a predicted arrival time axis from the current point.

In the traveling section display, a forward schedule and approach information to each point are presented. In the traveling section display, the driver intervention required section and the automatically drivable section on the traveling route are displayed on the predicted arrival time axis from the current point. Then, the driver intervention required section includes a manual driving section, a handover section from the automatic driving to the manual driving, and a cautioned traveling section from the automatic driving. Details of the traveling section display data will be described below.

Next, in step S14, acquisition of LDM update information is started. With the acquisition of LDM update information, content of the traveling section display can be changed to the latest state. Next, in step S15, traveling is started.

The processing of steps S16 to S18 is continuously executed along with the start of traveling.

In step S16, acquisition, analysis, conversion, and recording processing of the driver information and the environment information are started.

The data processing unit 11 illustrated in FIG. 1 inputs the observation information of the driver acquired by the driver information acquisition unit 12 and the environment information such as the vehicle information and the external information acquired by the environment information person acquisition unit 13, and starts analysis processing, conversion processing, and recording processing for the acquired information.

Note that, for example, in a case where there is data that is not permitted to be recorded as it is according to the personal information protection regulations, such as a face image, in the acquired information, the data processing unit 11 executes processing of executing the abstraction processing or the encryption processing for the data and recording the data in the storage unit 16 or the server 30.

To decrypt the encryption data stored in the storage unit 16 or the server 30, a key (such as a password) known only by the driver is required.

Details of the processing of acquiring, analyzing, converting, and recording the driver information and the environment information in step S16 will be described below.

Next, in step S17, display of the traveling section display is updated on the basis of the position information of the user's own car and the acquired LDM update information. As a result, the traveling section display is scrolled such that each section approaches the user's own car as the vehicle travels, for example.

A specific example of the traveling section display data will be described below.

Next, in step S18, event change handling processing is performed. The event change handling processing includes mode switching processing for responding to a case where a switching point between the automatic driving mode and the manual driving mode existing on the traveling route or the cautioned traveling section is approaching, event occurrence processing for responding to a case where the mode switching point or the driver intervention required section of the cautioned traveling section newly occurs on the traveling route, and the like. Hereinafter, the processing of steps S17 and S18 is appropriately repeated.

[4. Specific Example of Traveling Section Display Data]

Next, a specific example of the traveling section display data will be described.

As described above, the traveling section on the traveling route is displayed in step S13 of the flow illustrated in FIG. 8, and the processing of updating the traveling section display data is executed in step S17.

As described above, the traveling section display data is display data including section information such as an automatically drivable section and a manual driving section (driver intervention required section) of a road planned to travel.

The driver who is executing various secondary tasks during the execution of the automatic driving can know that the manual driving section is approaching by viewing the traveling section display data.

A specific example of the traveling section display data will be described with reference to FIG. 9 and subsequent drawings.

Note that this traveling section is displayed on the instrument panel and is also displayed with a work window on a tablet or the like on which the driver performs a secondary task, for example. As a result, the driver working on the work window can easily recognize a driver intervention required section and an automatically drivable section on the traveling route on a predicted arrival time axis from the current point.

Figure 9:
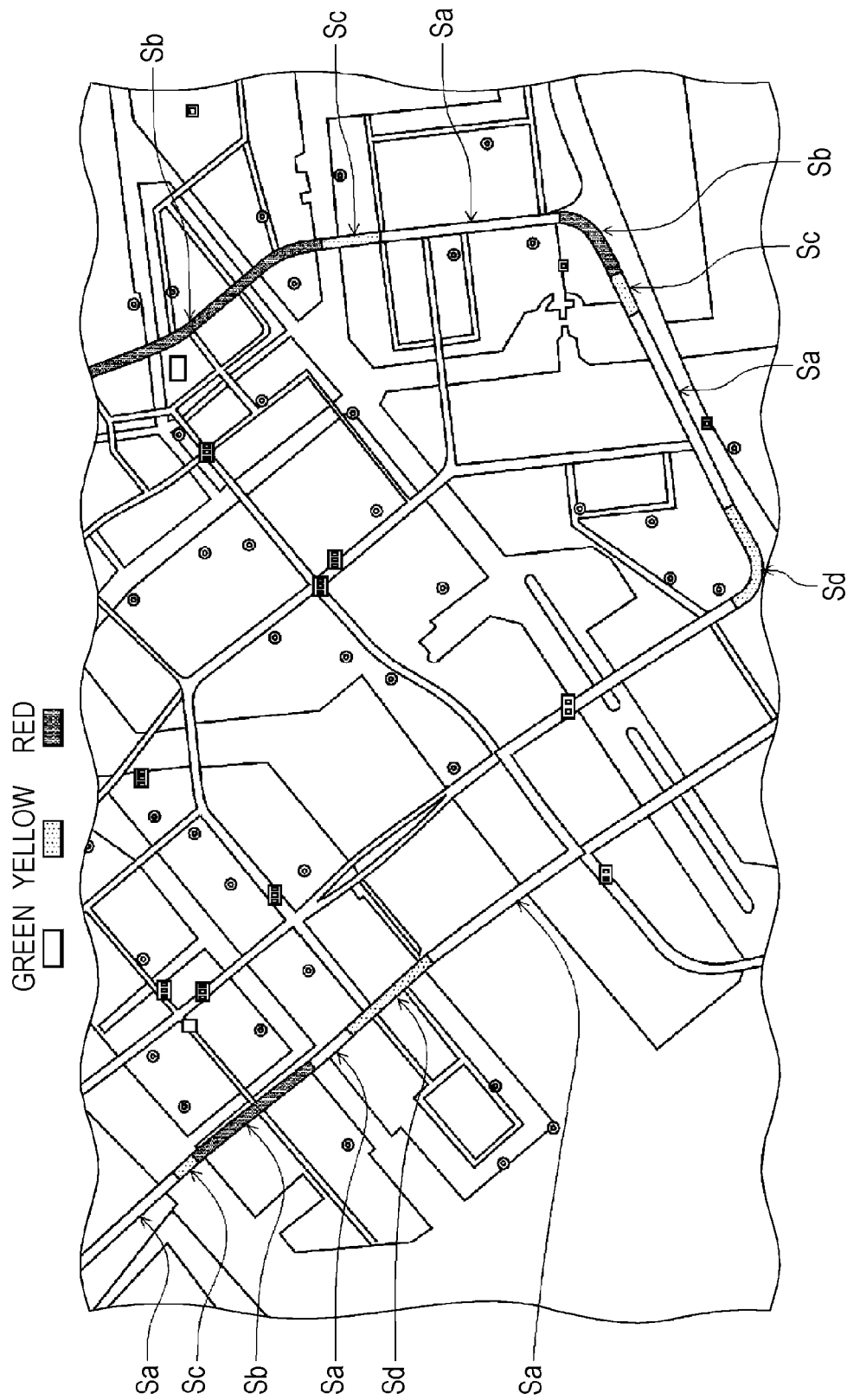
FIG. 9 is a diagram illustrating an example of a traveling route in which automatic driving available and unavailable sections determined as a driver sets a destination are set or determined in spots.

FIG. 9 illustrates an example of the traveling section display data displayed on the traveling route determined as the destination is determined by the driver. The traveling route includes an automatically drivable section Sa, a manual driving section Sb, a handover section Sc from the automatic driving to the manual driving, and a cautioned traveling section Sd from the automatic driving. Here, the handover section Sc always exists immediately before the manual driving section Sb, and the driver needs to be in a recoverable state to the manual driving. Furthermore, the cautioned traveling section Sd is a section in which the vehicle can travel while decelerating while keeping the automatic driving under caution of the driver who is in the recoverable state to the manual driving, for example.

In the illustrated example, the automatically drivable section Sa is illustrated in green, the manual driving section Sb is illustrated in red, and the handover section Sc and the cautioned traveling section Sd are illustrated in yellow. Note that, for the sake of convenience, each color is represented by a different pattern.

In the traveling section display in a display device such as a center information display or a tablet of the vehicle 10, each section on the traveling route as described above is displayed on the predicted arrival time axis from the current point. The data processing unit 11 processes the information for displaying the traveling sections on the traveling route on the basis of the traveling route information and traffic information.

FIG. 10A illustrates each section on the traveling route on a constant scale with a moving distance axis from the current point. FIG. 10B illustrates a flow velocity v(t) of average road traffic at each point. FIG. 10C is a diagram in which each section represented by the moving distance axis is converted into a time axis using the velocity v(t). As a result, each section on the traveling route is represented by the predicted arrival time axis from the current point. That is, each section on the traveling route can be represented by the time axis obtained by dividing the physical distance of the traveling route by the predicted average velocity of each corresponding section.

In this embodiment, the all sections displayed as the traveling sections are divided into three sections as illustrated in FIG. 10D, and the time axis of each section is changed. That is, a first section from the current point to a first point (time t0, for example, about 10 minutes) is displayed on a first time axis as a time linear display immediate section. For example, the time to is set to a time necessary and sufficient for a general driver to finish the secondary task and recover to driving. Since the immediate section approaching by traveling has a visual intuitive effect equivalent to that shown on a map traveling at a constant speed, there is an advantage that the driver can start preparation for accurate recovery to driving due to event approach and can intuitively grasp a point at which the driver starts the recovery with some accuracy. That is, the display purpose of this section is to provide the user with start determination information of an appropriate recovery point of the driver.

Furthermore, a second section from the first point (time t0) to a second point (time t1, for example, about 1 hour) is displayed as an inverse number display section of time with a time axis that is sequentially changed from the first time axis to a second time axis reduced at a predetermined ratio with respect to the first time axis. The display purpose of the second section is to provide the driver with accurate road conditions in a longer period in a narrow display because it is difficult to display the second section in a longer period in a narrow display space if the second section is mainly displayed at the same scale magnification as that of the previous first section. This makes it possible for the driver to easily grasp how many points in a certain section ahead do not require driving intervention as the vehicle travels, and there is an advantage that the driver can engage in the secondary task in a planned manner. The display enables effective driving intervention and also plays a role of important information presentation in release planning or the like from a secondary task or the like of the driver in the secondary task accompanying communication with a third party.

Here, in FIG. 10D, a method of setting the second display section will be described. When the height of the triangle is h0, the time t at the point before a leading end by h is obtained by the following equation (1).

$$t = t0 * h0 / \quad (1)$$

Furthermore, the second time axis at the second point (time t1) is reduced at a ratio of hs/h0 with respect to the first time axis. For example, in a case where hs=h0/8, the reduction rate is 1/8.

The display of the second display section described above corresponds to a display in which a traveling straight line expansion display section on a map is obliquely inclined in the traveling direction or a state in which the front of the road plane is obliquely viewed, in a case where the vehicle is traveling at a constant vehicle speed. In other words, since the visual effect of the display section can be intuitively understood at a display image height position, it can be said that an intuitive distance can be easily grasped without displaying a scale or the like of accurate position display on a screen. Then, although a far section is reduced, the far section is not a point to be immediately reached by traveling, and thus rough prediction is important but it is not necessary for the driver to intuitively grasp arrival time information as precise as that of a near point. Therefore, this display is suitable for making a secondary task execution plan.

Furthermore, a third section from the second point (time t1) to a third point (time t2) is displayed on the second time axis (reduction rate hs/h0) as a time linear display far section. By dividing and displaying the section into three sections in this manner, the driver can know the section information that is temporally closer in detail and can know the section information that is temporally farther, in a limited display space. Note that, if the display form of the second section is maintained and a distant part is displayed, the resolution becomes the visual resolution of human or less and further a display resolution limit of the system or less, information necessary for determining the secondary task plan cannot be discriminated, and the meaning of the display function is lost. Therefore, it is most effective to perform the display in which the reduction of the display scale is ended at a stage where the interval sense of time can be intuitively sufficiently grasped and the necessary intervening section and unnecessary section divisions are appropriately displayed, and the display is returned to the constant scale in the subsequent sections.

Note that the storage unit 16 of the vehicle 10 stores default values of the times t0, t1, and t3. Since it is also conceivable to set the values of the times t0, t1, and t3 separately for long distance driving and short distance driving, the number of the default value is not limited to one, and a plurality of types may be provided, and the driver (user) or the system may selectively use the default value according to the traveling route. Furthermore, it is also conceivable to allow the driver (user) to arbitrarily set the values of the times t0, t1, and t3.

FIGS. 11A and 11B illustrate examples of the traveling section display that is finally displayed. Note that the length of an arrow represents whether or not the time axis is linear, and further represents a change in the reduction rate on the time axis. In the case of FIG. 11A, all the sections of the first section, the second section, and the third section are displayed with a first width.

Meanwhile, in the case of FIG. 11B, the first section from the current point to the first point (time t0) is displayed with the first width, the second section from the first point (time t0) to the second point (time t1) is displayed with a width that is sequentially changed from the first width to a second width narrower than the first width, and the third section from the second point (time T1) to the third point (time T2) is displayed with the second width. As a result, the driver can visually recognize the degree of reduction in the time axis of the second section and the third section with respect to the first section.

That is, the display form of FIG. 11A is a display considering only the reduction rate in the traveling direction. Moreover, as illustrated in FIG. 11B, by perspectively changing the transverse width of the display information with respect to the traveling direction, the same perspective effect as viewing in an infinite direction along the traveling of the road or the map can be obtained, and the distribution of the driving intervention required sections can be more easily intuitively grasped than viewing the screen for a moment. In particular, in a case where only the second section is rotated counterclockwise and viewed, the display is comparable to the road width in front of the road and the arrival time at each corresponding point as if the vehicle is traveling at a constant speed, so that the arrival time to each point can be intuitively grasped without visually determining the accurate position memory on the display screen. Therefore, the driver can easily allocate the time for performing the secondary task, for example.

Note that, for example, in the part where the reduction rate hs/h0 is small as in the third section, if the section with a short time length is displayed with the time length as it is, the section is displayed very thin, and it is expected that it will be difficult for the driver to recognize the section. Therefore, even when the driver-intervening section (manual driving section, handover section, or cautioned traveling section) is actually less than or equal to a certain time length, the section is displayed with the certain time length. In this case, for example, when the handover section and the manual driving section are continuous, the display of the handover section may be omitted. In FIGS. 11A and 11B, the display of the first manual driving section Sb of the third section indicates such a state. As a result, in the third section with the significantly reduced time axis, the driver intervention required section having a short time length can be displayed in a driver recognizable manner.

Furthermore, in the part where the reduction rate hs/h0 is small as in the third section, in a case where the manual driving section Sb continues intermittently in a short cycle, the manual driving section Sb is displayed as a continuous manual driving section Sb. In FIGS. 11A and 11B, the display of the second manual driving section Sb of the third section indicates such a connected state. As illustrated in FIG. 11C, the manual driving section Sb displayed in this manner actually includes a handover section Sd and the automatically drivable section Sa for a short period in addition to the manual driving section Sb. Note that, as will be described below, when the point is double-touched, for example, in the state where the traveling section is displayed on a tablet or the like, details of the point can be displayed.

The above-described traveling section display in the traveling route is updated on the basis of the position information of the user's own car and the acquired LDM update information. As a result, the traveling section display is scrolled such that each section approaches the user's own car with the passage of time. FIGS. 12A, 12B, 12C, and 12D illustrate examples of changes in traveling section display with the passage of time. These examples illustrate examples in which the second section is displayed in a tapered manner, but the same applies to a case where all sections are displayed with the same width.

In this case, in the first section, the movement of each section is fast. In addition, in the second section, the reduction in the time axis is made smaller from the third section side to the first section side, so that the display movement in each section becomes faster. In addition, in the third section, the reduction in the time axis is large, so that the display movement in each section is slow.

[5. Details of Observation Processing (Monitoring Processing) for Driver or the Like and Recording Processing for Acquired Information]

Next, details of the observation processing (monitoring processing) for the driver or the like and the recording processing for the acquired information will be described.

As described above, for example, in the general data protection regulation (GDPR) that is the EU's personal information protection regulation, it is not permitted to record the face image of the driver captured by the camera mounted on the vehicle as it is in the storage unit.

The mobile device or the information processing device of the present disclosure abstracts or encrypts and records data determined to have a problem in terms of personal information protection, such as a face image in which an individual is identifiable, for example, when storing the observation information of the driver in the storage unit.

A configuration and processing to be executed of the data processing unit 11 of the information processing device mounted on the vehicle 10 as the mobile device of the present disclosure will be described with reference to FIG. 13.

Figure 13:
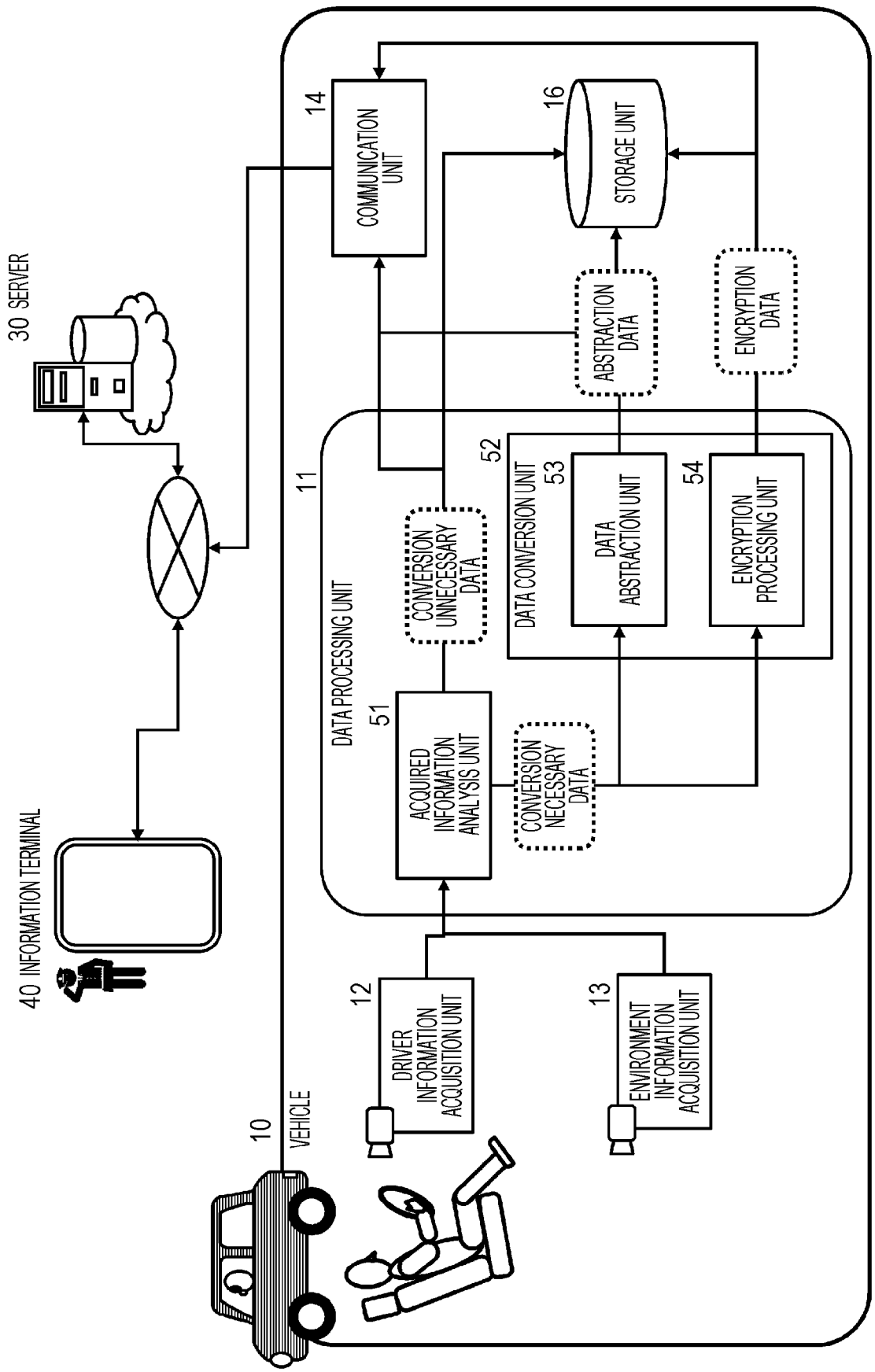
FIG. 13 is a diagram for describing a configuration and processing of a data processing unit of an information processing device mounted on the mobile device of the present disclosure.

FIG. 13 illustrates the vehicle 10, the server 30, and the information terminal 40 owned by a traffic crackdown executor such as a police officer. These components can communicate with each other via a network. A use configuration of the information terminal 40 will be described below.

FIG. 13 illustrates a detailed configuration of the data processing unit 11 of the vehicle 10. Note that the detailed configuration of the data processing unit 11 illustrated in FIG. 13 is not the entire configuration but a partial configuration of the data processing unit 11. That is, only the configuration applied to the processing executed by inputting the driver information acquired by the driver information acquisition unit 12, the environment information such as the vehicle information and the external information acquired by the environment information acquisition unit 13 is illustrated.

Hereinafter, observation information handling processing executed by the data processing unit 11 will be described with reference to FIG. 13.

The data processing unit 11 illustrated in FIG. 13 inputs the driver information acquired by the driver information acquisition unit 12 and the environment information such as the vehicle information and the external information acquired by the environment information acquisition unit 13, and executes the abstraction processing, encryption processing, recording processing, analysis processing, and the like for the acquired information.

As illustrated in FIG. 13, the data processing unit 11 includes an acquired information analysis unit 51 and a data conversion unit 52. The data conversion unit 52 includes a data abstraction unit 53 and an encryption processing unit 54.

The acquired information analysis unit 51 inputs the driver information from the driver information acquisition unit 12, and inputs the environment information such as the vehicle information and the external information from the environment information acquisition unit 13.

An example of the information input by the acquired information analysis unit 51 will be described with reference to FIG. 14.

FIG. 14 illustrates an example of the acquired information of each of the following information acquisition units for each type.

(A) Driver information acquisition unit
(B) Environment information acquisition unit "(2) Type of acquired information" and "(3) Specific example of acquired information" acquired by each of the information acquisition units are illustrated.

(A) The acquired information from the driver information acquisition unit 12 is, for example, the following information.

(A1) action information of the driver: reading, sleeping, terminal operation, leaving a seat, sorting, arranging a slip, and the like of the driver, (A2) action information of the driver: also including smoothness information of posture transition such as orientation of the body of the driver, seat rotation, transition of a foot to a steering pedal, and body movement, (A3) driver's face and head information: face, head orientation, posture, movement information, and the like, and (A4) biometric information of the driver: heart rate, pulse rate, blood flow, respiration, electroencephalogram, sweating state, eye movement, eyeball behavior, gaze, blinking, saccade, microsaccade, fixation, drift, stare, percentage of eye closure evaluation value (PERCLOS), iris pupil reaction, and the like.

Furthermore, (B) the acquired information from the environment information acquisition unit 13 is, for example, the following information.

(B1) vehicle information: travel control data of the user's own vehicle, operation unit (accelerator, brake, and the like) operation information (including acquired information of an event data recorder (EDR) and a drive recorder), timing synchronization information that can be synchronized with the EDR information, or the like, and (B2) outside-vehicle observation information: image information, distance information, object identification information, and the like of a surrounding environment of a traveling path.

The acquired information analysis unit 51 of the data processing unit 11 illustrated in FIG. 13 receives the driver information, the vehicle information, and the environment information such as the external information from the driver information acquisition unit 12 and the environment information acquisition unit 13 as inputs.

A configuration example of acquiring the driver information by the driver information acquisition unit 12 will be described with reference to FIG. 15 and the subsequent drawings.

Figure 16:
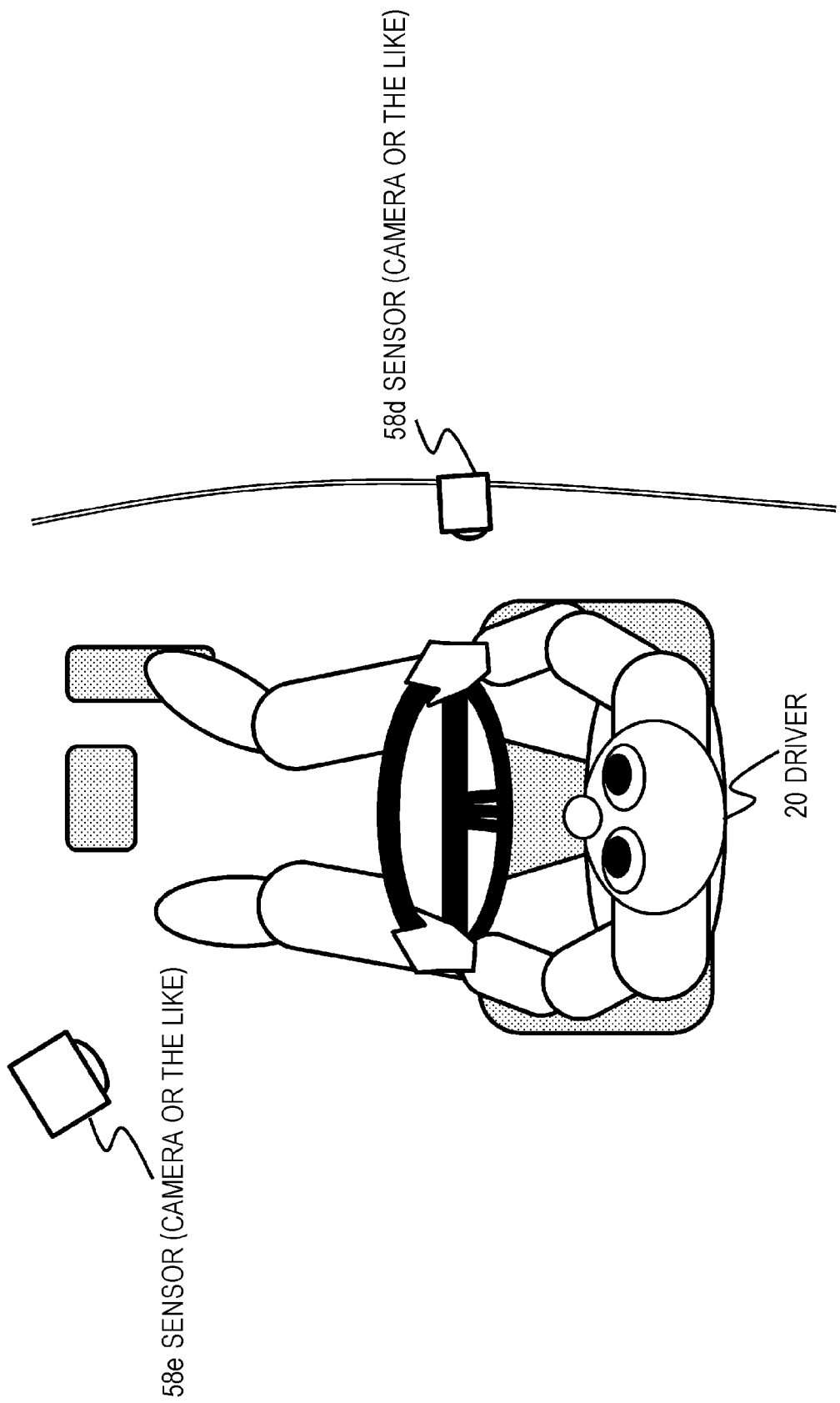
FIG. 16 is a diagram for describing a setting example of sensors such as cameras for acquiring driver information.

FIGS. 15 and 16 are diagrams illustrating arrangement examples of sensors (cameras and the like) for acquiring information of the face, posture, and the like of the driver 20. A sensor (camera or the like) 58 is, for example, a camera of a normal RGB color image or the like, an infrared camera, a stereo camera, a ToF sensor used as a distance sensor, or the like.

As illustrated in FIGS. 15 and 16, the sensors (cameras and the like) 58 for acquiring information such as the face and posture of the driver 20 are provided at a plurality of positions where the driver 20 can be observed from various different directions.

FIGS. 17A, 17B, 17C, and 17D are diagrams illustrating examples of the captured image of the driver 20 acquired by the plurality of sensors (cameras and the like) 58.

FIG. 17A illustrates a state in which the driver is steadily looking forward.

FIG. 17B illustrates a state in which the driver sometimes tends to turn his/her head down.

FIG. 17C illustrates a state in which the driver turns his/her face sideways.

FIG. 17D illustrates a state in which the driver sits sideways with respect to the driver's seat and operates a terminal.

In this manner, the posture and action information of the driver can be analyzed on the basis of the information acquired by the plurality of sensors (cameras and the like) 58.

Moreover, an example of observation data of the eyeball behavior included in (A4) biometric information of the driver in the acquired information of the driver information acquisition unit 12 described with reference to FIG. 14 will be described with reference to FIG. 18.

There is behavior analysis for an eyeball as an effective means for confirming the driver's consciousness state. For example, it is conventionally known that it is possible to analyze a line-of-sight by analyzing a direction in which the line-of-sight is directed. By further developing this technology and analyzing the line-of-sight behavior at high speed, more detailed behavior detection of the eyeball can be performed.

In the detailed behavior analysis of the eyeball, although there is a part of the behavior that appears bioreflexibly, many phenomena that appear reflecting neural transmission and processing in the brain are also simultaneously observed in the behavior. Therefore, activity results such as brain recognition are reflected, and the behavior becomes visible.

By using the fact that the activity in the brain is reflected in the eyeball behavior, the arousal level of the driver can be estimated with high accuracy.

The external world information acquired in a case where a person makes a situation determination necessary for an action is often obtained from visual information. When a person perceives and recognizes the visual information and acts, the person directs the line-of-sight to the information and refers and compares the information and the person's own memory (recorded knowledge). It is known that a person exhibits a specific eyeball behavior necessary for visual information recognition, such as fine fixation, microsaccade, tremor, and drift, while directing the line-of-sight to a portion where information ahead of the line-of-sight is visible or the vicinity thereof until the person understands the information ahead of the line-of-sight.

This eyeball behavior shows different behavior between a case where a person is in a normal arousal state and a case where the person is in a reduced consciousness/arousal state.

FIG. 18 illustrates an example of a trajectory of the eyeball behavior of the driver when a visual task is presented to view certain information.

The example in FIG. 18 illustrates the trajectory of the eyeball behavior when the person first gazes at the vicinity of an area a and then gazes at the vicinity of an area b.

In a case of visually observing certain information (problem) and trying to understand content, the person performs large eyeball rotation called saccade as in a behavior trajectory illustrated in FIG. 18, turns the eyeball to a predetermined visual point, and performs the eyeball behavior accompanied by fixation and microsaccade in the vicinity thereof.

For example, it is necessary to perform periodic monitoring in order to confirm whether or not the driver keeps consciousness during automatic driving. To perform monitoring without excessively bothering the driver, for example, the data processing unit 11 may be configured to present a symbol requiring some sort of thinking determination to the driver and observe the eyeball behavior. In a case where it is observed that the driver is performing a thinking confirmation operation by the line-of-sight as an observation result, it can be estimated that the driver preferentially executes the thinking activity in the brain for the task handling and the driver is not in a state of being immersed in another secondary task.

Returning to FIG. 13, processing executed by the acquired information analysis unit 51 will be described.

As illustrated in FIG. 13, the acquired information analysis unit 51 analyzes the driver information input from the driver information acquisition unit 12, the environment information such as the vehicle information and the external information input from the environment information acquisition unit 13, and separates these pieces of input information into two types of information:

(1) conversion unnecessary data; and (2) conversion necessary data.

The conversion necessary data is, for example, the following information:

Individually identifiable image information such as a face image of the driver, at least a partial body image, and an eye image included in the driver information input from the driver information acquisition unit 12, and biometric information of the driver, for example, biometric information such as iris information and electroencephalogram information;

Image information including license plates and the like of front and rear vehicles, image information of pedestrians, image information including addresses, telephone numbers, and the like printed on signboards and the like, and the like, which are input from the environment information acquisition unit 13.

The conversion necessary data is, for example, data such as individually-identifiable personal information. For example, the conversion necessary data is information or the like prohibited from being directly recorded in the storage unit in the personal information protection regulation of a region where the vehicle 10 travels.

Specifically, for example, in the case of the vehicle traveling in the European region, the conversion necessary data is information prohibited from being directly recorded in the storage unit in the personal information protection regulation (GDPR) stipulated by the EU.

Meanwhile, the conversion unnecessary data is information other than the conversion necessary data, and includes, for example, operation information of an operation unit of the driver, line-of-sight information, information indicating the direction of the head, and sweating state information included in the driver information input from the driver information acquisition unit 12, and vehicle operation information such as speed, brake operation information, and inter-vehicle distance information with respect to the front or rear vehicle input from the environment information acquisition unit 13.

These pieces of information are not individually-identifiable information, but are information that is not prohibited from being directly recorded in a storage unit in the personal information protection regulation (GDPR) stipulated by the EU.

Moreover, the conversion unnecessary data also includes data analyzed by the acquired information analysis unit 51 on the basis of the driver information input from the driver information acquisition unit 12 and the information input from the environment information acquisition unit 13.

For example, the acquired information analysis unit 51 analyzes the following driver state from an image, posture information, and the like of the driver.

The driver state="doze", "prone", "distraction", "reading", "seating posture", "moving position", or the like The acquired information analysis unit 51 analyzes these driver states, classifies the analyzed data as metadata belonging to the conversion unnecessary data, and stores the metadata in the storage unit 16 or the server 30.

Moreover, the acquired information analysis unit 51 calculates an evaluation value (driver evaluation value) that is an index value indicating whether or not the arousal state of the driver allows switching from the automatic driving to the dispatch driving on the basis of the driver information input from the driver information acquisition unit 12, classifies the evaluation value as metadata belonging to the conversion unnecessary data, and stores the evaluation value in the storage unit 16 or the server 30.

Note that the acquired information analysis unit 51 includes, for example, a data discrimination table that defines to which one of "conversion unnecessary data" and "conversion necessary data" each data type such as an image, distance data, or a vital signal belongs, and determines to which one of "conversion necessary data" and "conversion unnecessary data" each of the driver information input from the driver information acquisition unit 12 and the environment information such as the vehicle information and the external information input from the environment information acquisition unit 13 belongs by reference to the data discrimination table.

The data discrimination table is configured as, for example, a table in accordance with the personal information protection regulation of the country in which the vehicle travels. For example, in the case of a vehicle traveling in the EU, a table in which data for which recording processing is not permitted under the general data protection regulation (GDPR), which is the personal information protection regulation stipulated by the EU, is specified as "conversion necessary data" is used.

Note that the acquired information analysis unit 51 may execute, for example, image analysis and execute identification processing as to whether or not an image of a person or a license plate is included, and perform processing of determining that data is the "conversion necessary data" in a case where data of such an image of a person or a license plate is included, without using the data discrimination table.

The acquired information analysis unit 51 stores the "conversion unnecessary data" included in the driver information input from the driver information acquisition unit 12, the environment information such as the vehicle information and the external information input from the environment information acquisition unit 13 in the storage unit 16 as they are. Alternatively, the data is transmitted to the server 30 via the communication unit 14 and stored in the storage unit in the server 30.

Note that the data stored in the storage unit 16 or the server 30 is recorded in association with a user identifier, that is, identification information of the driver.

Meanwhile, the acquired information analysis unit 51 inputs the "conversion necessary data" included in the driver information input from the driver information acquisition unit 12, the environment information such as the vehicle information and the external information input from the environment information acquisition unit 13 in the data abstraction unit 53 or the encryption processing unit 54 of the data conversion unit 52.

The data abstraction unit 53 of the data conversion unit 52 executes abstraction processing for the conversion necessary data. The encryption processing unit 54 executes data encryption processing for the conversion necessary data.

For the conversion necessary data, processing of at least one of the abstraction processing or the encryption processing for data is executed, and the conversion necessary data is stored in the storage unit 16 as abstraction data or encryption data. Alternatively, the data is transmitted to the server 30 via the communication unit 14 and stored in the storage unit in the server 30.

Note that the abstraction data and the encryption data stored in the storage unit 16 or the server 30 are also recorded in association with the user identifier, that is, the identification information of the driver.

Note that, regarding the "conversion necessary data", both the abstraction processing and the encryption processing for data may be executed in parallel to generate and record the abstraction data and the encryption data, or only one of the abstraction data and the encryption data may be generated and recorded.

For example, in a case of abstracting the acquired data indicating a motion of the body of the driver, the data abstraction unit 53 generates the abstraction data using skeleton data, an avatar, a virtual model, a model of a character, or the like reflecting the motion of the body. Furthermore, regarding a face image, the data abstraction unit 53 generates the abstraction data using a simplified model, an avatar, a virtual model, a model of a character, or the like indicating positions of the eyes, nose, and mouth.

Furthermore, regarding eye image data, the data abstraction unit 53 generates the abstraction data using a similar predetermined design.

Examples of the abstraction data generated by the data abstraction unit 53 will be described with reference to FIGS. 19A, 19B, and 19C.

Figure 19C:
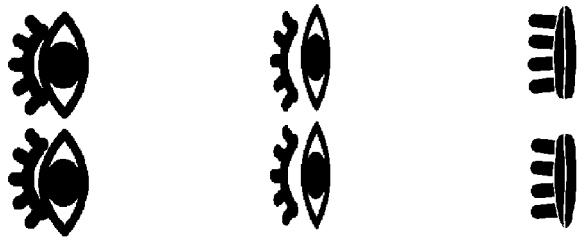
FIGS. 19A, 19B, and 19C are diagrams for describing examples of abstraction data generated by a data abstraction unit.
Figure 19B:
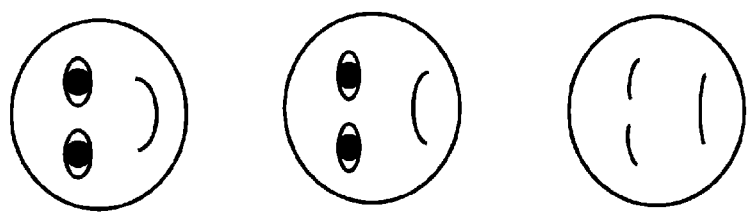
Figure 19A:
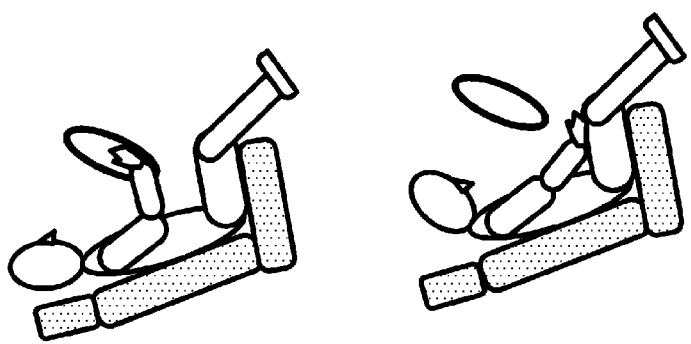

FIGS. 19A, 19B, and 19C illustrate examples of the following abstraction data.

FIG. 19A Body abstraction data example
FIG. 19B Face abstraction data example
FIG. 19C Eye abstraction data example All of Them are abstraction data generated by converting, that is, performing the abstraction processing, for the acquired information such as the image of the driver and the distance information acquired by the sensors (cameras or the like) 58 described with reference to FIGS. 15 to 16, for example.

As described above, the data abstraction unit 53 executes the abstraction processing for the acquired data from the driver information acquisition unit 12 and the environment information acquisition unit 13 to generate the abstraction data. An individual cannot be specified from the abstraction data.

Therefore, even if the abstraction data is stored in the storage unit 16 or the server 30, for example, it does not violate the general data protection regulation (GDPR) that is the personal information protection regulation stipulated by the EU.

Meanwhile, the encryption processing unit 54 executes the encryption processing for the conversion necessary data included in the acquired data of the driver information acquisition unit 12 and the environment information acquisition unit 13.

A key, a password, or the like applied to the encryption processing is, for example, data known only by the driver 20.

The encryption data generated by the encryption processing unit 54 is stored in the storage unit 16 or the storage unit of the server 30.

The processing of encrypting and recording the data including the personal information is not prohibited and is permitted by the general data protection regulation (GDPR), which is the personal information protection regulation stipulated by the EU.

In a case where the decryption processing is performed for the encryption data stored in the storage unit 16 or the server 30, the key (such as the password) known only by the driver 20 is required.

That is, the decryption processing for the encryption data is performed only when permitted by the driver 20. The case where the decryption processing is performed is, for example, at the time of submitting evidence to show that the driver 20 is not responsible for an accident at the time of occurrence of the accident.

Note that, in a case where the vehicle 10 is not a vehicle owned by the driver, and has a configuration available by an unspecified large number of people, such as a rental car or a shared car, key data applied to the encryption processing or the decryption processing is configured to use key data (a password or the like) associated with the personal information of the vehicle user.

For example, the key data and the encryption data are stored in the storage unit or the server in association with individually-identifiable data such as a license or a signature.

In a case where decryption is performed, presentation of the individually-identifiable data such as a license or a signature is requested, and in a case where the individual is identified, decryption of the encryption data by the key data associated with the individual is permitted.

[6. Configuration and Processing of Information Terminal Owned by Traffic Crackdown Officer of Police or the Like]

Next, the configuration and processing of the information terminal 40 owned by a traffic crackdown officer of the police or the like illustrated in FIG. 13 described above will be described.

As described above with reference to FIG. 13, the information terminal 40 owned by a traffic crackdown executor such as a police officer is an information terminal capable of communicating with the server 30 and the communication unit 14 of the vehicle 10 via a network.

The information terminal 40 is, for example, a terminal carried by a police officer who cracks down traffic accidents and traffic violations.

For example, when a traffic accident or a violation occurs, the police officer rushes to the site, acquires data stored in the server 30 or the storage unit 16 of the vehicle using the information terminal 40, and can display the data on the display unit of the information terminal 40.

Note that only unencrypted data can be displayed on the display unit of the information terminal 40.

That is,
(a) conversion unnecessary data, or
(b) abstraction data obtained by abstracting the conversion necessary data
is acquired from the server 30 or the storage unit 16 of the vehicle and displayed on the display unit of the information terminal 40.

Note that the data stored in the server 30 or the storage unit 16 of the vehicle is recorded in association with the identification information of the driver.

Therefore, for example, the police officer who cracks down a traffic accident or a traffic violation can identify the driver on the basis of the identification information of the driver associated with the display data while causing the information terminal 40 to display:
(a) conversion unnecessary data, or
(b) abstraction data obtained by abstracting the conversion necessary data.

An information display example on the information terminal 40 will be described with reference to FIG. 20 and the subsequent drawings.

Figure 20:
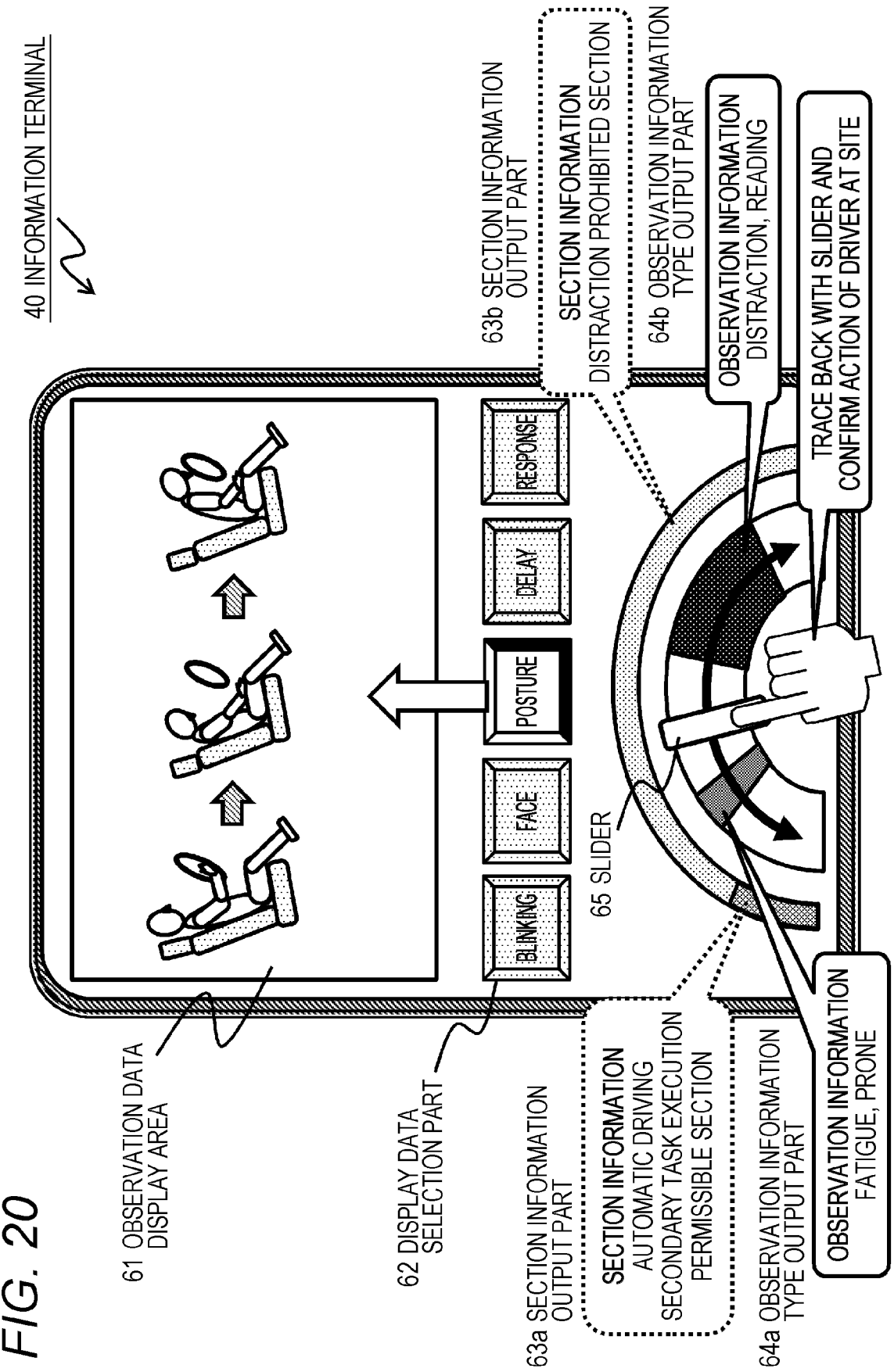
FIG. 20 is a diagram for describing an example of data displayed on an information terminal owned by a traffic crackdown executor such as a police officer.

FIG. 20 illustrates a data display example of the information terminal 40.

These display data are displayed on the basis of the data stored in the storage unit 16 of the vehicle 10 or the server 30.

As illustrated in FIG. 20, the information terminal 40 displays an observation data display area 61, a display data selection part 62, a section information output part 63, an observation information output part 64, and a slider 65.

The section information output part 63 displays section information corresponding to the traveling section display data described with reference to FIGS. 9, 10A, 10B, 10C, 10D, 11A, 11B, 11C, 12A, 12B, 12C, and 12D, which is section information of an automatic driving permitted section and a manual driving section. By moving the slider 65 from left to right, observation data corresponding to the passage of time is displayed in the observation data display area 61.

The example illustrated in FIG. 20 is an example of displaying the posture of the driver in the observation data display area 61.

This display data is abstraction data, and is abstraction data generated on the basis of the driver observation information and stored in the storage unit 16 or the server 30 of the vehicle, by the data abstraction unit 53 described above with reference to FIG. 13.

The observation information type output part 64 is displayed below the section information output part 63. In this area, the observation information of the driver with the passage of time is displayed. Specifically, data indicating specific content of the following observation information:
the observation information=fatigue or prone; or
the observation information=distraction or reading is displayed.

These pieces of data are displayed on the basis of the metadata analyzed on the basis of the observation information of the driver by the acquired information analysis unit 51 described above with reference to FIG. 13.

Note that the data to be displayed in the observation data display area 61 can be switched by selection of the display data selection part 62.

In the display data selection part 62, display data selection buttons of "blink", "face", "posture", "delay", and "response" are set.

The example illustrated in the figure is an example in which "posture" has been selected as display data, and abstraction data indicating the posture of the driver with the passage of time is displayed in the observation data display area 61.

This abstraction data is abstraction data generated on the basis of the driver observation information and stored in the storage unit 16 or the server 30 of the vehicle, by the data abstraction unit 53 described above with reference to FIG. 13.

For example, the police officer can confirm that the driver has dozed by looking at the display data.

Note that this display data is abstraction data and is data stored in the storage unit 16 of the vehicle 10 or the server 30.

Since the storage unit 16 of the vehicle 10 and the server 30 store the data belonging to the personal information as the abstraction data or the encryption data, even if the data is leaked to the outside, the personal information is not leaked.

The display data for the observation data display area 61 can be switched by switching the display data selection part 62.

Figure 21:
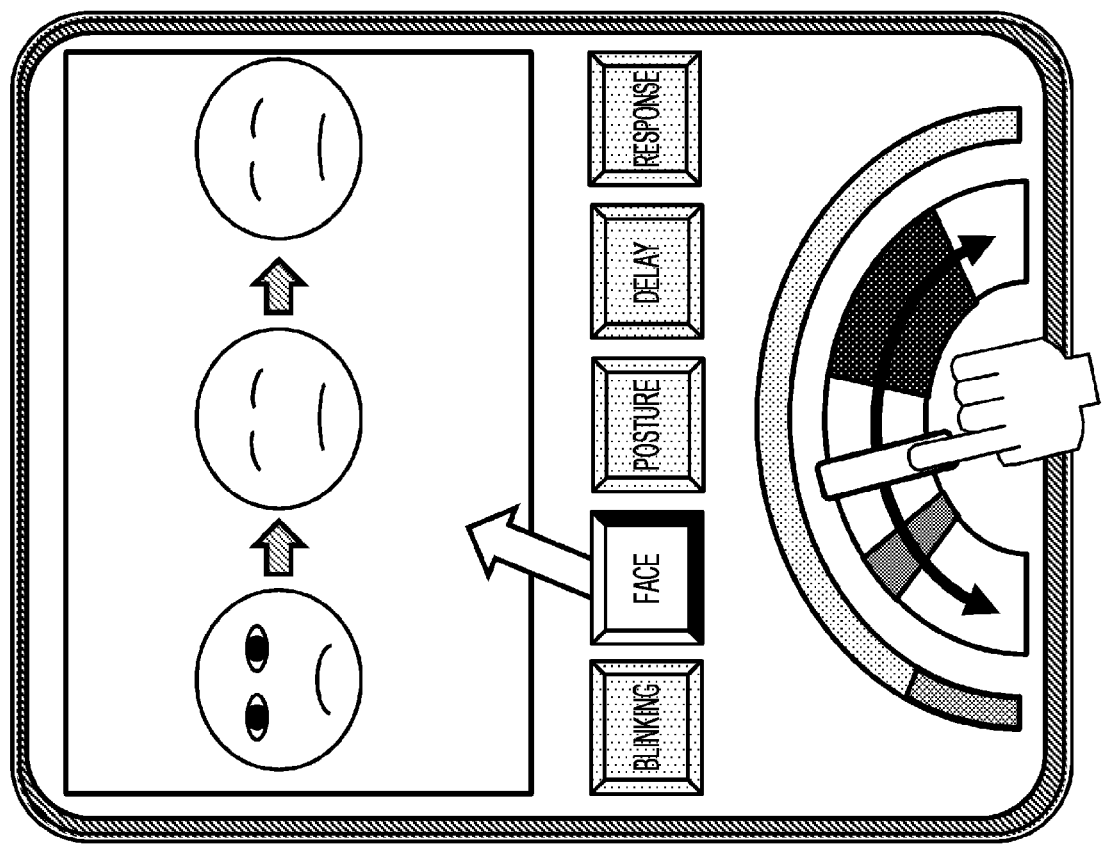
FIG. 21 is a diagram for describing an example of data displayed on an information terminal owned by a traffic crackdown executor such as a police officer.

FIG. 21 illustrates an example in which "face" of the display data selection part 62 has been selected.

In this case, the abstraction data of the driver's face with the passage of time is displayed in the observation data display area 61.

This abstraction data is also abstraction data generated on the basis of the driver observation information and stored in the storage unit 16 or the server 30 of the vehicle, by the data abstraction unit 53 described above with reference to FIG. 13.

Figure 22:
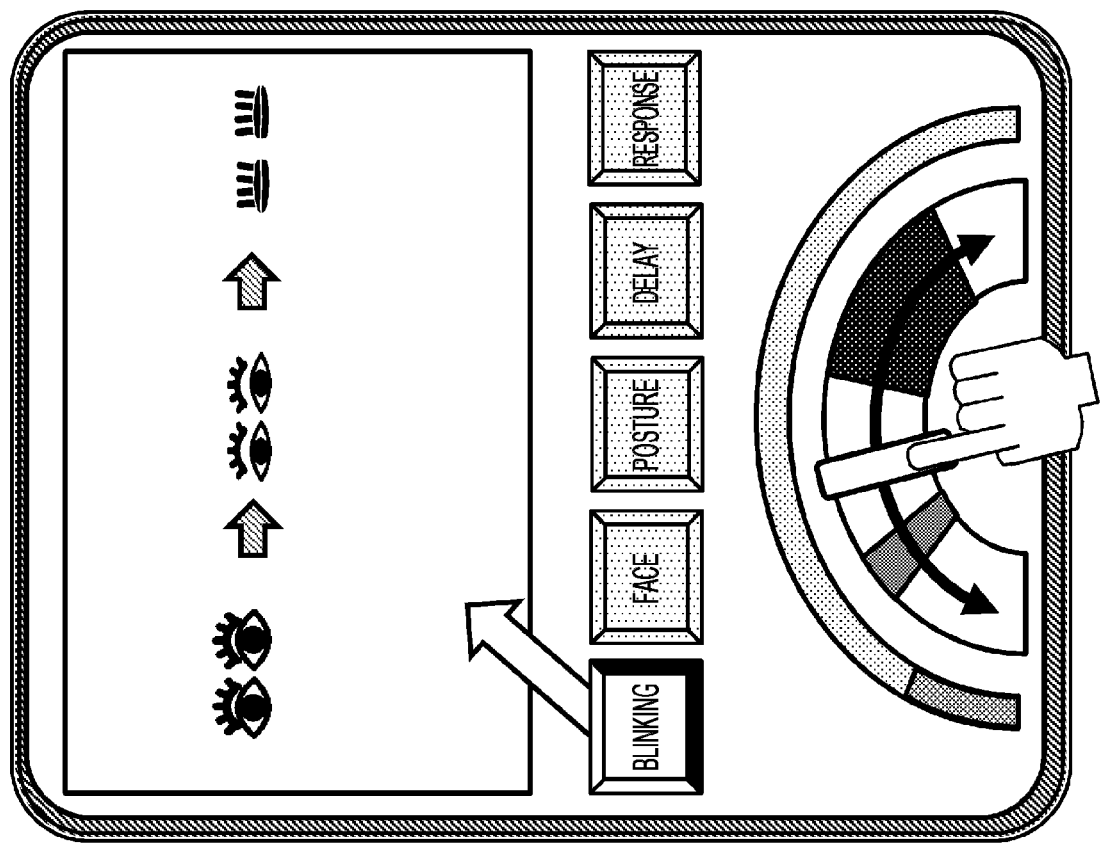
FIG. 22 is a diagram for describing an example of data displayed on an information terminal owned by a traffic crackdown executor such as a police officer.

FIG. 22 illustrates an example in which "blink" of the display data selection part 62 has been selected.

In this case, the abstraction data of the driver's eyes' blink with the passage of time is displayed in the observation data display area 61.

This abstraction data is also abstraction data generated on the basis of the driver observation information and stored in the storage unit 16 or the server 30 of the vehicle, by the data abstraction unit 53 described above with reference to FIG. 13.

As described above, the information terminal 40 used by the traffic crackdown executor such as a police officer can acquire
  (a) conversion unnecessary data, or
  (b) abstraction data obtained by abstracting the conversion necessary data
    from the server 30 or the storage unit 16 of the vehicle and display the acquired information on the display unit of the information terminal 40.

By cracking down on accidents and violations using such display data, it is possible to confirm the state of the driver at the time of occurrence of an accident or a violation, and it is possible to clarify the driver's responsibility.

Meanwhile, as described above, since the storage unit 16 of the vehicle 10 and the server 30 store the data belonging to the personal information as the abstraction data or the encryption data, even if the data is leaked to the outside, the personal information is not leaked.

Next, a use example of data stored in the server 30 or the storage unit 146 of the vehicle 10 will be described with reference to FIG. 23.

Figure 23:
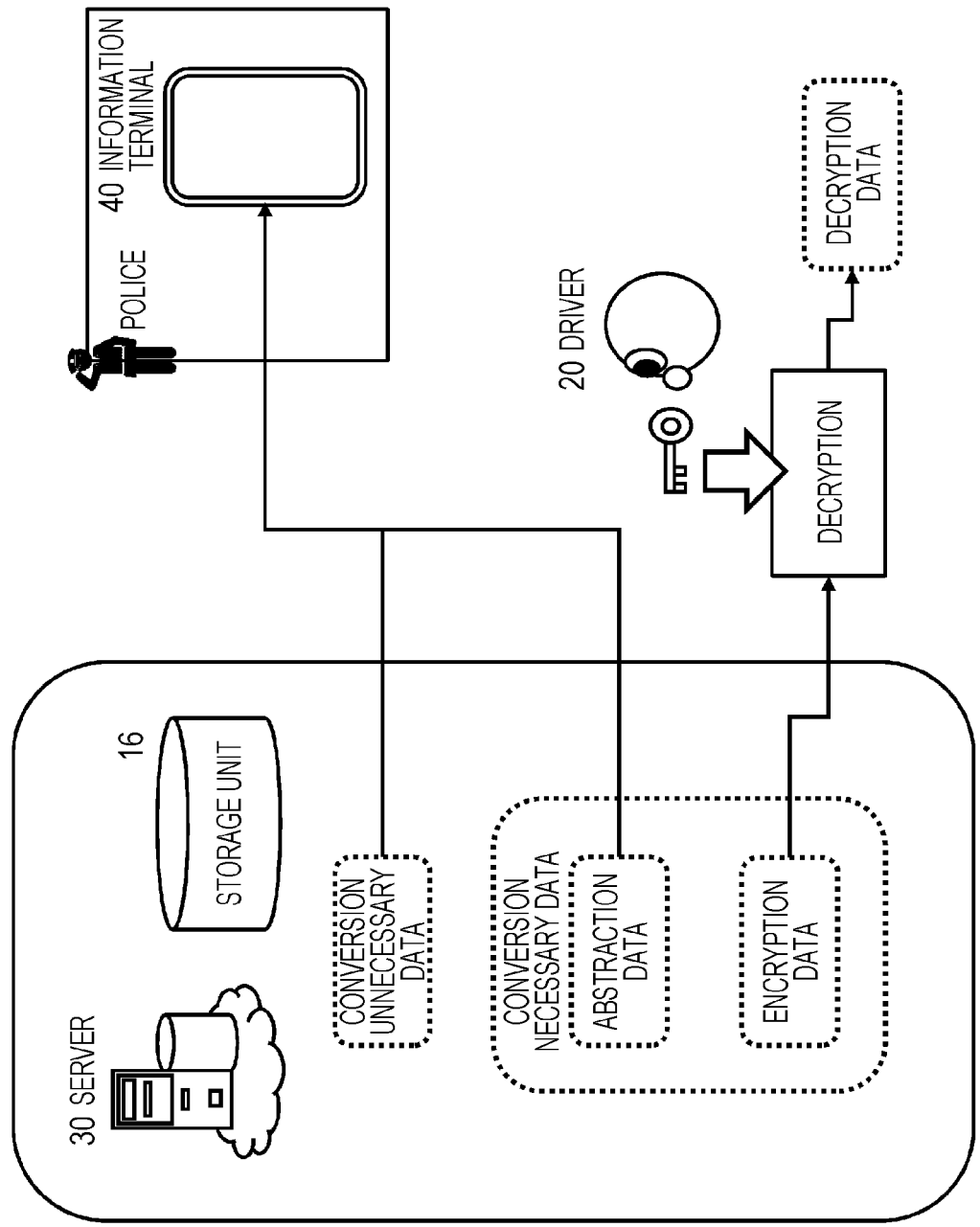
FIG. 23 is a diagram for describing a use example of data stored in a server or a storage unit.

FIG. 23 illustrates, as the data stored in the server 30 or the storage unit 146 of the vehicle 10, three types of data:
  (1) the conversion unnecessary data,
  (2) the abstraction data of the conversion necessary data, and
  (3) the encryption data of the conversion necessary data.

The "conversion unnecessary data" includes observation information that does not include the personal information among the observation information input from the driver information acquisition unit 12 and the environment information acquisition unit 13, and analysis data and evaluation data generated by the acquired information analysis unit 51 of the data processing unit 11 illustrated in FIG. 13.

For example, the observation information included in the "conversion unnecessary data" includes observation information such as posture information of the driver, movement information, line-of-sight information, sweating state information, operation information of the vehicle, for example, speed, brake operation information, and inter-vehicle distance information with respect to the front or rear vehicle.

Further, the "conversion unnecessary data" includes metadata of analysis data and evaluation data generated by the acquired information analysis unit 51, that is,
  the driver state data="doze", "prone", "distraction", "reading", "seating posture", "moving position", and the like, and
  the arousal level evaluation value of the driver=an evaluation value indicating whether or not switching from the automatic driving to the dispatch driving is possible.

These pieces of conversion unnecessary data are not personal information, and are information not prohibited from being directly recorded in a storage unit in the personal information protection regulation (GDPR) stipulated by the EU.

Meanwhile, "the abstraction data and the encryption data of the conversion necessary data" are the abstraction data and the encryption data of the conversion necessary data described above with reference to FIG. 13.

The conversion necessary data includes, for example, individually identifiable image information such as face, body, and eye images of the driver, and biometric information of the driver, for example, iris information and electroencephalogram information, which are included in the driver information input from the driver information acquisition unit 12, and image information including license plates and the like of the front and rear vehicles, image information of pedestrians, image information including addresses, telephone numbers, and the like printed on signboards and the like, and the like, which are input from the environment information acquisition unit 13.

Many of the conversion necessary data are, for example, individually-identifiable personal information, and are information that is prohibited from being directly recorded in a storage unit in the personal information protection regulation (GDPR) stipulated by the EU.

The server 30 and the storage unit 16 store at least one of the abstraction data or the encryption data of these pieces of conversion necessary data.

As illustrated in FIG. 23, the information terminal 40 used by a traffic crackdown executor such as a police officer acquires
  (1) conversion unnecessary data, or
  (2) abstraction data of the conversion necessary data
  and displays the acquired data.

Such data does not violate the regulations of the Personal Information Protection Act even if the data is leaked to the outside.

However, on the other hand, the data is effective data for identifying the cause of an accident, confirming violation, and the like, and is effective data for preventing evasion and performing reliable crackdown since the data can be visually confirmed.

Meanwhile, as illustrated in FIG. 23,
  (3) the encryption data of the conversion necessary data stored in the server 30 or the storage unit 16 cannot be decrypted without using the key such as the password only known by the driver 20.

That is, the decryption processing for the encryption data is performed only when permitted by the driver 20. The case where the decryption processing is performed is, for example, at the time of submitting evidence to show that the driver 20 is not responsible for an accident at the time of occurrence of the accident. For example, use in a case where the driver who does not violate the rules decrypts the encrypted information and submits the decrypted information to a court as evidence.

As described above, in the configuration of the present disclosure, various pieces of observation information such as the driver information, the vehicle information, and the external information are acquired, and the abstraction processing or the encryption processing is applied to data that might violate the personal information regulations and the data is recorded. With the configuration, data recording in compliance with the personal information protection regulations becomes possible.

Meanwhile, it is also possible to efficiently crack down on traffic accidents and violations by using the conversion unnecessary data or the abstraction data.

[7. Configuration for Calculating and Using Driver Evaluation Value for Determining Whether or not Switching from Automatic Driving to Manual Driving is Possible Using Observation Information]

Next, a configuration for calculating and using the driver evaluation value for determining whether or not switching from the automatic driving to the manual driving is possible using the observation information will be described.

As described above with reference to FIGS. 9, 10A, 10B, 10C, 10D, 11A, 11B, 11C, 12A, 12B, 12C, and 12D, the traveling route of the vehicle 10 includes the automatically drivable section Sa, the manual driving section Sb, the handover section Sc from the automatic driving to the manual driving, and the cautioned traveling section Sd from the automatic driving. The handover section Sc exists immediately before the manual driving section Sb, and the driver needs to be in a recoverable state to the manual driving. Furthermore, the cautioned traveling section Sd is a section in which the vehicle can travel while decelerating while keeping the automatic driving under caution of the driver who is in the recoverable state to the manual driving.

The acquired information analysis unit 51 of the data processing unit 11 of the vehicle 10 described with reference to FIG. 13 performs processing of calculating a position, a posture, and a preparation evaluation value indicating whether or not the driver is at a position and a posture, and prepared for recovery to the manual driving, and processing of calculating an evaluation value of the driver, such as an arousal level evaluation value indicating whether or not the driver is in an arousal state of capable of starting the manual driving, on the basis of the information acquired from the driver information acquisition unit 12, for example, at the time when the vehicle 10 enters the handover section Sc.

The time required for the driver to recover to the manual driving significantly varies depending on work content of the driver at that time. The data processing unit 11 analyzes the information input from the driver information acquisition unit 12 and the environment information acquisition unit 13, estimates the time required for the driver to recover to the manual driving, and calculates the optimum notification timing.

Figure 24:
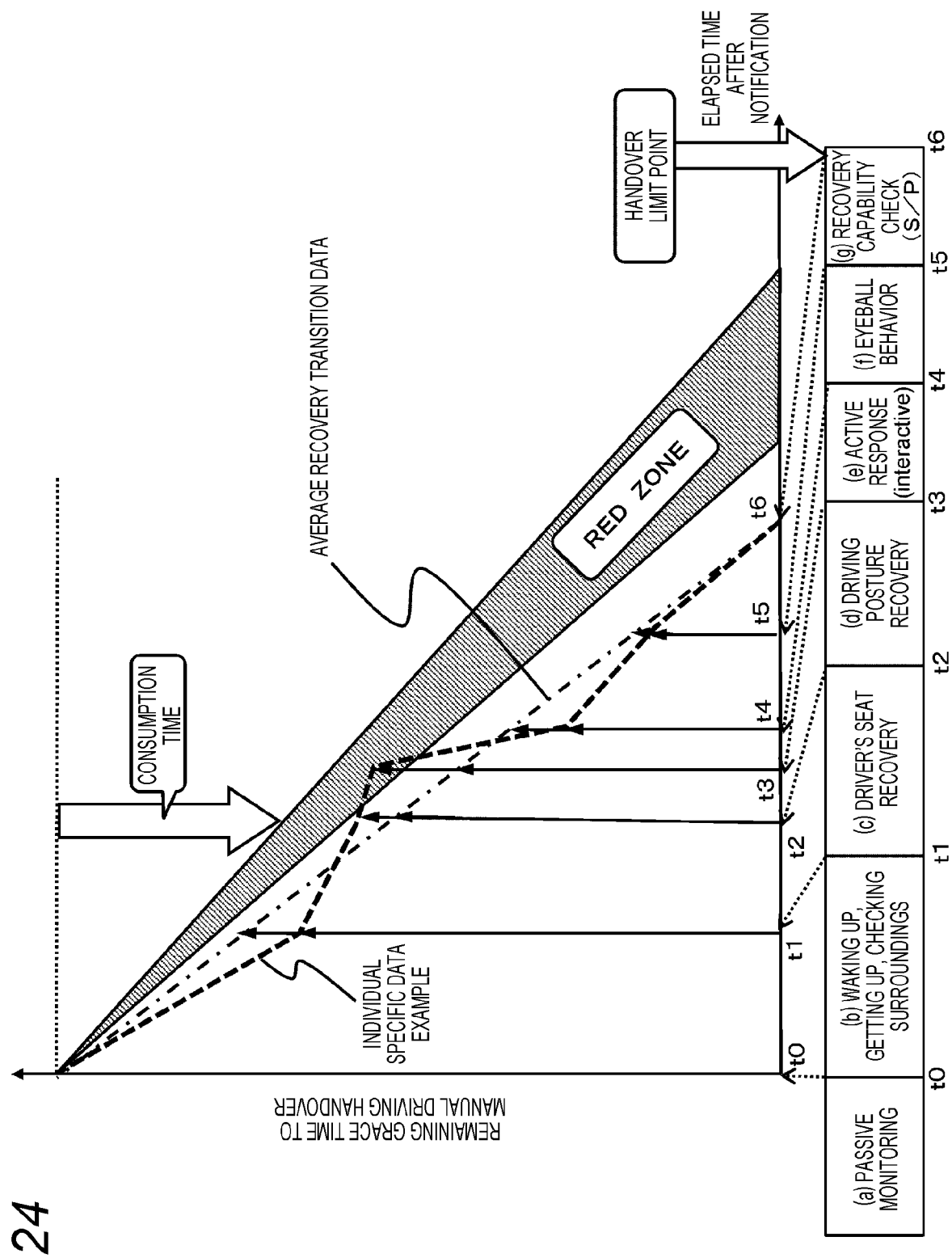
FIG. 24 is a graph for describing a remaining grace time until completion of transition from the automatic driving to the manual driving.

FIG. 24 is a graph for describing a remaining grace time until completion of transition from the automatic driving to the manual driving. The remaining grace time to reach a "handover limit point" at a right end according to the passage of time along a horizontal time axis after the data processing unit 11 of the information processing device of the vehicle 10 issues the notification (manual driving recovery request notification) to the driver at time t0 is illustrated on a vertical axis. The "handover limit point" is a point where the manual driving needs to be started.

The example illustrated in FIG. 24 indicates the remaining grace time in a case where the vehicle travels at a constant speed, assuming a smooth transition from the automatically drivable section to the manual driving section. Note that, since the vertical axis in FIG. 24 represents the remaining grace time during constant-speed traveling, the vertical axis can also be regarded as the distance to the actual handover limit point.

The graph illustrates two lines of "individual specific data example" and "average recovery transition data".

The individual-specific data example is an example of data based on learning data specific to a certain one individual.

The average recovery transition data is an average value based on a large number of observation data.

These are lines that realize handover at a predetermined requested recovery rate (RRR) in a case where handover is performed to the manual driving at the handover limit point.

The data processing unit 11 calculates a notification point for causing the driver to execute handover to the manual driving at the handover limit point at the predetermined requested recovery rate (RRR), using a learning dictionary of driver-specific recovery characteristics, on the basis of the monitoring information of the driver.

The requested recovery rate (RRR) will be described. The requested recovery rate (RRR) is, for example, data defined in a local dynamic map (LDM) provided by a road information provider. That is, the requested recovery rate is a manual driving switching success rate expected at each switching point from the automatically drivable section to the manual driving section.

An arrival time of the handover point from the automatic driving to the manual driving is set as t (ToR_point) (takeover request point), and a calculated handover budget (time) for realizing the handover at the arrival time at a predetermined success rate RRR (requested recovery rate) is set as ΔtMTBT (minimum transition budget time).

In this premise, it is necessary to issue a handover notification or an alarm before {t(ToR_point)−ΔtMTBT (minimum transition budget time)} prior to the predicted time t(ToR_point) at which the ToR point arrives.

That is, to achieve the requested recovery rate (RRR) at the approaching handover point, it is necessary to issue the notification (manual driving switching request notification) to the driver at t(n), which satisfies {t(n+1)−{t(ToR_point)−ΔtMTBT(minimum transition budget time)}}<0 at t(n+1) after the next monitoring time Δt from the monitoring time t(n). This is because the notification made at t(n+1) is too late.

In short, to achieve the RRR defined in the local dynamic map (LDM) provided by the road information provider, it is required to set the notification (manual driving switching request notification) timing before the minimum handover delay allowable budget (time) becomes longer than the monitoring cycle period of the driver.

The transition of the monitoring states (observation states) illustrated in FIG. 24, that is, the change points t0 to t6 of the following monitoring states (observation states) (a) to (g) are notification points for causing the driver to execute handover to the manual driving at the handover limit point at the predetermined requested recovery rate (RRR).

For example, in the state where the driver has left the driver's seat and is taking a nap (at or before time t0), the system confirms that the driver is taking a nap by acquiring the observation information (passive monitoring) from the driver information acquisition unit 12.

After the system issues the notification (manual driving recovery request notification) to the driver at time t0, the driver state and the observation state of the driver by the system change as in the following (a) to (g).

(a) Passive monitoring (the system observes by passive monitoring that the driver is taking a nap)
(b) Waking up, getting up, and checking the surroundings
(c) Driver's seat recovery
(d) Driving posture recovery
(e) Active response
(f) Eyeball behavior
(g) Physical recovery capability check (S/P)

The illustrated two lines of the "individual-specific data example" and the "average recovery transition data" are lines generated by connecting the transition points (a) to (g) after the system notifies the driver (manual driving recovery request notification) at time t0.

The figure further illustrates "RED ZONE" in the shaded area. This "RED ZONE" is, for example, a zone in which, when the "observation data" of the actual driver enters this zone, it is necessary to issue the notification (manual driving recovery request notification) to the driver again to prompt early recovery. This zone is predefined.

Note that, as described above, the example illustrated in FIG. 24 is a graph illustrating the remaining grace time until the completion of transition from the automatic driving to the manual driving in a case where the vehicle travels at a constant speed.

Depending on design of an infrastructure, it is also possible to, for example, increase the number of lanes in a manual driving switching preparation section to set a road so as not to cause a decrease in a flow rate of the entire road even if the vehicle speed is decreased, and it can be said that tollbooths and the like of expressways are designed based on the concept.

The graph illustrated in FIG. 24 is changed depending on the situation of the infrastructure. For example, in a case where deceleration control is performed by decreasing the speed to the handover point, and control to extend the arrival time to the handover point is performed, it is necessary to generate and use a graph reflecting the control.

The section indicated by the "physical recovery capability check (somadic/physical (S/P))" immediately before the "handover limit point" at the right end is a period in which the driver partially starts vehicle steering of the actual vehicle and performs somatically and physically substantial steering evaluation in this section. The system finally completely leaves the handover to the driver when the system confirms numbness in the driver's limbs and that control of a steering device to be corrected is actually performed within an expected range.

As described above, the example illustrated in FIG. 24 is an example of a case assuming that the driver has left the driver's seat and is taking a nap. The remaining time in a case where the vehicle travels at a constant speed until reaching the manual driving handover point is illustrated. As described above, since the graph is illustrated at a constant speed, the graph may be regarded as an actual distance position to the handover limit point.

Hereinafter, specific state changes of (a) to (g) will be described.

((a): to t0)

First, in a passive monitoring period at or before time to, the vehicle system (information processing device) performs monitoring for determining at which timing notification/arousal should be performed, or whether it is enough to issue a notification or it is necessary to set an alarm for arousal.

This example assumes a case where the driver completely leaves driving in the automatically drivable section. Specifically, it is assumed that the driver is taking a nap.

In a case where the system detects that the driver is sleeping in the passive monitoring period at or before time t0, the system needs to calculate optimum timing of sounding the wake-up alarm before the handover processing.

It is desirable to cause the driver to hand over in a safe section for good arousal and handover. Therefore, the system selects an optimum handover execution section on the basis of the so-called local dynamic map (LDM) information of road environment, that is, the LDM information in which travelling map information of roads on which the vehicle travels is updated with high density on a constant basis.

For example, the system acquires, from the LDM, section information indicating that handover is completed in a straight road section in which handover from the automatic driving to the manual driving can be safely performed, or in a section in which influence on other surrounding traveling vehicles can be reduced even if deceleration, emergency evacuation, or stop is performed in a case where the handover has not been smoothly performed.

For example, the system (data processing unit 11) performs complex determination of
low risk*low influence*shallow sleep zone,
determines the notification timing, and issues the recovery notification.

That is, the actual notification or the actual alarm point is determined in the last road safety section segment in which the driver reaches shallow REM sleep on the traveling route, or the last section in which the risk of occurrence of traffic jam is low even if the vehicle is stopped in an emergency, or the like. This is because to avoid setting the handover point after entering a narrow road section in a mountain area where vehicles cannot pass each other instead of a straight section of the road, or to avoid a dangerous situation in which the driver poorly wakes up if the arousal notification or the alarm is issued in a section where the driver has transitioned to deep sleep after REM sleep, and the driver is required to make complicated road handling determination early after waking up, for example.

((b): t0 to t1)

The system (data processing unit 11) calculates the notification point for causing the driver to execute handover to the manual driving at the handover limit point at the predetermined requested recovery rate (RRR), using a learning dictionary of driver-specific recovery characteristics, on the basis of the monitoring information of the driver.

When the system (data processing unit 11) notifies the driver at time t0, the driver wakes up and starts getting up at or after time t0.

The system (data processing unit 11) detects the getting up of the driver by the ToF sensors or the cameras, and the action of the driver can be evaluated by the detection information.

The length of time t0 to t1 is a budget allocated from data in which the time required for waking up and getting up to obtain a predetermined requested recovery rate (RRR) is calculated by learning processing, and is the maximum allowable time. Average recovery transition data is indicated by the alternate long and short dash line. The illustrated thick broken line (observation data example) is an example of the observation data.

If this observation data example follows the average recovery time indicated by the alternate long and short dash line, no delay occurs.

Since the remaining grace time indicated on the vertical axis decreases with the progress, when a certain level or more recovery delay occurs, recovery to achieve the predetermined requested recovery rate (RRR) becomes difficult. In a case where the delay occurs in "RED ZONE" indicated by the shaded area, it is necessary to issue a recovery warning to the driver again to prompt early recovery. Together with observable driver recovery status information, information prompting early recovery is also effective recovery quality evaluation information.

((c): t1 to t2)

The section indicated by time t1 to t2 is a section in which the driver is expected to move to the driver's seat. If a delay that erodes "RED ZONE" indicated by the shaded area occurs, a warning alarm or the like for prompting early recovery is issued. The system observes the recovery of the driver to the driver's seat on the basis of the acquired information obtained by, for example, the ToF sensors, cameras, a vehicle interior position tracking device, or the like.

((d): t2 to t3)

After moving to the driver's seat and seating on the driver's seat, the driver needs to adjust the driving posture. In a case where the technology is evolutionally advanced in the future so that leaving and recovery to the driver's seat are performed on a daily basis, use of a rotary moving driver's seat is expected in a case of quick recovery or as a use form of a more free posture in which the driver is not bound to the steering posture of the driver's seat.

The system (data processing unit 11) monitors that a necessary recovery procedure is normally performed, such as the driver recovering to the seat in the rotated state from the driving posture, and returning the seat to the direction where the driver can drive and wears a seat belt. This recovery procedure evaluation is performed by using, in addition to posture tracking by the ToF sensors or the cameras, a rotational driving posture recovery detection of the seat, a seating sensor, a body temperature distribution and a vital signal detection, a seat belt wearing sensor, and the like. It is possible to evaluate the recovery quality on the basis of the detection information over time.

((e): t3 to t4)

The driver recovers to the seating posture necessary for the manual driving, and performs an interactive confirmation response operation between the driver and the system, such as visual confirmation to attention information of a manual driving intrusion section expected after the handover point where the recovery request is received and visual confirmation in a forward traveling direction. With this processing, the system determines whether or not the driver is making a response that has taken a correct thinking procedure.

In a case where the driver is groggy or unconscious, it is difficult to make a correct response to the system, and even if the driver who has not sufficiently recovered the arousal state makes a response, a response result is far from an expected response.

As the interactive response confirmation processing executed by the system (data processing unit 11), for example, various types of processing are possible, such as confirmation as to whether or not the driver is gripping the steering wheel with an appropriate grip, confirmation as to whether or not the processing is performed with an appropriate pedal stepping press and procedure, and meaningful question and answer by voice AI recognition.

Note that, since a user does not like a response method involving botheration, means that can obtain a simplified early response result is desirable.

As one of interactive response confirmation methods, for example, evaluation of a gesture operation is effective, in which the driver visually confirms the front road direction with the line-of-sight while pointing a finger for visual confirmation of the front, such as pointing and calling.

It is possible to acquire and record, as the recovery quality, a delay of the driver's operation, accuracy of pointing obtained by evaluating an arrangement relationship among the eyes, the finger, and the front of the road of the pointing and calling, or the like. That is, the evaluation can be recorded and saved in the storage unit 16.

((f): t4 to t5)

The eyeball behavior during time t4 to t5 is so-called "Saccadic", and is a section in which overall high-speed operation behavior of the eyeballs particularly related to vision among the response characteristics of the driver is evaluated.

The eyeball behavior includes a behavior based on a reflective behavior that cancels rotational movement or the like associated with movement by the semicircular canals, and a saccade action that moves the central field of view at a high speed with respect to risk information of a moving body captured in the peripheral field of view.

Moreover, since determination based on memory is performed in the process of perceiving, recognizing, and determining a target captured almost in the central field of view, behavior such as fixation, and microsaccade, tremor, and drift in the vicinity of the fixation progresses. In addition, when stimulation priority of an event that attracts attention is equal to or less than a certain level, the driver exhibits a characteristic behavior of completing determination and recognizing visual information and directing the line-of-sight to a target to supplement information until reaching a conclusion necessary for the determination result.

In particular, since the latter behavior is greatly related to understanding decisions in the brain, it is possible to estimate the arousal state on the basis of the observation result. Factor by which the saccade action of moving the line-of-sight to a new target is performed includes another risk factor for entering the peripheral field of view, a stimulus associated with sound such as a siren, an impact, or a stimulus associated with memory, and there are various expression factors. As a result, detection of the eyeball behavior, an occurrence frequency, and a duration of the eyeball behavior have a large individual difference even if there is a tendency such as a situation, driving experience, and a degree of fatigue. Meanwhile, regarding recovery quality of the arousal level of the driver, the arousal level of the driver can be evaluated with reference to stabilization behavior under steady arousal.

When the driver checks surrounding environment information by directing the line-of-sight while the vehicle is traveling by automatic driving, it is necessary to pay attention to a wide variety of risk factors. In analyzing the line-of-sight of the driver, for example, a method of generating a semantic saliency map (a predicted attention distribution map in units of objects included in a scene) from a front scene in the traveling direction of the vehicle and analyzing the line-of-sight behavior of the driver with respect to the map can be used. However, there are various roads on which the vehicle is traveling, and the line-of-sight behavior of the driver is often different from that expected, and it is difficult to stably observe the behavior.

The grace time for the determination of the arousal level at the time of handing over from the automatic driving to the manual driving is limited. Therefore, it is effective to artificially present a certain problem in a short period of time to cause the driver to express the eyeball behavior at the time of confirming the problem, and perform stable eyeball behavior evaluation. That is, instead of observing the eyeball behavior with respect to forward scenery during accidental traveling, a behavior analysis for the problem mechanically presented by the system is conducted. In the evaluation method, handover attention information is presented in a matrix information presentation device, the eyeball behavior of the driver with respect to the presentation information is analyzed, and the arousal level of the driver can be evaluated. Furthermore, virtual image display may be performed using a display that projects information presented to the driver as a virtual image in a space in front of the traveling of the vehicle, for example, an augmented reality head up display (AR HUD).

((g): t5 to t6)

The "recovery capability check (S/P)" during time t5 and t6 is a period in which the driver partially starts vehicle steering of the actual vehicle and performs somatically and physically substantial steering evaluation in this section.

When the system (data processing unit 11) determines that the driver can substantially start manual driving recovery, the vehicle starts traveling according to the steering of the steering device by the driver. Alternatively, while the steering quality of the driver with respect to the steering device and the actual steering appropriateness are evaluated, intervention of the automatic driving control is gradually suppressed, and dependence of the driver on the manual driving is increased.

As described above, the example illustrated in FIG. 24 is a graph in which change points of the driver state and the observation state ((a) to (g)) of the driver by the system after the system issues the notification (manual driving recovery request notification) to the driver at time t0 in a state where the driver has left the driver's seat and is taking a nap are connected.

In a case where the system issues the notification (manual driving recovery request notification) to the driver at time t0 while the driver is falling asleep, the driver state and the observation state of the driver by the system change as in the following (a) to (g).

(a) Passive monitoring (the system observes by passive monitoring that the driver is taking a nap)
(b) Waking up, getting up, and checking the surroundings
(c) Driver's seat recovery
(d) Driving posture recovery
(e) Active response
(f) Eyeball behavior
(g) Recovery capability check (S/P)

The state changes (a) to (g) are state changes unique to a case where the initial state of the driver is a nap state.

The transition of the driver state or the observation state of the driver by the system varies depending on the initial state of the driver.

FIGS. 25A, 25B, 25C, and 25D are diagrams illustrating examples of transition of a state change and transition timing according to different initial states of the driver.

FIGS. 25A, 25B, 25C, and 25D illustrate transition examples of state changes according to the following four different initial states of the driver.

FIG. 25A Case where the driver is taking a nap in a nap space
FIG. 25B Case where the driver is awake and away from the driver's seat (arousal state)
FIG. 25C Case where the driver is seated on the driver's seat but is not in the driving posture
FIG. 25D Case where the driver is executing a secondary task while keeping the driving posture FIG. 25A Case where the driver is taking a nap in a nap space corresponds to the example described with reference to FIG. 24. That is, the driver state and the observation state of the driver by the system change as in the following (a) to (g).

(a) Passive monitoring (the system observes by passive monitoring that the driver is taking a nap)
(b) Waking up, getting up, and checking the surroundings
(c) Driver's seat recovery
(d) Driving posture recovery
(e) Active response
(f) Eyeball behavior
(g) Recovery capability check (S/P)

In FIG. 25B case where the driver is awake and away from the driver's seat (arousal state), the driver state and the observation state of the driver by the system change as illustrated in (h) to (g) below in FIGS. 25A, 25B, 25C, and 25D.

(h) State in which the driver is away from the driver's seat (the system observes that the driver is away from the driver's seat by passive monitoring and active monitoring)
(c) Driver's seat recovery
(d) Driving posture recovery
(e) Active response
(f) Eyeball behavior
(g) Recovery capability check (S/P)

That is, (a) passive monitoring and (b) waking up, getting up, and checking the surroundings in a case where the initial state of (1) is taking a nap are changed to (h) State in which the driver is away from the driver's seat (the system observes that the driver is away from the driver's seat by passive monitoring and active monitoring).

Furthermore, the transition time (t11) from the state (h) to the "state (c) driver's seat recovery" is earlier than the transition time (t1) from the "state (b) waking up, getting up, and checking the surroundings" to the "state (c) driver's seat recovery" in a case where the initial state of (1) is taking a nap.

This is because the state (h) is the arousal state in which the driver's consciousness is clearer than "the state (b) waking up, getting up, and checking the surroundings".

In FIG. 25C case where the driver is seated on the driver's seat but is not in the driving posture, the driver state and the observation state of the driver by the system change as illustrated in (i) to (g) below in FIGS. 25A, 25B, 25C, and 25D.

(i) State in which the driver is in a non-normal posture state at the driver's seat (the system observes that the driver is in a non-normal posture state at the driver's seat by passive monitoring and active monitoring)
(d) Driving posture recovery
(e) Active response
(f) Eyeball behavior
(g) Recovery capability check (S/P)

That is, (a) passive monitoring to (c) driver's seat recovery in a case where the initial state of (1) is taking a nap are changed to (i) state in which the driver is in a non-normal posture state at the driver's seat (the system observes that the driver is in a non-normal posture state at the driver's seat by passive monitoring and active monitoring).

Furthermore, the transition time (t22) from the state (i) to the "state (d) driving posture recovery" is earlier than the transition time (t12) from the "state (c) driver's seat recovery" to the "state (d) driving posture recovery" in a case where the initial state of (2) is away from the driver's seat.

This is because the state (i) is the state in which the driver is already in the driver's seat, and the recovery operation to the driver's seat is unnecessary.

In FIG. 25D case where the driver is executing a secondary task while keeping the driving posture, the driver state and the observation state of the driver by the system change as illustrated in (j) to (g) below in FIGS. 25A, 25B, 25C, and 25D.

(j) State in which the driver is executing the secondary task at the driver's seat (the system observes that the driver is executing the secondary task at the driver's seat by passive monitoring and active monitoring)
(e) Active response
(f) Eyeball behavior
(g) Recovery capability check (S/P)

That is, (a) passive monitoring to (d) driving posture recovery in a case where the initial state of (1) is taking a nap are changed to (j) state in which the driver is executing the secondary task at the driver's seat (the system observes that the driver is executing the secondary task at the driver's seat by passive monitoring and active monitoring).

As described above, the transition of the driver state or the observation state of the driver by the system varies depending on the initial state of the driver.

In this manner, the data processing unit 11 observes the state transition of the driver to the manual driving recovery described with reference to FIGS. 24, 25A, 25B, 25C, and 25D, calculates the transition grace time at the time of transition from the automatic driving to the manual driving, and further executes the evaluation processing for the recovery quality of the driver. Moreover, the data processing unit 11 executes a response such as warning, notification of an alert, or vibration output of the seat or the steering wheel in a case where a delay in recovery of the driver at the time of transition from the automatic driving to the manual driving is detected.

The evaluation value calculated by the evaluation processing for the recovery quality of the driver executed by the data processing unit 11 is stored in the storage unit 16 of the vehicle 10 or the server 30 as configuration data of the "conversion unnecessary data" described above with reference to FIG. 13.

Note that parameters (driver information) acquired by the driver information acquisition unit 12 include various types of information in the vehicle capable of switching the automatic driving to the manual driving.

Specific examples of the parameters (driver information) acquired by the driver information acquisition unit 12 will be described with reference to FIG. 26.

FIG. 26 illustrates correspondence data of the following data.

(1) Parameter (driver information) type
(2) Specific example of parameter (driver information) configuration data
(3) Recording permissibility according to the personal information protection regulation (GDPR)
(4) Use example of parameters (driver information)

(1) Parameter (driver information) type is divided into seven types from a 0th-order parameter to a sixth-order parameter.

Each parameter (driver information) will be described.

(0th-Order Parameter (Driver Information))

The 0th-order parameters (driver information) include face and iris data.

These data are data not permitted to be recorded by the personal information protection regulation (GDPR) stipulated by the EU.

The face and iris data, which are the 0th-order parameters (driver information), are used for personal authentication, for example.

Since the face and iris data, which are the 0th-order parameters (driver information), are data not permitted to be recorded by the personal information protection regulation (GDPR), the data are stored in the storage unit 16 of the vehicle 10 or the server 30 as abstraction data or encryption data.

(First-Order Parameter (Driver Information))

The first-order parameters (driver information) includes eyeball behavior analysis data (saccade, microsaccade, drift, fixation, angle of congestion, and the like).

These data are data permitted to be recorded by the personal information protection regulation (GDPR) stipulated by the EU.

The eyeball behavior analysis data (saccade, microsaccade, drift, fixation, angle of congestion, and the like), which are the first-order parameters (driver information), are used for arousal level evaluation based on brain activity and internal arousal analysis, for example.

Since the eyeball behavior analysis data (saccade, microsaccade, drift, fixation, angle of congestion, and the like), which are the first-order parameters (driver information), are data permitted to be recorded according to the personal information protection regulation (GDPR) stipulated by the EU, the eyeball behavior analysis data are stored as they are in the storage unit 16 of the vehicle 10 or the server 30 as the conversion unnecessary data.

(Second-Order Parameter (Driver Information))

The second-order parameters (driver information) include a percentage of eye closure evaluation value (PERCLOS), a face orientation, and a line-of-sight stability evaluation value (coordinates and indexing data).

Among these data, data including a face image and an eye image are data not permitted to be recorded by the personal information protection regulation (GDPR) stipulated by the EU.

The percentage of eye closure evaluation value (PERCLOS), the face orientation, and the line-of-sight stability evaluation value (coordinates and indexing data), which are the second-order parameters (driver information), are used for evaluation of fatigue, drowsiness, sleepiness sign, reduced consciousness, and line-of-sight stability, and steering and pedal steering stability, for example.

The percentage of eye closure evaluation value (PERCLOS), the face orientation, and the line-of-sight stability evaluation value (coordinates and indexing data), which are the second-order parameters (driver information), are stored in the storage unit 16 of the vehicle 10 or the server 30 as the abstraction data or encryption data because data including a face image or an eye image are not permitted to be recorded according to the personal information protection regulation (GDPR) stipulated by the EU.

Data not including a face image or an eye image in the data is stored as it is in the storage unit 16 of the vehicle 10 or the server 30 as the conversion unnecessary data.

(Third-Order Parameter (Driver Information))

The third-order parameters (driver information) include position, seating posture, and limb joint posture movement data by limb joint posture movement data ToF sensors and the like.

Among these data, data including a face image, a body image, and an eye image are data not permitted to be recorded by the personal information protection regulation (GDPR) stipulated by the EU.

The position, seating posture, and limb joint posture movement data by limb joint posture movement data ToF sensors and the like, which are the third-order parameters (driver information), are used for evaluation of the recovery action to the manual driving, for example.

The position, seating posture, and limb joint posture movement data by limb joint posture movement data ToF sensors and the like, which are the third-order parameters (driver information), are stored in the storage unit 16 of the vehicle 10 or the server 30 as the abstraction data or encryption data because data including a face image, a body image, or an eye image are not permitted to be recorded according to the personal information protection regulation (GDPR) stipulated by the EU.

Data not including a face image, a body image, or an eye image in the data is stored as it is in the storage unit 16 of the vehicle 10 or the server 30 as the conversion unnecessary data.

(Fourth-Order Parameter (Driver Information))

The fourth-order parameter (driver information) includes electroencephalogram (EEG), pulse wave, and respiration data.

Among these data, individually-identifiable data is data not permitted to be recorded by the personal information protection regulation (GDPR) stipulated by the EU.

The electroencephalogram (EEG), the pulse wave, and the respiration data that are the fourth-order parameters (driver information) are used for, for example, the arousal level evaluation.

The electroencephalogram (EEG), the pulse wave, and the respiration data that are the fourth-order parameters (driver information) are data not permitted to be recorded according to the personal information protection regulation (GDPR) stipulated by the EU, and these data are stored in the storage unit 16 of the vehicle 10 or the server 30 as the abstraction data or encryption data.

In a case where the data is not individually-identifiable data, the data is stored as it is in the storage unit 16 of the vehicle 10 or the server 30 as the conversion unnecessary data.

(Fifth-Order Parameter (Driver Information))

The fifth-order parameters (driver information) include response characteristic data for system notification, warning, and information update, and the like.

These data are data permitted to be recorded by the personal information protection regulation (GDPR) stipulated by the EU.

The response characteristic data for system notification, warning, and information update, and the like, which are the fifth-order parameters (driver information), are used for arousal level evaluation, for example.

Since the response characteristic data for system notification, warning, and information update, and the like, which are the fifth-order parameters (driver information), are data permitted to be recorded according to the personal information protection regulation (GDPR) stipulated by the EU, the response characteristic data are stored as they are in the storage unit 16 of the vehicle 10 or the server 30 as the conversion unnecessary data.

(Sixth-Order Parameter (Driver Information))

The sixth-order parameters (driver information) include the handover data from the automatic driving to the manual driving and the recovery quality data after completion of the handover (the recovery delay time and the driving operation quality data after the recovery).

These data are data permitted to be recorded by the personal information protection regulation (GDPR) stipulated by the EU.

The handover data from the automatic driving to the manual driving and the recovery quality data after completion of the handover (the recovery delay time and the driving operation quality data after the recovery), which are the sixth-order parameters (driver information), are used for evaluation of manual driving recovery quality of the driver, for example.

Since the handover data from the automatic driving to the manual driving and the recovery quality data after completion of the handover (the recovery delay time and the driving operation quality data after the recovery), which are the sixth-order parameters (driver information), are data permitted to be recorded according to the personal information protection regulation (GDPR) stipulated by the EU, these data are stored as they are in the storage unit 16 of the vehicle 10 or the server 30 as the conversion unnecessary data.

As described above, the driver information acquired by the driver information acquisition unit 12 include various types of information in the vehicle capable of switching the automatic driving to the manual driving.

Note that, as described above, the acquired information analysis unit 51 of the data processing unit 11 illustrated in FIG. 13 includes, for example, the data discrimination table that defines to which one of "conversion unnecessary data" and "conversion necessary data" each data type such as an image, distance data, or a vital signal belongs, and determines to which one of "conversion necessary data" and "conversion unnecessary data" each of the driver information input from the driver information acquisition unit 12 and the environment information such as the vehicle information and the external information input from the environment information acquisition unit 13 belongs by reference to the data discrimination table.

Alternatively, the acquired information analysis unit 51 may be configured to execute, for example, image analysis to discriminate whether or not data violating the personal information protection regulation is included, and execute processing of classifying data into the "conversion necessary data" and the "conversion unnecessary data" on the basis of a discrimination result of a person, without using such a discrimination table.

Note that the acquired information analysis unit 51 of the data processing unit 11 illustrated in FIG. 13 calculates various evaluation values such as the arousal level evaluation value of the driver on the basis of the observation information of the driver input from the acquired information analysis unit 51, and stores the evaluation values in the server 30 or the storage unit 16.

For example, the information terminal 40 owned by a traffic crackdown executor such as a police officer illustrated in FIG. 13 can acquire the evaluation value from the storage unit 16 of the vehicle 10 or the server 30 and display the evaluation value on the terminal.

A data display example in the information terminal 40 will be described with reference to FIG. 27 and the subsequent drawings.

The data display example of the information terminal 40 illustrated in FIG. 27 and the subsequent drawings is different from the data display example described with reference to FIGS. 20 to 22 above, and is a data example of displaying data such as evaluation information of the recovery quality from the automatic driving to the manual driving.

Figure 27:
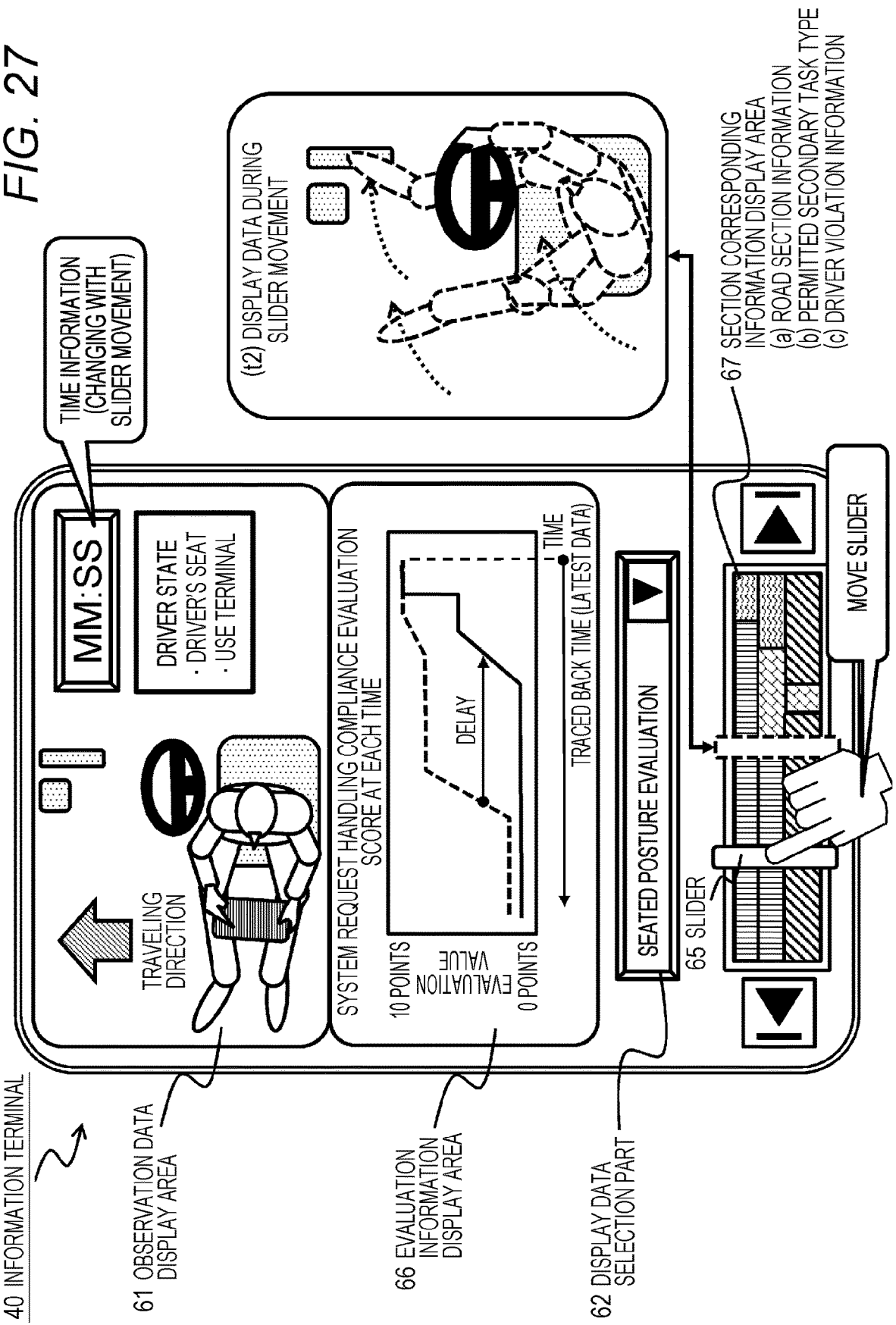
FIG. 27 is a diagram for describing an example of data displayed on an information terminal owned by a traffic crackdown executor such as a police officer.

In the example illustrated in FIG. 27, the observation data display area 61, the display data selection part 62, an evaluation information display area 66, and a section corresponding information display area 67 are set in the display terminal 40. The display data in these display areas are data displayed on the basis of the data stored in the storage unit 16 of the vehicle 10 or the server 30.

The observation data display area 61 is a display area similar to that described above with reference to FIG. 20. By moving the slider 65 from left to right, observation data corresponding to the passage of time is displayed in the observation data display area 61.

The image data indicating the posture information of the driver is displayed using the abstraction data stored in the storage unit 16 of the vehicle 10 or the server 30.

The display data selection part 62 is a selection part for selecting data to be displayed in the observation data display area 61 or the evaluation information display area.

In the illustrated example, "seating posture evaluation" is selected.

This is data obtained by evaluating the seating posture to the driver's seat required of the driver at the start preparation stage for the manual driving.

This evaluation data is data calculated by the acquired information analysis unit 51 of the data processing unit 11, and is stored in the server 30 or the storage unit 16 as the conversion unnecessary data.

As described with reference to FIGS. 24, 25A, 25B, 25C, and 25D, the data processing unit 11 observes the state transition of the driver to the manual driving recovery, calculates the transition grace time at the time of transition from the automatic driving to the manual driving, and further executes the evaluation processing for the recovery quality of the driver. In this evaluation processing, various evaluation values are calculated. The "seating posture evaluation" data illustrated in FIG. 27 is data generated in this evaluation processing.

The "seating posture evaluation" data is displayed in the evaluation information display area 66 illustrated in FIG. 27.

The seating posture evaluation data displayed in the evaluation information display area 66 illustrated in FIG. 27 is a graph having the time axis on the horizontal axis and the evaluation value (seating posture evaluation value) on the vertical axis. The evaluation value data traced back in the past from the latest acquired data is acquired and illustrated as a graph.

The solid line indicates evaluation value transition data according to the observation information of the driver, and the dotted line indicates expected evaluation value transition data.

The evaluation value ranges from 0 to 10 points, and the score increases as the seating posture is a seating posture that enables the driver to execute safer manual driving. It is necessary to reach 10 points before the manual driving start section, and it is favorable that the evaluation value transitions along the illustrated dotted line, that is, the expected evaluation value transition data.

In the illustrated example, the evaluation value transition data indicated by the solid line according to the observation information of the driver has a time delay with respect to the expected evaluation value transition data indicated by the dotted line.

That is, the driver can confirm that the preparation for manual driving was late.

By displaying and checking such an evaluation value, the police officer can perform processing such as imposing a penalty on the driver, for example.

Note that, in the section corresponding information display area 67, for example,
 (a) road section information,
 (b) permitted secondary task information, and
 (c) driver violation information
 are displayed as data corresponding road section positions.

The (a) road section information is information similar to the output information of the section information output part 63 described above with reference to FIG. 20. That is, the road section information is the section information corresponding to the traveling section display data described with reference to FIGS. 9, 10A, 10B, 10C, 10D, 11A, 11B, 11C, 12A, 12B, 12C, and 12D, and is section information of an automatic driving permitted section and a manual driving section.

As the (b) permitted secondary task information, secondary task information that may be executed by the driver is displayed according to each section. This data is data stored in the storage unit 16 of the vehicle 10 or the server 30 in advance.

The (c) driver violation information is data generated by the data processing unit 11 on the basis of the (b) permitted secondary task information and the driver observation information, and stored in the storage unit 16 of the vehicle 10 or the server 30 in advance.

For example, in a case where sleep is observed in a zone where sleep is not permitted, or the like, display indicating the violation, for example, red display is performed.

By checking such display data, the police officer can perform processing such as imposing a penalty on the driver, for example.

Thus, the police officer can perform processing such as imposing a penalty on the driver, for example.

Note that, by moving the slider 65 to the right, posture information of the driver after the passage of time is displayed in the observation data display area 61.

For example, (t2) display data after slider movement illustrated on the right side of FIG. 27 is displayed in the observation data display area 61.

Next, a different data display example on the information terminal 40 will be described with reference to FIG. 28.

Figure 28:
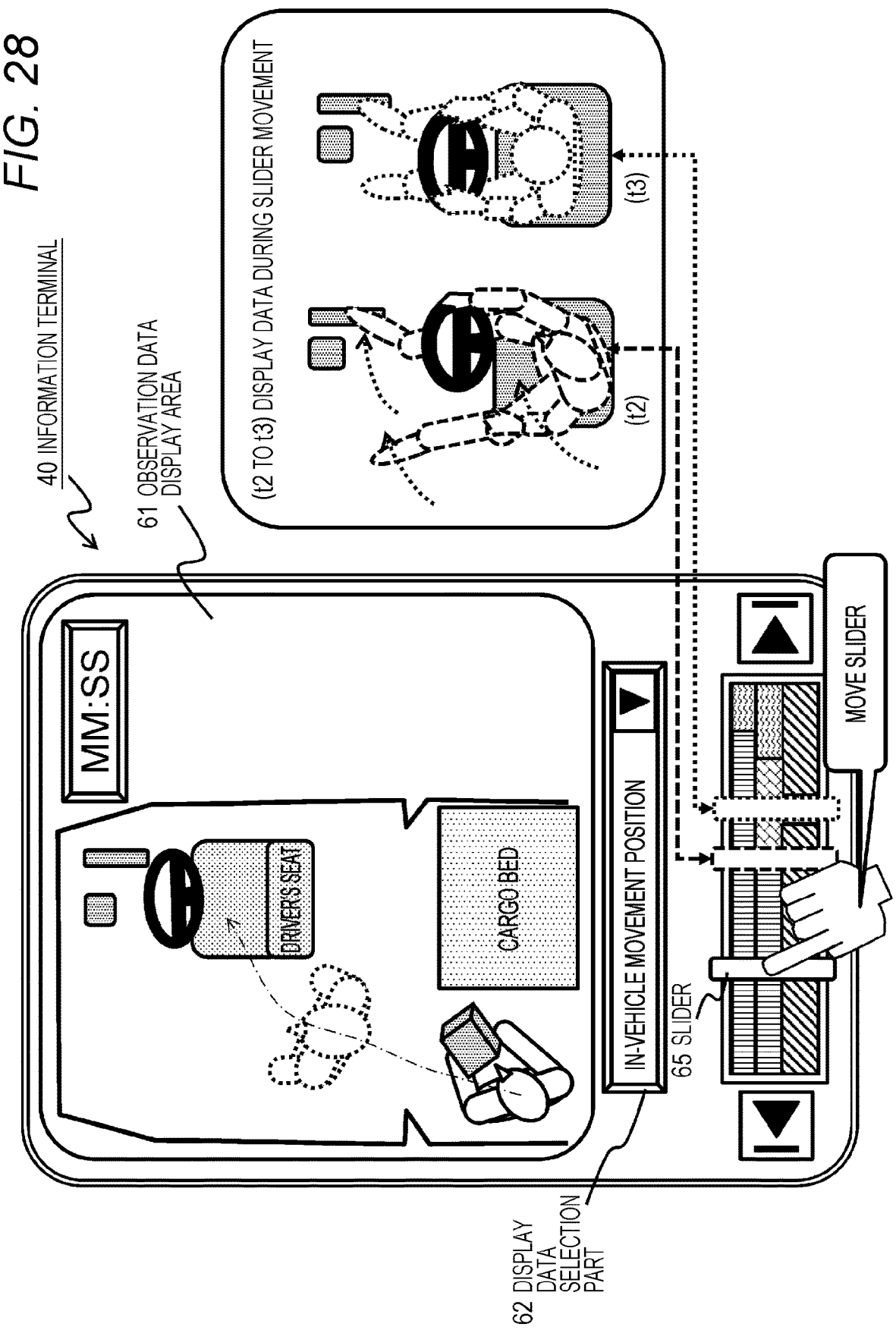
FIG. 28 is a diagram for describing an example of data displayed on an information terminal owned by a traffic crackdown executor such as a police officer.

The data display example illustrated in FIG. 28 is display data in a case where the "in-vehicle moving position" is specified in the display data selection part 62. In this case, movement aspect information of the driver is displayed in the observation data display area 61 of the display terminal 40. By moving the slider 65 from left to right, observation data corresponding to the passage of time is displayed in the observation data display area 61.

Image data indicating the movement information of the driver is displayed using the abstraction data stored in the storage unit 16 of the vehicle 10 or the server 30.

By moving the slider 65 to the right, movement information and posture information of the driver after the passage of time are displayed in the observation data display area 61.

For example, (t2 to t3) display data after slider movement illustrated on the right side of FIG. 28 is displayed in the observation data display area 61.

Moreover, a different data display example on the information terminal 40 will be described with reference to FIG. 29.

Figure 29:
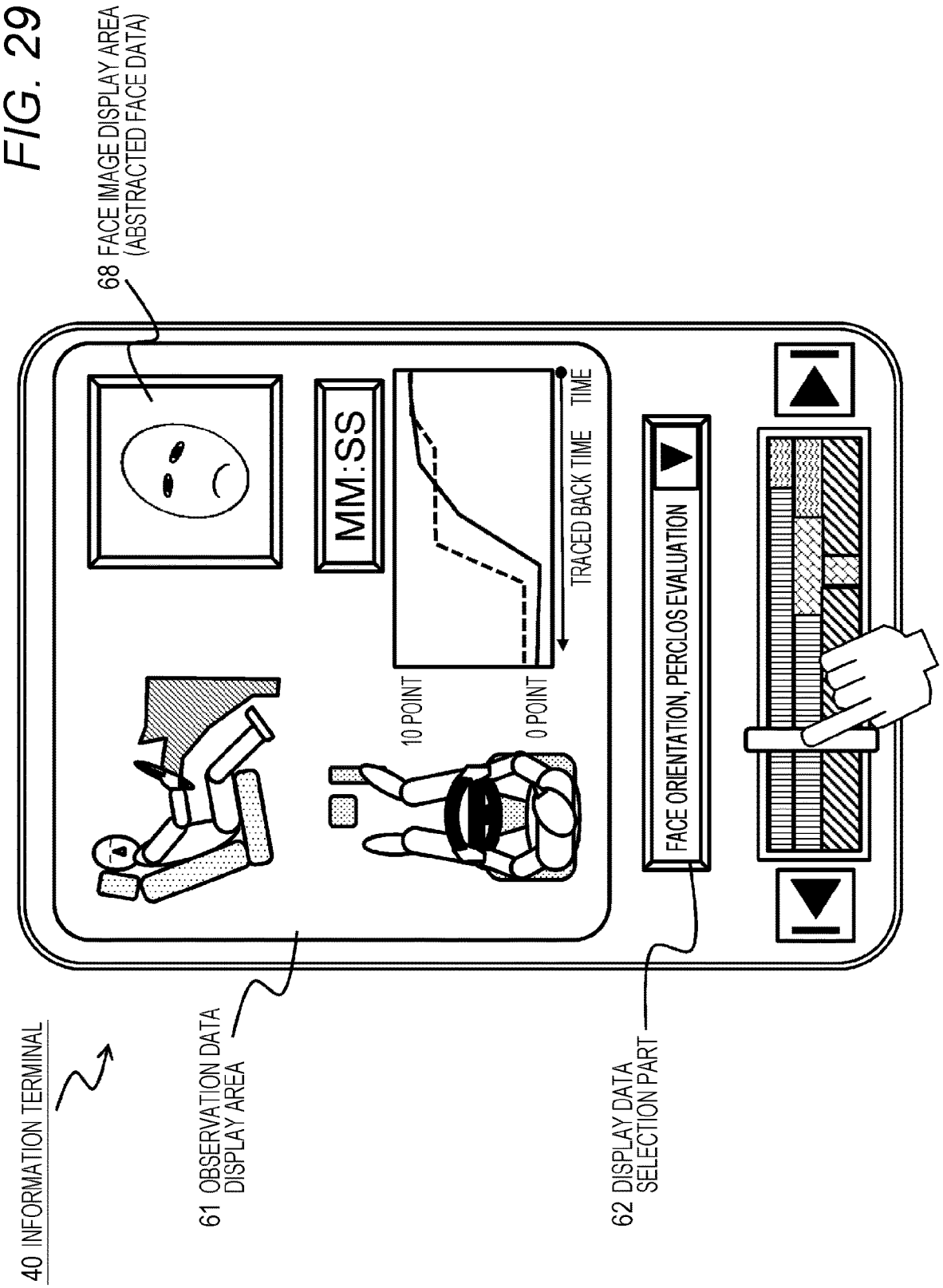
FIG. 29 is a diagram for describing a use example of data stored in a server or a storage unit.

The data display example illustrated in FIG. 29 is display data in a case where the "face orientation, percentage of eye closure evaluation value (PERCLOS)" is specified in the display data selection part 62. In this case, as illustrated, a face image display area 68 is set in the observation data display area 61 of the display terminal 40, and an image in which the face orientation and the percentage of eye closure evaluation value (PERCLOS) can be confirmed is displayed using the face abstraction data.

This display data is also displayed using the abstraction data stored in the storage unit 16 of the vehicle 10 or the server 30.

The abstraction data is displayed using, for example, a virtual image, an avatar, or a character image, and is data generated by the data processing unit 11 of the vehicle 10 on the basis of the acquired data of the driver information acquisition unit 12 as described above with reference to FIG. 13 and the subsequent drawings.

Therefore, in a case where a police officer or the like cracks down on a vehicle that violates the rules by a patrol car on patrol or the like, the police officer can confirm the situation at any timing or point going back from the present, using the information terminal 40. That is, by using the information terminal 40, various states such as the driver's posture state, the line-of-sight state, and the arousal state at arbitrary timing can be confirmed, and the violation can be quickly and reliably confirmed on the basis of the state confirmation.

In a case where the driver asserts no violation, for example, data stored in the storage unit 16 of the vehicle 10 or the server 30 is acquired as the encryption data, and decryption data can be generated and presented using a decryption key (password or the like) known only by the driver. By analyzing these pieces of presentation information, for example, it is also possible to confirm whether or not the secondary task permitted by the system on the vehicle 10 side is executable, whether or not a continuous secondary task ignoring the recovery notification is executed, and the like. In addition, it is also possible to confirm a situation such as a delay in recovery due to a failure of the notification system on the vehicle side or disregard of a reckless system recovery request notification. It is assumed that the driver performs violation in various different aspects such as executing the secondary task in a section where execution of the secondary task is not permitted, and executing the secondary task of an unacceptable type, and the encrypted record information has important significance for detailed analysis of these violations.

[8. Configuration Example of Mobile Device (Vehicle)]

Next, a specific configuration example of a mobile device 100 of the present disclosure corresponding to the vehicle 10 illustrated in FIG. 1 will be described.

Note that, hereinafter, in a case of distinguishing a vehicle provided with the mobile device 100 from other vehicles, the vehicle is referred to as user's own car or user's own vehicle.

The mobile device 100 includes an input unit 101, a data acquisition unit 102, a communication unit 103, an in-vehicle device 104, an output control unit 105, an output unit 106, a drive system control unit 107, a drive system 108, a body system control unit 109, a body system 110, a storage unit 111, and an automatic driving control unit 112.

The input unit 101, the data acquisition unit 102, the communication unit 103, the output control unit 105, the drive system control unit 107, the body system control unit 109, the storage unit 111, and the automatic driving control unit 112 are connected to one another via a communication network 121. The communication network 121 includes, for example, an on-board communication network conforming to an arbitrary standard such as a controller area network (CAN), a local interconnect network (LIN), a local area network (LAN), or FlexRay (registered trademark), a bus, and the like. Note that the units of the mobile device 100 may be directly connected without the communication network 121.

Note that, hereinafter, in a case where the units of the mobile device 100 perform communication via the communication network 121, the description of the communication network 121 is omitted. For example, the case where the input unit 101 and the automatic driving control unit 112 perform communication via the communication network 121 will be simply described as the input unit 101 and the automatic driving control unit 112 performing communication.

The input unit 101 includes a device used by an occupant to input various data, instructions, and the like. For example, the input unit 101 includes operation devices such as a touch panel, a button, a microphone, a switch, and a lever, an operation device capable of inputting data and instructions by a method other than a manual operation, such as voice or gesture, and the like. Furthermore, for example, the input unit 101 may be a remote control device using infrared rays or other radio waves, or an externally connected device such as a mobile device or a wearable device corresponding to the operation of the mobile device 100. The input unit 101 generates an input signal on the basis of the data, instructions, and the like input by the occupant, and supplies the input signal to each unit of the mobile device 100.

The data acquisition unit 102 includes various sensors that acquire data to be used for the processing of the mobile device 100, and supplies the acquired data to each unit of the mobile device 100.

For example, the data acquisition unit 102 includes various sensors for detecting the state of the user's own car and the like. Specifically, for example, the data acquisition unit 102 includes a gyro sensor, an acceleration sensor, an inertial measurement device (IMU), and sensors for detecting an operation amount of an accelerator pedal, an operation amount of a brake pedal, a steering angle of a steering wheel, an engine speed, a motor speed, a rotation speed of wheels, or the like.

Furthermore, for example, the data acquisition unit 102 includes various sensors for detecting information outside the user's own car. Specifically, for example, the data acquisition unit 102 includes imaging devices such as a time of flight (ToF) camera, a stereo camera, a monocular camera, an infrared camera, and other cameras. Furthermore, for example, the data acquisition unit 102 includes an environment sensor for detecting a weather, a meteorological phenomenon, or the like, and an ambient information detection sensor for detecting an object around the user's own car. The environment sensor includes, for example, a raindrop sensor, a fog sensor, a sunshine sensor, a snow sensor, and the like. The ambient information detection sensor includes, for example, an ultrasonic sensor, a radar, a light detection and ranging or laser imaging detection and ranging (LiDAR) device, a sonar, or the like.

Installation examples of various sensors for detecting the external information of the user's own car, which are configuration elements of the data acquisition unit 102, have been described with reference to FIG. 3.

A plurality of imaging devices and sensors is provided at various positions of the vehicle.

The data acquisition unit 102 further includes various sensors for detecting a current position of the user's own car. Specifically, for example, the data acquisition unit 102 includes a global navigation satellite system (GNSS) receiver that receives a GNSS signal from a GNSS satellite, or the like.

Furthermore, for example, the data acquisition unit 102 includes various sensors for detecting information inside the vehicle. Specifically, for example, the data acquisition unit 102 includes an imaging device that images a driver, a biosensor that detects biometric information of the driver, a microphone that collects sound in the interior of the vehicle, and the like. The biosensor is provided on, for example, a seating surface, a steering wheel, or the like, and detects a seating state of an occupant sitting on a seat or biometric information of the driver holding the steering wheel. As a vital signal, diversified observable data is available such as heart rate, pulse rate, blood flow, respiration, mind-body correlation, visual stimulation, EEG, sweating state, head posture behavior, eye, gaze, blink, saccade, microsaccade, fixation, drift, stare, percentage of eye closure evaluation value (PERCLOS), and iris pupil reaction. These pieces of activity observable information reflecting an observable driving state are aggregated as observable evaluation values estimated from observations, and recovery delay time characteristics associated with logs of the evaluation values are used as specific characteristics to a recovery delay case of the driver for calculating the recovery notification timing by a safety determination unit 155 to be described below.

Examples of various sensors for obtaining the information of the driver in the car included in the data acquisition unit 102 have been described with reference to FIG. 2.

That is, the data acquisition unit 102 includes a camera, a stereo camera, a ToF sensor, a seat strain gauge, and the like as detectors for detecting the position and posture of the driver. Furthermore, the data acquisition unit 102 includes a face recognition device (face (head) recognition), a driver eye tracker, a driver head tracker, and the like, as detectors for obtaining the activity observable information of the driver.

Furthermore, the data acquisition unit 102 includes a vital signal detector as a detector for obtaining activity observable information of the driver. Furthermore, the data acquisition unit 102 includes a driver authentication (driver identification) unit. Note that, as an authentication method, biometric authentication using a face, a fingerprint, an iris of a pupil, a voiceprint, or the like can be considered in addition to knowledge authentication using a password, a personal identification number, or the like.

The communication unit 103 communicates with the in-vehicle device 104 and various devices outside the vehicle, a server, a base station, and the like, transmits data supplied from each unit of the mobile device 100, and supplies received data to each unit of the mobile device 100. Note that a communication protocol supported by the communication unit 103 is not especially limited, and the communication unit 103 can support a plurality of types of communication protocols.

For example, the communication unit 103 performs wireless communication with the in-vehicle device 104, using a wireless LAN, Bluetooth (registered trademark), near field communication (NFC), a wireless USB (WUSB), or the like. Furthermore, for example, the communication unit 103 performs wired communication with the in-vehicle device 104, using a universal serial bus (USB), a high-definition multimedia interface (HDMI) (registered trademark), mobile high-definition link (MHL), or the like via a connection terminal (not illustrated) (and a cable if necessary).

Moreover, for example, the communication unit 103 communicates with a device (for example, an application server or a control server) existing on an external network (for example, the Internet, a cloud network, or a company specific network) via a base station or an access point. Furthermore, for example, the communication unit 103 communicates with a terminal (for example, a terminal of a pedestrian or a shop, or a machine type communication (MTC) terminal) existing in the vicinity of the user's own car, using a peer to peer (P2P) technology.

Moreover, for example, the communication unit 103 performs V2X communication such as vehicle to vehicle communication, vehicle to infrastructure communication, vehicle to home communication, and vehicle to pedestrian communication. Furthermore, for example, the communication unit 103 includes a beacon reception unit, and receives a radio wave or an electromagnetic wave transmitted from a wireless station or the like installed on a road, and acquires information such as a current position, congestion, traffic regulation, or required time. Note that pairing may be made with a vehicle traveling ahead while traveling in a section, which can be a leading vehicle, through the communication unit, and information acquired by a data acquisition unit mounted on the vehicle ahead may be acquired as pre-travel information and may be complementarily used as the data of the data acquisition unit 102 of the user's own car. In particular, this will be a means to secure the safety of following platooning vehicles, using platooning travel by the leading vehicle, for example.

The in-vehicle device 104 includes, for example, a mobile device (a tablet, a smartphone, or the like) or a wearable device of an occupant, an information device carried in or attached to the user's own car, and a navigation device for searching for a route to an arbitrary destination. Note that, considering that an occupant is not always fixed at a seat fixing position due to the spread of the automatic driving, the in-vehicle device 104 may be expanded to a video player, a game device, or any other devices that can be installed and removed from the vehicle to be used in the future. In the present embodiment, an example in which presentation of information of points requiring intervention of the driver is limited to an appropriate driver has been described. However, the information may be further provided to a subsequent vehicle in platooning traveling or the like, or the information provision may be combined with remote travel support to be used by constantly providing the information to an operation management center of passenger transportation shared buses and long-distance logistics commercial vehicles, as appropriate.

The output control unit 105 controls output of various types of information to the occupant of the user's own car or to the outside of the vehicle. The output control unit 105 controls output of visual information (for example, image data) and auditory information (for example, sound data) from the output unit 106 by generating an output signal including at least one of the visual information or the auditory information and supplying the output signal to the output unit 106, for example. Specifically, for example, the output control unit 105 synthesizes image data captured by different imaging devices of the data acquisition unit 102 to generate a bird's-eye view image, a panoramic image, or the like, and supplies an output signal including the generated image to the output unit 106. Furthermore, for example, the output control unit 105 generates sound data including a warning sound, a warning message, or the like for dangers of collision, contact, entry to a dangerous zone, or the like and supplies an output signal including the generated sound data to the output unit 106.

The output unit 106 includes a device capable of outputting the visual information or the auditory information to the occupant of the user's own car or to the outside of the vehicle. For example, the output unit 106 includes a display device, an instrument panel, an audio speaker, headphones, a wearable device such as a glasses-type display worn by the occupant, a projector, a lamp, or the like. The display device included in the output unit 106 may be, for example, a head-up display, a transmission-type display, or a device for displaying the visual information in a field of view of the driver, such as a device having an augmented reality (AR) display function, in addition to a device having a normal display.

The drive system control unit 107 controls the drive system 108 by generating various control signals and supplying the control signals to the drive system 108. Furthermore, the drive system control unit 107 supplies a control signal to each unit other than the drive system 108 to issue notification of a control state of the drive system 108, or the like, as needed.

The drive system 108 includes various devices related to the drive system of the user's own car. For example, the drive system 108 includes a drive force generation device for generating a drive force of an internal combustion engine, a drive motor, or the like, a drive force transmission mechanism for transmitting the drive force to the wheels, a steering mechanism for adjusting the steering angle, a braking device for generating a braking force, an antilock brake system (ABS), an electronic stability control (ESC), an electric power steering device, and the like.

The body system control unit 109 controls the body system 110 by generating various control signals and supplying the control signals to the body system 110. Furthermore, the body system control unit 109 supplies a control signal to each unit other than the body system 110 and notifies a control state of the body system 110, or the like, as needed.

The body system 110 includes various body-system devices mounted on a vehicle body. For example, the body system 110 includes a keyless entry system, a smart key system, a power window device, a power seat, a steering wheel, an air conditioner, various lamps (for example, headlights, backlights, brake lights, blinkers, fog lights, and the like), and the like.

The storage unit 111 includes, for example, a magnetic storage device such as a read only memory (ROM), a random access memory (RAM), and a hard disc drive (HDD), a semiconductor storage device, an optical storage device, a magneto-optical storage device, and the like. The storage unit 111 stores various programs, data, and the like used by each unit of the mobile device 100. For example, the storage unit 111 stores map data such as a three-dimensional high-precision map such as a dynamic map, a global map having less accuracy than the high-precision map but covering a large area, and a local map including information around the user's own car.

The automatic driving control unit 112 performs control related to the automatic driving such as autonomous driving or driving support. Specifically, for example, the automatic driving control unit 112 performs cooperative control for the purpose of implementing an advanced driver assistance system (ADAS) function including collision avoidance or shock mitigation of the user's own car, following travel based on a vehicular gap, vehicle speed maintaining travel, collision warning of the user's own car, lane out warning of the user's own car, and the like. Furthermore, for example, the automatic driving control unit 112 performs the cooperative control for the purpose of automatic driving or the like of autonomous travel without depending on an operation of the driver. The automatic driving control unit 112 includes a detection unit 131, a self-position estimation unit 132, a situation analysis unit 133, a planning unit 134, and an operation control unit 135.

The detection unit 131 detects various types of information necessary for controlling the automatic driving. The detection unit 131 includes a vehicle exterior information detection unit 141, a vehicle interior information detection unit 142, and a vehicle state detection unit 143.

The vehicle exterior information detection unit 141 performs processing of detecting information outside the user's own car on the basis of data or signals from each unit of the mobile device 100. For example, the vehicle exterior information detection unit 141 performs detection processing, recognition processing, and tracking processing, for an object around the user's own car, and processing of detecting a distance to the object and a relative speed. Objects to be detected include, for example, vehicles, people, obstacles, structures, roads, traffic signals, traffic signs, road markings, and the like.

Furthermore, for example, the vehicle exterior information detection unit 141 performs processing of detecting an environment around the user's own car. The surrounding environment to be detected includes, for example, weather, temperature, humidity, brightness, road surface condition, and the like. The vehicle exterior information detection unit 141 supplies data indicating results of the detection processing to the self-position estimation unit 132, a map analysis unit 151, a traffic rule recognition unit 152, and a situation recognition unit 153 of the situation analysis unit 133, and an emergency avoidance unit 171 and the like of the operation control unit 135.

The information acquired by the vehicle exterior information detection unit 141 can be mainly supplied and received from an infrastructure in the case of a traveling section stored in the local dynamic map (LDM), the section being constantly and importantly updated as a section where traveling by the automatic driving is available. Alternatively, the user's own vehicle may travel by constantly receiving information update in advance before entering a section, from a vehicle or a vehicle group traveling ahead in the section. Furthermore, in particular, for the purpose of more safely obtaining road information immediately before entering a section in a platooning travel or the like, such as a case where the latest local dynamic map is not constantly updated by the infrastructure, road environment information obtained from a leading vehicle having entered the section may be further supplementarily used. In many cases, the section where the automatic driving is available depends on the presence or absence of prior information provided by these infrastructures. The updated fresh local dynamic map (LDM) constituting the information regarding availability of traveling by automatic driving on a route provided by an infrastructure is equivalent to providing an unseen track as so-called "information". Note that the vehicle exterior information detection unit 141 is illustrated on the assumption that the vehicle exterior information detection unit 141 is mounted on the user's own vehicle for the sake of convenience. Pre-predictability at the time of traveling may be further improved by using information captured by a preceding vehicle as "information".

The vehicle interior information detection unit 142 performs processing of detecting information inside the vehicle on the basis of data or signals from each unit of the mobile device 100. For example, the vehicle interior information detection unit 142 performs driver authentication processing and recognition processing, driver state detection processing, occupant detection processing, vehicle interior environment detection processing, and the like. The state of the driver to be detected includes, for example, physical condition, arousal level, concentration level, fatigue level, line-of-sight direction, detailed eyeball behavior, and the like.

Moreover, in the future, the driver is expected to completely taking the driver's hands off from driving and steering operation in the automatic driving, and the driver temporarily goes to sleep or starts doing another work, and the system needs to grasp how far the arousal recovery of consciousness required for driving recovery is progressing. That is, in a conventional driver monitoring system, a main detection means detects a decrease in consciousness such as drowsiness. However, in the future, the driver will be completely uninvolved in the driving and steering. Therefore, the system has no means for directly observing an intervention level of the driver from steering stability of a steering device and the like, and needs to observe a consciousness recovery transition required for driving from a state where an accurate consciousness state of the driver is unknown, grasp an accurate internal arousal state of the driver, and proceed in intervention in the manual driving of steering from the automatic driving.

Therefore, the vehicle interior information detection unit 142 mainly has two major roles. The first role is passive monitoring of the driver's state during the automatic driving. The second role is to detect the driver's periphery recognition, perception, judgment, and an operation ability of the steering device up to the level at which the manual driving is possible from when the recovery request is issued from the system to when the vehicle approaches a section of driving under caution. As control, a failure self-diagnosis of the entire vehicle may be further performed, and in a case where the function of the automatic driving is deteriorated due to partial malfunction of the automatic driving, the driver may be similarly prompted to recover to the manual driving early. The passive monitoring here refers to a type of detection means that does not require a conscious response reaction from the driver, and does not exclude devices that detect a response signal by transmitting physical radio waves, light, or the like from the device. That is, the passive monitoring refers to monitoring of the driver's unconscious state, such as during a nap, and classification that is not the driver's cognitive response reaction is a passive system. The passive monitoring does not exclude active response devices that analyze and evaluate reflected or diffused signals obtained by emitting radio waves, infrared rays, or the like. Meanwhile, devices requesting the driver to give a conscious response requesting a response reaction are active systems.

The environment in the vehicle to be detected includes, for example, temperature, humidity, brightness, odor, and the like. The vehicle interior information detection unit 142 supplies data indicating results of the detection processing to the situation recognition unit 153 of the situation analysis unit 133 and the operation control unit 135. Note that, in a case where it is revealed that the driver cannot achieve the manual driving within an appropriate deadline after the driving recovery instruction to the driver is issued from the system, and it is determined that the handover will not be in time even if deceleration control is performed in self-operation to give a time, an instruction is given to the emergency avoidance unit 171 and the like of the system, and deceleration, evacuation, and stop procedures are started for evacuating the vehicle. That is, even in a situation where the handover cannot be in time as an initial state, it is possible to earn time to reach a handover limit by decelerating the vehicle early. By earning time to reach the handover limit, there is time to spare for the system to handle the event, and it is possible to handle for ensuring safety. Note that, as will be described below, application of unnecessary deceleration or slow traveling is limited because it increases factors inducing traffic jam and rear-end collision risk.

The vehicle state detection unit 143 performs processing of detecting the state of the user's own car on the basis of data or signals from each unit of the mobile device 100. The state of the user's own car to be detected includes, for example, speed, acceleration, steering angle, presence or absence of abnormality, content of abnormality, state of driving operation, position and tilt of a power seat, a state of door lock, states of other in-vehicle devices, and the like. The vehicle state detection unit 143 supplies data indicating results of the detection processing to the situation recognition unit 153 of the situation analysis unit 133, the emergency avoidance unit 171 of the operation control unit 135, and the like.

The self-position estimation unit 132 performs processing of estimating the position, posture, and the like of the user's own car on the basis of the data or signals from the units of the mobile device 100, such as the vehicle exterior information detection unit 141 and the situation recognition unit 153 of the situation analysis unit 133. Furthermore, the self-position estimation unit 132 generates a local map (hereinafter referred to as self-position estimation map) to be used for estimating the self-position, as needed.

The self-position estimation map is a high-precision map using a technology such as simultaneous localization and mapping (SLAM). The self-position estimation unit 132 supplies data indicating a result of the estimation processing to the map analysis unit 151, the traffic rule recognition unit 152, and the situation recognition unit 153 of the situation analysis unit 133, and the like. Furthermore, the self-position estimation unit 132 causes the storage unit 111 to store the self-position estimation map.

The situation analysis unit 133 performs processing of analyzing the situation of the user's own car and its surroundings. The situation analysis unit 133 includes the map analysis unit 151, the traffic rule recognition unit 152, the situation recognition unit 153, a situation prediction unit 154, and a safety determination unit 155.

The map analysis unit 151 performs processing of analyzing various maps stored in the storage unit 111, using the data or signals from the units of the mobile device 100, such as the self-position estimation unit 132 and the vehicle exterior information detection unit 141, as needed, and builds a map including information necessary for automatic driving processing. The map analysis unit 151 supplies the built map to the traffic rule recognition unit 152, the situation recognition unit 153, the situation prediction unit 154, and a route planning unit 161, an action planning unit 162, and an operation planning unit 163 of the planning unit 134, and the like.

The traffic rule recognition unit 152 performs processing of recognizing a traffic rule around the user's own car on the basis of the data or signals from the units of the mobile device 100, such as the self-position estimation unit 132, the vehicle exterior information detection unit 141, and the map analysis unit 151. By the recognition processing, for example, the position and state of signals around the user's own car, the content of traffic regulation around the user's own car, a travelable lane, and the like are recognized. The traffic rule recognition unit 152 supplies data indicating a result of the recognition processing to the situation prediction unit 154 and the like.

The situation recognition unit 153 performs processing of recognizing the situation regarding the user's own car on the basis of the data or signals from the units of the mobile device 100, such as the self-position estimation unit 132, the vehicle exterior information detection unit 141, the vehicle interior information detection unit 142, the vehicle state detection unit 143, and the map analysis unit 151. For example, the situation recognition unit 153 performs processing of recognizing the situation of the user's own car, the situation around the user's own car, the situation of the driver of the user's own car, and the like. Furthermore, the situation recognition unit 153 generates a local map (hereinafter referred to as situation recognition map) used for recognizing the situation around the user's own car, as needed. The situation recognition map is, for example, an occupancy grid map.

The situation of the user's own car to be recognized is, for example, the position, posture, and motion of the user's own car (for example, speed, acceleration, moving direction, and the like), and a cargo load capacity and movement of the center of gravity of the vehicle body accompanying cargo loading, a tire pressure, a braking distance movement accompanying wear of a braking pad, allowable maximum deceleration braking to prevent cargo movement caused by load braking, and a centrifugal relaxation limit speed at the time of traveling on a curve with a liquid load, which are specific to the vehicle and determining motion characteristics of the user's own car. Moreover, the recovery start timing required for control is different depending on the conditions specific to the loading cargo, the characteristics specific to the vehicle itself, the load, and the like even if the road environment such as a friction coefficient of a road surface, a road curve, or a slope is exactly the same. Therefore, such various conditions need to be collected and learned, and reflected in the optimum timing for performing control. Simply observing and monitoring the presence or absence and content of abnormality of the user's own vehicle, for example, is not sufficient in determining the control timing according to the type of the vehicle and the load. To secure a certain level of safety in the transportation industry, or the like, according to unique characteristics of the load, parameters for determining addition of time for desired recovery may be set as a fixed value in advance, and it is not always necessary to uniformly set all notification timing determination conditions by self-accumulation learning.

The situation around the user's own car to be recognized include, for example, types and positions of surrounding stationary objects, types of surrounding moving objects, positions and motions (for example, speed, acceleration, moving direction, and the like), configurations of surrounding roads and conditions of road surfaces, as well as surrounding weather, temperature, humidity, brightness, and the like. The state of the driver to be recognized includes, for example, physical condition, arousal level, concentration level, fatigue level, line-of-sight motion, driving operation, and the like. To cause the vehicle to safely travel, a control start point requiring measures greatly differs depending on a loading capacity mounted in a state specific to the vehicle, a chassis fixed state of a mounting unit, a decentered state of the center of gravity, a maximum decelerable acceleration value, a maximum loadable centrifugal force, a recovery response delay amount according to the state of the driver, and the like.

The situation recognition unit 153 supplies data indicating a result of the recognition processing (including the situation recognition map, as needed) to the self-position estimation unit 132, the situation prediction unit 154, and the like. Furthermore, the situation recognition unit 153 causes the storage unit 111 to store the situation recognition map.

The situation prediction unit 154 performs processing of predicting the situation regarding the user's own car on the basis of the data or signals from the units of the mobile device 100, such as the map analysis unit 151, the traffic rule recognition unit 152, and the situation recognition unit 153. For example, the situation prediction unit 154 performs processing of predicting the situation of the user's own car, the situation around the user's own car, the situation of the driver, and the like.

The situation of the user's own car to be predicted includes, for example, a behavior of the user's own car, occurrence of abnormality, a travelable distance, and the like. The situation around the user's own car to be predicted includes, for example, a behavior of a moving object around the user's own car, a change in a signal state, a change in the environment such as weather, and the like. The situation of the driver to be predicted includes, for example, a behavior and physical conditions of the driver, and the like.

The situation prediction unit 154 supplies data indicating a result of the prediction processing together with the data from the traffic rule recognition unit 152 and the situation recognition unit 153 to the route planning unit 161, the action planning unit 162, the operation planning unit 163 of the planning unit 134, and the like.

The safety determination unit 155 learns optimum recovery timing according to the recovery action pattern of the driver, the vehicle characteristics, and the like, and provides the learned information to the situation recognition unit 153 and the like. As a result, for example, it is possible to present to the driver statistically determined optimum timing required for the driver to normally recover from the automatic driving to the manual driving at a predetermined ratio or more.

The route planning unit 161 plans a route to a destination on the basis of the data or signals from the units of the mobile device 100, such as the map analysis unit 151 and the situation prediction unit 154. For example, the route planning unit 161 sets a route to a destination specified from a current position on the basis of the global map. Furthermore, for example, the route planning unit 161 appropriately changes the route on the basis of situations of congestion, accidents, traffic regulations, construction, and the like, the physical conditions of the driver, and the like. The route planning unit 161 supplies data indicating the planned route to the action planning unit 162 and the like.

The action planning unit 162 plans an action of the user's own car for safely traveling in the route planned by the route planning unit 161 within a planned time on the basis of the data or signals from the units of the mobile device 100 such as the map analysis unit 151 and the situation prediction unit 154. For example, the action planning unit 162 makes a plan of starting, stopping, traveling directions (for example, forward, backward, turning left, turning right, turning, and the like), traveling lane, traveling speed, passing, and the like. The action planning unit 162 supplies data indicating the planned action of the user's own car to the operation planning unit 163 and the like.

The operation planning unit 163 plans an operation of the user's own car for implementing the action planned by the action planning unit 162 on the basis of the data or signals from the units of the mobile device 100, such as the map analysis unit 151 and the situation prediction unit 154. For example, the operation planning unit 163 plans acceleration, deceleration, a traveling track, and the like. The operation planning unit 163 supplies data indicating the planned operation of the user's own car to an acceleration and deceleration control unit 172 and a direction control unit 173 of the operation control unit 135, and the like.

The operation control unit 135 controls the operation of the user's own car. The operation control unit 135 includes the emergency avoidance unit 171, the acceleration and deceleration control unit 172, and the direction control unit 173.

The emergency avoidance unit 171 performs processing of detecting an emergency situation such as collision, contact, entry into a danger zone, driver's abnormality, and vehicle's abnormality on the basis of the detection results of the vehicle exterior information detection unit 141, the vehicle interior information detection unit 142, and the vehicle state detection unit 143. In a case where the emergency avoidance unit 171 detects occurrence of the emergency situation, the emergency avoidance unit 171 plans the operation of the user's own car for avoiding the emergency situation, such as sudden stop or sharp turn. The emergency avoidance unit 171 supplies data indicating the planned operation of the user's own car to the acceleration and deceleration control unit 172, the direction control unit 173, and the like.

The acceleration and deceleration control unit 172 performs acceleration and deceleration control for implementing the operation of the user's own car planned by the operation planning unit 163 or the emergency avoidance unit 171. For example, the acceleration and deceleration control unit 172 calculates a control target value of a drive force generation device or a braking device for implementing the planned acceleration, deceleration, or sudden stop, and supplies a control command indicating the calculated control target value to the drive system control unit 107. Note that, there are two main cases where an emergency situation may occur. That is, there are a case where an unexpected accident has occurred due to a sudden reason during the automatic driving on a road on a traveling route, which is originally supposed to be safe according to the local dynamic map or the like acquired from an infrastructure and an emergency recovery of the driver cannot be in time, and a case where the driver has a difficulty in accurately recovering to the manual driving from the automatic driving.

The direction control unit 173 controls a direction for implementing the operation of the user's own car planned by the operation planning unit 163 or the emergency avoidance unit 171. For example, the direction control unit 173 calculates a control target value of a steering mechanism for implementing the traveling track or sharp turn planned by the operation planning unit 163 or the emergency avoidance unit 171, and supplies a control command indicating the calculated control target value to the drive system control unit 107.

[9. Configuration Example of Information Processing Device]

Figure 30:
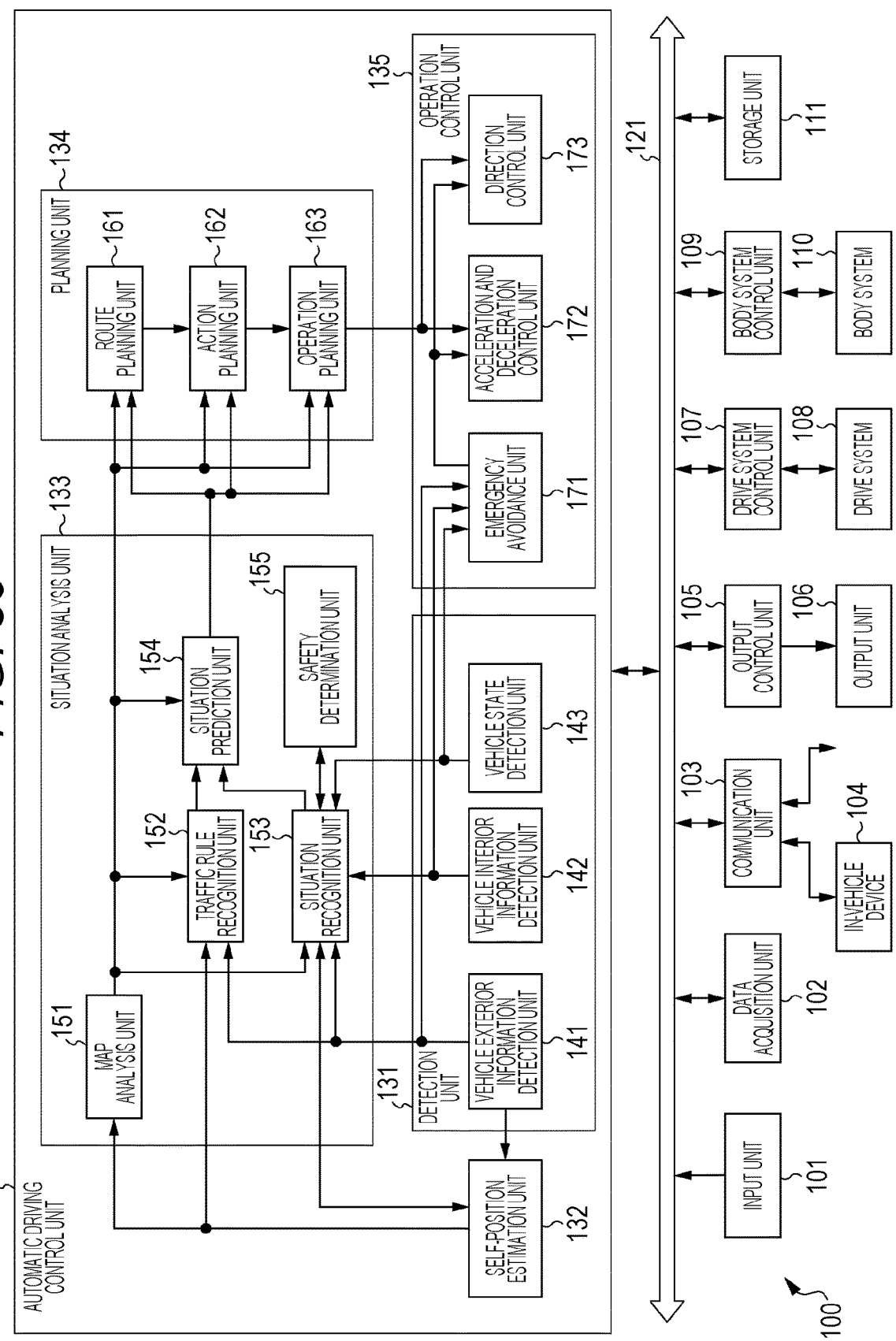
FIG. 30 is a diagram for describing a configuration example of the mobile device according to the present disclosure.

The above-processing can be executed by applying the configuration of the mobile device described with reference to FIG. 30. However, part of the processing can be executed by an information processing device attachable to and detachable from the mobile device, for example.

A hardware configuration example of such an information processing device will be described with reference to FIG. 31.

Note that the configuration described with reference to FIG. 31 can also be applied as a hardware configuration of the server 30 illustrated in FIGS. 1 and 13 or the information terminal 40 illustrated in FIG. 13.

FIG. 31 is a diagram illustrating a hardware configuration example of the information processing device.

A central processing unit (CPU) 301 functions as a data processing unit that execute various types of processing according to a program stored in a read only memory (ROM) 302 or a storage unit 308. For example, the CPU 301 executes processing according to the sequence described in the above example.

A random access memory (RAM) 303 stores the program executed by the CPU 301, data, and the like. These CPU 301, ROM 302, and RAM 303 are mutually connected by a bus 304.

The CPU 301 is connected to an input/output interface 305 via the bus 304. An input unit 306 including various switches, a keyboard, a touch panel, a mouse, a microphone, an information acquisition unit such as a sensor, a camera, and GPS, and the like and an output unit 307 including a display, a speaker, and the like are connected to the input/output interface 305.

Note that input information from a sensor 321 is also input to the input unit 306.

Furthermore, the output unit 307 also outputs drive information for a drive unit 322 of the mobile device.

The CPU 301 receives commands, situation data, and the like input from the input unit 306, executes various types of processing, and outputs processing results to the output unit 307, for example.

The storage unit 308 connected to the input/output interface 305 includes, for example, a hard disk and the like, and stores the program executed by the CPU 301 and various data. A communication unit 309 functions as a transmission/reception unit for data communication via a network such as the Internet or a local area network, and communicates with an external device.

A drive 310 connected to the input/output interface 305 drives a removable medium 311 such as a magnetic disk, an optical disk, a magneto-optical disk, or a semiconductor memory such as a memory card, and executes data recording or reading.

[10. Conclusion of Configurations of Present Disclosure]

The examples of the present disclosure have been described in detail with reference to the specific examples. However, it is obvious that those skilled in the art can make modifications and substitutions of the embodiments without departing from the gist of the present disclosure. That is, the present invention has been disclosed in the form of exemplification, and should not be restrictively interpreted. To judge the gist of the present disclosure, the scope of claims should be taken into consideration.

Note that the technology disclosed in the present description can have the following configurations.

(1) An information processing device including:
    a driver information acquisition unit configured to acquire observation information of a driver of a vehicle; and
    a data processing unit configured to input the observation information and execute data processing, in which
    the data processing unit divides the observation information into conversion unnecessary data and conversion necessary data, and executes data conversion processing of at least one of abstraction processing or encryption processing for the conversion necessary data, and stores conversion data of at least one of generated abstraction data or generated encryption data in a storage unit.

(2) The information processing device according to (1), in which the data processing unit extracts individually-identifiable data included in the observation information as the conversion necessary data, and executes the data conversion processing of at least one of abstraction processing or encryption processing for the individually-identifiable data.

(3) The information processing device according to (2), in which the individually-identifiable data is image data including at least a part of a body of the driver.

(4) The information processing device according to (2), in which the individually-identifiable data is image data including a face of the driver.

(5) The information processing device according to any one of (1) to (4), in which the data processing unit extracts data for which recording processing is not permitted in personal information protection regulation as the conversion necessary data, and executes the data conversion processing of at least one of abstraction processing or encryption processing.

(6) The information processing device according to any one of (1) to (5), in which the data processing unit stores the conversion unnecessary data in the storage unit without performing the abstraction processing or the encryption processing.

(7) The information processing device according to any one of (1) to (6), in which the data processing unit executes the encryption processing for the conversion necessary data, using a key known only by the driver.

(8) The information processing device according to any one of (1) to (7), in which the data processing unit performs the abstraction processing using skeleton data, an avatar, or a virtual model, reflecting a motion of a body of the driver, as the abstraction processing for an image of the driver included in the conversion necessary data.

(9) The information processing device according to any one of (1) to (8), further including:

an environment information acquisition unit configured to acquire observation information of the vehicle and an outside, in which the data processing unit divides the observation information acquired by the environment information acquisition unit into conversion unnecessary data and conversion necessary data, and executes data conversion processing of at least one of abstraction processing or encryption processing for the conversion necessary data included in the observation information acquired by the environment information acquisition unit, and stores conversion data of at least one of generated abstraction data or generated encryption data in a storage unit.

(10) The information processing device according to any one of (1) to (9), in which the vehicle is a vehicle capable of switching automatic driving and manual driving, and the data processing unit calculates a driver evaluation value that is an index value indicating whether or not the driver is in a state of being able to start the manual driving on the basis of the observation information, and stores the calculated driver evaluation value in the storage unit as the conversion unnecessary data.

(11) The information processing device according to (10), in which the data processing unit calculates a driver arousal level evaluation value that is an index value indicating whether or not the driver is in an arousal state of being able to start the manual driving on the basis of the observation information, and stores the calculated driver arousal level evaluation value in the storage unit as the conversion unnecessary data.

(12) The information processing device according to any one of (1) to (11), in which the data processing unit stores the conversion unnecessary data acquired from the observation information, and the conversion data of at least one of the abstraction data or the encryption data of the conversion necessary data in at least one of a storage unit in the vehicle or an external server in association with identification information of the driver.

(13) A mobile device capable of switching automatic driving and manual driving, the mobile device including:

a driver information acquisition unit configured to acquire observation information of a driver of a vehicle; and a data processing unit configured to input the observation information and execute data processing, in which the data processing unit divides the observation information into conversion unnecessary data and conversion necessary data, executes data conversion processing of at least one of abstraction processing or encryption processing for the conversion necessary data, and stores conversion data of at least one of generated abstraction data or generated encryption data in a storage unit, and calculates a driver evaluation value that is an index value indicating whether or not the driver is in a state of being able to start the manual driving on the basis of the observation information, and stores the calculated driver evaluation value in the storage unit as the conversion unnecessary data.

(14) The mobile device according to (13), in which the data processing unit calculates notification timing of a manual driving recovery request notification that is a recovery request notification from the automatic driving to the manual driving for the driver on the basis of the observation information.

(15) An information processing system including: a vehicle; and an information terminal, in which the vehicle acquires observation information of a driver of a vehicle, divides the acquired observation information into conversion unnecessary data and conversion necessary data, and executes data conversion processing of at least one of abstraction processing or encryption processing for the conversion necessary data and executes processing of storing conversion data of at least one of generated abstraction data and generated encryption data in a storage unit in association with identification information of the driver, and the information terminal acquires the abstraction data from the storage unit and displays the abstraction data on a display unit of the information terminal, and identifies the driver on the basis of the identification information of the driver associated with the displayed abstraction data.

(16) The information processing system according to (15), in which the vehicle is a vehicle capable of switching automatic driving and manual driving, the vehicle calculates a driver evaluation value that is an index value indicating whether or not the driver is in a state of being able to start the manual driving on the basis of the observation information, and stores the calculated driver evaluation value in the storage unit as the conversion unnecessary data, and the information terminal acquires the driver evaluation value from the storage unit and displays the driver evaluation value on the display unit of the information terminal.

(17) An information processing method executed in an information processing device, the information processing method including:

by a driver information acquisition unit, acquiring observation information of a driver of a vehicle; and by a data processing unit, dividing the observation information into conversion unnecessary data and conversion necessary data; and executing data conversion processing of at least one of abstraction processing or encryption processing for the conversion necessary data, and storing conversion data of at least one of generated abstraction data or generated encryption data in a storage unit.

(18) An information processing method executed in an information processing system including a vehicle and an information terminal, the information processing method including:

by the vehicle, acquiring observation information of a driver of a vehicle;

dividing the acquired observation information into conversion unnecessary data and conversion necessary data; and executing data conversion processing of at least one of abstraction processing or encryption processing for the conversion necessary data and executing processing of storing conversion data of at least one of generated abstraction data and generated encryption data in a storage unit in association with identification information of the driver; and by the information terminal, acquiring the abstraction data from the storage unit and displaying the abstraction data on a display unit of the information terminal; and identifying the driver on the basis of the identification information of the driver associated with the displayed abstraction data.

(19) A program for causing information processing to be executed in an information processing device, the program for causing:

a driver information acquisition unit to acquire observation information of a driver of a vehicle; and a data processing unit to divide the observation information into conversion unnecessary data and conversion necessary data; and to execute data conversion processing of at least one of abstraction processing or encryption processing for the conversion necessary data, and to execute processing of storing conversion data of at least one of generated abstraction data or generated encryption data in a storage unit.

Furthermore, the series of processing described in the description can be executed by hardware, software, or a combined configuration of the hardware and software. In the case of executing the processing by software, a program, in which the processing sequence is recorded, can be installed in a memory of a computer incorporated in dedicated hardware and executed by the computer, or the program can be installed in and executed by a general-purpose computer capable of executing various types of processing. For example, the program can be recorded in the recording medium in advance. Other than the installation from the recording medium to the computer, the program can be received via a network such as a local area network (LAN) or the Internet and installed on a recording medium such as a built-in hard disk.

Note that the various types of processing described in the description may be executed not only in chronological order as described but also in parallel or individually depending on the processing capability of the device that executes the process or as required. Furthermore, the system in the present description is a logical aggregate configuration of a plurality of devices, and is not limited to devices having respective configurations within the same housing.

INDUSTRIAL APPLICABILITY

As described above, according to a configuration of an embodiment of the present disclosure, individually-identifiable data included in observation information of a driver or the like of a vehicle or data for which recording processing is not permitted in a personal information protection regulation is abstracted or encrypted and recorded.

Specifically, for example, a driver information acquisition unit that acquires the observation information of the driver of the vehicle and a data processing unit that inputs the observation information and executes data processing are included. The data processing unit divides the observation information into conversion unnecessary data and conversion necessary data, executes abstraction processing or encryption processing for the conversion necessary data, and stores conversion data such as generated abstraction data or generated encryption data in a storage unit. The data processing unit extracts the individually-identifiable data included in the observation information or the data for which recording processing is not permitted in the personal information protection regulation as the conversion necessary data, and executes the abstraction processing or the encryption processing.

With this configuration, it becomes possible to record data effective for clarifying responsibility for accidents and violations without violating the personal information protection regulation.

Furthermore, the effect of introducing the above-described configuration is not only a primary violation suppression effect such as a traffic violation control, but also an effect of suppressing a reckless response when the driver uses the automatic driving, for example, a response that the driver completely abandons recovery to the manual driving.

In the configuration of the present disclosure, the driver state is recorded and can be viewed on an information terminal of a police officer or the like, whereby the driver intuitively and naturally avoids a reckless response at the time of using the automatic driving. As a result, excessive dependent use of the automatic driving function can be suppressed. Furthermore, in recent years, there has been an increase in some automatically drivable vehicles having, for example, automatic brakes. However, by using the configuration of the present disclosure, it is possible to prevent a dangerous response of the driver such as excessive dependence on the automatic driving function even in such a vehicle.

REFERENCE SIGNS LIST

10 Vehicle
11 Data processing unit
12 Driver information acquisition unit
13 Environment information acquisition unit
14 Communication unit
15 Notification unit
16 Storage unit
20 Driver
30 Server
51 Acquired information analysis unit
52 Data conversion unit
53 Data abstraction unit
54 Encryption processing unit
58 Sensor
100 Mobile device
101 Input unit
102 Data acquisition unit
103 Communication unit
104 In-vehicle device
105 Output control unit
106 Output unit
107 Drive system control unit
108 Drive system
109 Body system control unit
110 Body system
111 Storage unit
112 Automatic driving control unit
121 Communication network
131 Detection unit
132 Self-position estimation unit
133 Situation analysis unit
134 Planning unit
135 Operation control unit
141 Vehicle exterior information detection unit
142 Vehicle interior information detection unit
143 Vehicle state detection unit
151 Map analysis unit
152 Traffic rule recognition unit
153 Situation recognition unit
154 Situation prediction unit
155 Safety determination unit
161 Route planning unit
162 Action planning unit
163 Operation planning unit
171 Emergency avoidance unit
172 Acceleration and deceleration control unit
173 Direction control unit
301 CPU
302 ROM
303 RAM
304 Bus
305 Input/output interface
306 Input unit
307 Output unit
308 Storage unit
309 Communication unit
310 Drive
311 Removable medium
321 Sensor
322 Drive unit

The invention claimed is:

1. An information processing device, comprising:
a central processing unit (CPU) configured to:
acquire observation information of a driver of a vehicle;
divide the observation information into conversion unnecessary data and conversion necessary data;
execute, as a data conversion process, at least one of:
an abstraction process for the conversion necessary data to generate abstraction data, or
an encryption process for the conversion necessary data to generate encryption data;
control a memory to store the at least one of the generated abstraction data or the generated encryption data in association with identification information of the driver; and
control display of traveling section display data of a travel route of the vehicle, wherein
the display of the traveling section display data includes a plurality of sections of the travel route,
each section of the plurality of sections is associated with at least one of an automatically drivable section, a manual driving section, or a handover section of the travel route,
the plurality of sections includes a first section and a second section,
the plurality of sections is displayed along a time axis in a first direction,
the first section has a first display width in a second direction that is opposite to the first direction,
the second section has a second display width in the second direction,
the second display width is different from the first display width, and
a difference in the second display width with respect to the first display width indicates a degree of reduction in the time axis of the second section with respect to the first section.

2. The information processing device according to claim 1, wherein the CPU is further configured to:
extract individually-identifiable data from the observation information as the conversion necessary data; and
execute, as the data conversion process, at least one of the abstraction process or the encryption process for the individually-identifiable data.

3. The information processing device according to claim 2, wherein the individually-identifiable data is image data that includes at least a part of a body of the driver.

4. The information processing device according to claim 2, wherein the individually-identifiable data is image data that includes a face of the driver.

5. The information processing device according to claim 1, wherein the CPU is further configured to:
extract data, for which recording processing is not permitted in personal information protection regulation, from the observation information as the conversion necessary data; and execute, as the data conversion process, at least one of the abstraction process or the encryption process for the extracted data.

6. The information processing device according to claim 1, wherein the CPU is further configured to control the memory to store the conversion unnecessary data without execution of the abstraction process or the encryption process.

7. The information processing device according to claim 1, wherein the CPU is further configured to execute the encryption process for the conversion necessary data, based on a key known only by the driver.

8. The information processing device according to claim 1, wherein
the CPU is further configured to generate, for an image of the driver in the conversion necessary data, the abstraction data based on at least one of skeleton data, an avatar, or a virtual model, and
the abstraction data for the image of the driver reflects a motion of a body of the driver.

9. The information processing device according to claim 1, wherein the observation information includes information associated with an inside of the vehicle and an outside of the vehicle.

10. The information processing device according to claim 1, wherein
the vehicle has a capability to switch between automatic driving and manual driving, and
the CPU is further configured to:
calculate, based on the observation information, a driver evaluation value that is an index value indicating whether the driver is in a state of being able to start the manual driving; and
control the memory to store the calculated driver evaluation value as the conversion unnecessary data.

11. The information processing device according to claim 10, wherein the CPU is further configured to:
calculate, based on the observation information, a driver arousal level evaluation value that is an index value indicating whether the driver is in an arousal state of being able to start the manual driving; and
control the memory to store the calculated driver arousal level evaluation value as the conversion unnecessary data.

12. The information processing device according to claim 1, wherein
the CPU is further configured to control the memory to store, in association with the identification information of the driver, the conversion unnecessary data and the at least one of the generated abstraction data or the generated encryption data of the conversion necessary data, and
at least one of the vehicle or an external server includes the memory.

13. A mobile device, comprising:
a central processing unit (CPU) configured to:
acquire observation information of a driver of a vehicle;
divide the observation information into conversion unnecessary data and conversion necessary data;
execute, as a data conversion process, at least one of:
an abstraction process for the conversion necessary data to generate abstraction data, or
an encryption process for the conversion necessary data to generate encryption data;
control a memory to store the at least one of the generated abstraction data or the generated encryption data in association with identification information of the driver;
calculate, based on the observation information, a driver evaluation value that is an index value indicating whether the driver is in a state of being able to start manual driving;
control the memory to store the calculated driver evaluation value as the conversion unnecessary data; and
control display of traveling section display data of a travel route of the vehicle, wherein
the display of the traveling section display data includes a plurality of sections of the travel route,
each section of the plurality of sections is associated with at least one of an automatically drivable section, a manual driving section, or a handover section of the travel route,
the plurality of sections includes a first section and a second section,
the plurality of sections is displayed along a time axis in a first direction,
the first section has a first display width in a second direction that is opposite to the first direction,
the second section has a second display width in the second direction,
the second display width is different from the first display width, and
a difference in the second display width with respect to the first display width indicates a degree of reduction in the time axis of the second section with respect to the first section.

14. The mobile device according to claim 13, wherein
the CPU is further configured to calculate, based on the observation information, notification timing of a manual driving recovery request notification, and
the manual driving recovery request notification is a recovery request notification that indicates a switch from automatic driving to the manual driving for the driver.

15. An information processing system, comprising:
a vehicle; and
an information terminal, wherein
the vehicle is configured to:
acquire observation information of a driver of the vehicle;
divide the acquired observation information into conversion unnecessary data and conversion necessary data;
execute, as a data conversion process, at least one of:
an abstraction process for the conversion necessary data to generate abstraction data, or
an encryption process for the conversion necessary data to generate encryption data;
control a memory to store the at least one of the generated abstraction data or the generated encryption data in association with identification information of the driver; and
control display of traveling section display data of a travel route of the vehicle, wherein
the display of the traveling section display data includes a plurality of sections of the travel route,
each section of the plurality of sections is associated with at least one of an automatically drivable section, a manual driving section, or a handover section of the travel route, the plurality of sections includes a first section and a second section,
the plurality of sections is displayed along a time axis in a first direction,
the first section has a first display width in a second direction that is opposite to the first direction,
the second section has a second display width in the second direction,
the second display width is different from the first display width, and
a difference in the second display width with respect to the first display width indicates a degree of reduction in the time axis of the second section with respect to the first section, and the information terminal is configured to:
acquire the abstraction data from the memory;
control display of the abstraction data on the information terminal; and
identify the driver based on the identification information of the driver associated with the displayed abstraction data.

16. The information processing system according to claim 15, wherein
the vehicle is further configured to:
switch between automatic driving and manual driving;
calculate, based on the observation information, a driver evaluation value that is an index value indicating whether the driver is in a state of being able to start the manual driving; and
control the memory to store the calculated driver evaluation value as the conversion unnecessary data, and
the information terminal is further configured to:
acquire the driver evaluation value from the memory; and
display the driver evaluation value on the information terminal.

17. An information processing method, comprising:
acquiring observation information of a driver of a vehicle;
dividing the observation information into conversion unnecessary data and conversion necessary data;
executing, as a data conversion process, at least one of:
abstraction processing for the conversion necessary data to generate abstraction data, or
encryption processing for the conversion necessary data to generate encryption data;
controlling a memory to store the at least one of the generated abstraction data or the generated encryption data in association with identification information of the driver; and
controlling display of traveling section display data of a travel route of the vehicle, wherein
the display of the traveling section display data includes a plurality of sections of the travel route,
each section of the plurality of sections is associated with at least one of an automatically drivable section, a manual driving section, or a handover section of the travel route,
the plurality of sections includes a first section and a second section,
the plurality of sections is displayed along a time axis in a first direction,
the first section has a first display width in a second direction that is opposite to the first direction,
the second section has a second display width in the second direction,
the second display width is different from the first display width, and
a difference in the second display width with respect to the first display width indicates a degree of reduction in the time axis of the second section with respect to the first section.

18. An information processing method, comprising:
in an information processing system including a vehicle and an information terminal:
acquiring, by the vehicle, observation information of a driver of the vehicle;
dividing, by the vehicle, the acquired observation information into conversion unnecessary data and conversion necessary data;
executing, by the vehicle, as a data conversion process, at least one of:
abstraction processing for the conversion necessary data to generate abstraction data, or
encryption processing for the conversion necessary data to generate encryption data;
controlling, by the vehicle, a memory to store, the at least one of the generated abstraction data or the generated encryption data in association with identification information of the driver;
controlling display of traveling section display data of a travel route of the vehicle, wherein
the display of the traveling section display data includes a plurality of sections of the travel route,
each section of the plurality of sections is associated with at least one of an automatically drivable section, a manual driving section, or a handover section of the travel route,
the plurality of sections includes a first section and a second section,
the plurality of sections is displayed along a time axis in a first direction,
the first section has a first display width in a second direction that is opposite to the first direction,
the second section has a second display width in the second direction,
the second display width is different from the first display width, and
a difference in the second display width with respect to the first display width indicates a degree of reduction in the time axis of the second section with respect to the first section;
acquiring, by the information terminal, the abstraction data from the memory;
displaying, by the information terminal, the abstraction data on the information terminal; and
identifying the driver based on the identification information of the driver associated with the displayed abstraction data.

19. A non-transitory computer-readable medium having stored thereon, computer-executable instructions that, when executed by a computer, cause the computer to execute operations, the operations:
acquiring observation information of a driver of a vehicle;
dividing the observation information into conversion unnecessary data and conversion necessary data;
executing, as a data conversion process, at least one of:
abstraction processing for the conversion necessary data to generate abstraction data, or
encryption processing for the conversion necessary data to generate encryption data;

controlling a memory to store the at least one of the generated abstraction data or the generated encryption data in association with identification information of the driver; and controlling display of traveling section display data of a travel route of the vehicle, wherein the display of the traveling section display data includes a plurality of sections of the travel route, each section of the plurality of sections is associated with at least one of an automatically drivable section, a manual driving section, or a handover section of the travel route, the plurality of sections includes a first section and a second section, the plurality of sections is displayed along a time axis in a first direction, the first section has a first display width in a second direction that is opposite to the first direction, the second section has a second display width in the second direction, the second display width is different from the first display width, and a difference in the second display width with respect to the first display width indicates a degree of reduction in the time axis of the second section with respect to the first section.

20. The information processing device according to claim 1, wherein the CPU is further configured to change, based on an arousal level of the driver, a time of issue of a notification before a manual driving start time of the vehicle, the notification indicates a switch from an automatic driving mode to a manual driving mode of the vehicle, and a time between the time of issue of the notification and the manual driving start time increases with decrease in the arousal level of the driver.

* * * * *